US012591200B2

(12) United States Patent
Zhao et al.

(10) Patent No.: US 12,591,200 B2
(45) Date of Patent: Mar. 31, 2026

(54) DRIVING FORCE RECEIVING MEMBER AND PROCESS CARTRIDGE

(71) Applicant: E-Z INK TECHNOLOGY CO., LTD, Zhuhai (CN)

(72) Inventors: Shengkui Zhao, Zhuhai (CN); Dongming Lin, Zhuhai (CN); Peng Wang, Zhuhai (CN); Hangyu Peng, Zhuhai (CN)

(73) Assignee: E-Z INK TECHNOLOGY CO., LTD, Zhuhai (CN)

( * ) Notice: Subject to any disclaimer, the term of this patent is extended or adjusted under 35 U.S.C. 154(b) by 0 days.

(21) Appl. No.: 18/661,578

(22) Filed: May 11, 2024

(65) Prior Publication Data

US 2024/0295852 A1 Sep. 5, 2024

Related U.S. Application Data

(63) Continuation-in-part of application No. PCT/CN2022/131575, filed on Nov. 12, 2022.

(30) Foreign Application Priority Data

Nov. 12, 2021 (CN) ......................... 202122784760.4
Mar. 18, 2022 (CN) ......................... 202220611605.4
(Continued)

(51) Int. Cl.
*G03G 21/18* (2006.01)

(52) U.S. Cl.
CPC ................................ *G03G 21/1864* (2013.01)

(58) Field of Classification Search
CPC ............. G03G 21/1889; G03G 15/757; G03G 21/186; G03G 2221/1657; G03G 21/1814; G03G 2221/1869; G03G 21/1647
See application file for complete search history.

(56) References Cited

U.S. PATENT DOCUMENTS 5,873,020 A * 2/1999 Matsuura ........... G03G 15/2064 399/329
11,774,876 B2 10/2023 Fukasawa et al.
(Continued)

FOREIGN PATENT DOCUMENTS

CA 3132957 A1 * 9/2020 ........... G03G 15/757
CN 1222712 A 7/1999
(Continued)

*Primary Examiner* — Jessica L Eley
(74) *Attorney, Agent, or Firm* — Bayramoglu Law Offices LLC

(57) ABSTRACT

Provided are driving force receiving member, a rotating assembly with the driving force receiving member, and a process cartridge. The driving force receiving member is used for receiving a driving force from an image forming apparatus, the image forming apparatus has a driving portion and a braking portion which rotate in the same direction, the braking portion rotates with the driving portion, the braking portion moves relative to the driving portion, and the braking portion is located on a downstream side of the driving portion in a direction of rotation; when the driving portion rotates, the driving force receiving member is driven by the driving portion or the braking portion, and when the driving portion stops applying the driving force to the driving force receiving member, the driving force receiving member is not braked by the braking portion; and abrasion of the driving force receiving member can be relieved.

19 Claims, 28 Drawing Sheets

(30) Foreign Application Priority Data

| | | |
|---|---|---|
| Sep. 22, 2022 | (CN) | 202222519967.3 |
| Oct. 1, 2022 | (CN) | 202222636008.X |
| Oct. 24, 2022 | (CN) | 202222810125.3 |
| Nov. 1, 2022 | (CN) | 202222907750.X |
| Nov. 3, 2022 | (CN) | 202222933490.3 |

(56) References Cited

U.S. PATENT DOCUMENTS

| | | | | |
|---|---|---|---|---|
| 11,829,100 | B2 | 11/2023 | Fukui et al. | |
| 11,906,927 | B2 | 2/2024 | Fujino et al. | |
| 2010/0266304 | A1* | 10/2010 | Inoue | G03G 15/657 399/68 |
| 2016/0041489 | A1* | 2/2016 | Kawahara | G03G 15/02 399/176 |
| 2017/0176914 | A1 | 6/2017 | Wenyi | |
| 2021/0165363 | A1 | 6/2021 | Fan | |
| 2023/0176496 | A1 | 6/2023 | Fujino et al. | |
| 2023/0176519 | A1 | 6/2023 | Fujino et al. | |
| 2024/0036513 | A1 | 2/2024 | Fukui et al. | |
| 2024/0118657 | A1 | 4/2024 | Morioka et al. | |

FOREIGN PATENT DOCUMENTS

| | | | |
|---|---|---|---|
| CN | 112034694 | A | 12/2020 |
| CN | 113574468 | A | 10/2021 |
| CN | 113574469 | A | 10/2021 |
| CN | 114384778 | A | 4/2022 |
| CN | 217034518 | U | 7/2022 |
| CN | 218848578 | U | 4/2023 |
| CN | 219590676 | U | 8/2023 |
| CN | 220137550 | U | 12/2023 |
| CN | 220526190 | U | 2/2024 |
| CN | 117666311 | A | 3/2024 |
| CN | 117687281 | A | 3/2024 |
| CN | 117687282 | A | 3/2024 |
| CN | 117724315 | A | 3/2024 |
| CN | 117784561 | A | 3/2024 |
| CN | 117891149 | A | 4/2024 |
| CN | 220855457 | U | 4/2024 |
| CN | 117970761 | A | 5/2024 |
| EP | 4215995 | A1 | 7/2023 |
| EP | 4215996 | A1 | 7/2023 |
| EP | 4235315 | A2 | 8/2023 |
| EP | 3944024 | B1 | 1/2024 |
| EP | 3944025 | B1 | 3/2024 |
| JP | 2015022186 | A | 2/2015 |
| JP | 2022049295 | A | 3/2022 |
| JP | 2022130369 | A | 9/2022 |
| JP | 2023180292 | A | 12/2023 |
| JP | 2024003251 | A | 1/2024 |
| JP | 2024060041 | A | 5/2024 |
| KR | 20240005191 | A | 1/2024 |
| WO | 2022059802 | A1 | 3/2022 |
| WO | 2024078636 | A1 | 4/2024 |

* cited by examiner

DRIVING FORCE RECEIVING MEMBER AND PROCESS CARTRIDGE

CROSS REFERENCE TO THE RELATED APPLICATIONS

This application is the continuation-in-part application of International Application No. PCT/CN2022/131575, filed on Nov. 12, 2022, which is based upon and claims priority to Chinese Patent Applications No. 202122784760.4, filed on Nov. 12, 2021; 202220611605.4, filed on Mar. 18, 2022; 202222519967.3, filed on Sep. 22, 2022; 202222636008.X, filed on Oct. 1, 2022; 202222810125.3, filed on Oct. 24, 2022; 202222907750.X, filed on Nov. 1, 2022; 202222933490.3, filed on Nov. 3, 2022; the entire contents of which are incorporated herein by reference.

TECHNICAL FIELD

The present invention relates to the field of electrophotographic image forming, in particular to a process cartridge detachably mounted in an electrophotographic image forming apparatus, and a rotating assembly and a driving force receiving member which are rotationally mounted in the process cartridge.

BACKGROUND

A Chinese patent application CN113574469A has disclosed a force output member (driving force transmission unit on a main assembly side) 203 in an image forming apparatus M. As shown in FIG. 43 in this patent application, the force output member 203 has an axis of rotation M1, and includes a driving force output member (drum drive coupling) 180 for outputting a driving force and a braking force output member (including a first braking engagement member 204 and a second braking engagement member 208) for outputting a braking force, and when the force output member 203 outputs the driving force to a driving force receiving member X4 as described below, the braking force output member is driven by the driving force output member 180 to rotate with the driving force output member.

As shown in FIG. 45 in this patent application, a driving force output surface (drive transmission surface) 180*d* and a flange portion 180*a* are arranged at two ends of the driving force output member 180 respectively along the axis of rotation M1; and as shown in FIG. 43, the first braking engagement member 204 has a flange portion 204*a* and a coupling engaging portion 204*b* projecting from the flange portion 204*a*, the coupling engaging portion 204*b* is arranged to project towards the axis of rotation M1 of the force output member like a claw, the second braking engagement member 208 also has a flange portion 208*a* and a coupling engaging portion 208*b* projecting from the flange portion 208*a*, the coupling engaging portion 208*b* is also arranged to project towards the axis of rotation M1 of the force output member like a claw, in a radial direction perpendicular to the axis of rotation M1, the first braking engagement member 204 is located on an outer side of the second braking engagement member 208, the coupling engaging portion 204*b* is located on an outer side of the coupling engaging portion 208*b*, and the first braking engagement member 204 and the second braking engagement member 208 can rotate around the axis of rotation M1 at the same time.

FIG. 1A is a stereogram of an existing process cartridge; and FIG. 1B is a stereogram of a rotating member with an existing driving force receiving member.

The Chinese patent application CN113574469A has further disclosed a rotating member 21 with the existing driving force receiving member X4 as shown in FIG. 1B. The rotating member 21 and the driving force receiving member X4 are suitable for the existing process cartridge C as shown in FIG. 1A. The process cartridge C includes a first unit 100 and a second unit 200 which engage with each other, and the driving force receiving member X4 for receiving the driving force from the image forming apparatus, the first unit 100 includes a first unit casing 1 and a first rotating member 11 rotationally mounted in the first unit casing 1, the second unit 200 includes a second unit casing 2 and a second rotating member 21 rotationally mounted in the second unit casing 2, and the driving force receiving member X4 is arranged at one longitudinal tail end of the process cartridge C, and drives at least one of the first rotating member 11 and the second rotating member 21 to rotate.

Taking an example that the second rotating member 21 rotates around an axis of rotation L21, as shown in FIG. 1B, the driving force receiving member X4 engages with the second rotating member 21, and includes a base tray X42, a substrate X43 and an engaging portion X44, the base tray X42, the substrate X43 and the engaging portion X44 are sequentially arranged along the axis of rotation L21, the engaging portion X44 includes a central pillar X45 and a driving force receiving portion X46 extending outwards in a radial direction of the central pillar X45, the driving force receiving portion X46 has a guide surface X463 helically extending in a circumferential direction of the axis of rotation L21, and a driving surface X464 and a braking surface X465 which are arranged adjacent to the guide surface, and the guide surface X463 is located above the braking surface X465 along the axis of rotation L21.

In the mounting process of the process cartridge C, the guide surface X463 at least abuts against the coupling engaging portion 208*b* in the second braking engagement member 208, to guide the driving force receiving portion X46 to enter a position between a driving force output surface 180*d* and the coupling engaging portion 208*b*/204*b*; and when the process cartridge C operates, the driving force output surface 180*d* outputs the driving force to the driving surface X464, to drive the rotating member 21 to rotate, and the braking force output member is used for applying the braking force to the braking surface X465 on a downstream side of a direction of rotation of the receiving portion X46.

SUMMARY

The present invention provides a process cartridge, so as to further develop the above technology and relieve abrasion of a driving force receiving member.

The driving force receiving member is used for receiving a driving force from an image forming apparatus, wherein the image forming apparatus has a driving portion and a braking portion, and the driving portion and the braking portion rotate in the same direction, the braking portion can rotate with the driving portion, the braking portion can move relative to the driving portion, and the braking portion is located on a downstream side of the driving portion in a direction of rotation; and when the driving portion rotates, the driving force receiving member is driven by the driving portion or the braking portion, and the driving force receiving member is not braked by the braking portion.

In some implementations, the driving force receiving member includes a connecting portion and an engaging portion, wherein the connecting portion is used for being connected with an external component of the driving force receiving member, the engaging portion includes a guide surface, a first surface and a second surface, wherein the first surface and the second surface are adjacent to the guide surface, the guide surface guides the braking portion to move relative to the driving portion, the first surface is used for abutting against the driving portion or the braking portion to receive the driving force, and the second surface is spaced from the braking portion.

In some implementations, when the driving force receiving member is driven, the braking portion is pressed by the driving force receiving member to retract.

In some implementations, the driving force receiving member can be mounted to the image forming apparatus with the process cartridge, the driving force receiving member has driving force receiving portions, each driving force receiving portion has a surface for receiving the driving force, and when the process cartridge is mounted at a preset position of the image forming apparatus, the surface reaches a downstream side of the braking portion in the direction of rotation.

In some implementations, when the driving force receiving member is driven, the braking portion is disabled, and the image forming apparatus transmits the driving force to the driving force receiving member through the driving portion or the braking portion.

The present invention further provides a driving force receiving member for receiving a driving force from an image forming apparatus. The image forming apparatus has a driving portion and a braking portion, wherein the driving portion and the braking portion rotate in the same direction, the braking portion is configured to rotate with the driving portion, the braking portion is configured to move relative to the driving portion, and the braking portion is located on a downstream side of the driving portion in a direction of rotation; and the driving force receiving member is driven by the driving portion or the braking portion, the driving force receiving member is spaced from the braking portion in the direction of rotation, or the braking portion retracts relative to the driving portion, or a part of the driving force receiving member is located on a downstream side of the braking portion in the direction of rotation.

The present invention further provides a process cartridge, including a casing, a rotating member rotationally supported by the casing, and the above driving force receiving member. The driving force receiving member directly or indirectly drives the rotating member.

DETAILED DESCRIPTION OF THE EMBODIMENTS

Figure 1A:
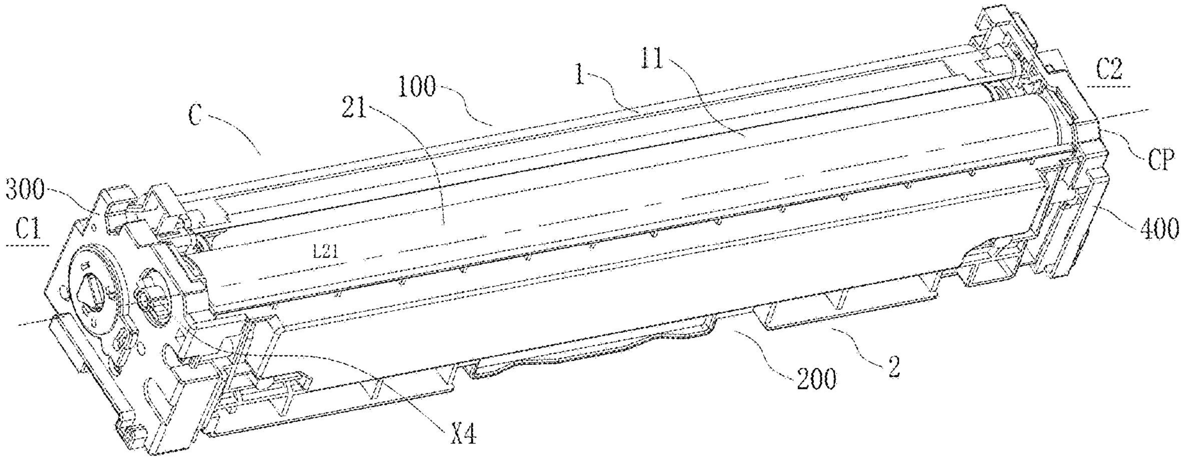
FIG. 1A (Prior Art)
FIG. 1A is a stereogram of an existing process cartridge.
Figure 1B:
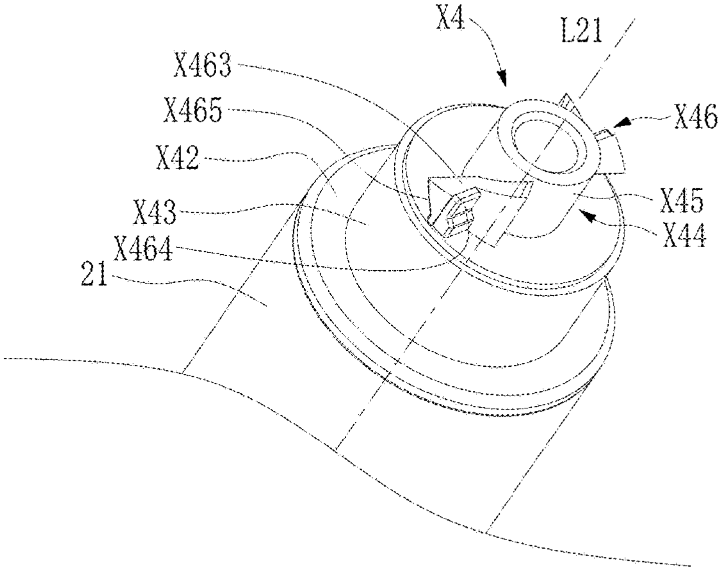
FIG. 1B (Prior Art)
FIG. 1B is a stereogram of a rotating member with an existing driving force receiving member.

Embodiments of the present invention will be described in detail below with reference to the drawings. In order to facilitate the understanding, besides a driving force receiving member, numbers and structures of a process cartridge and members thereof mentioned in the patent application as mentioned in the background art will be directly referred to hereinafter.

It can be understood that the first rotating member 11 and/or the second rotating member 21 in the patent application in the background art may be directly or indirectly driven by the driving force receiving member X4; the process cartridge C may include the first unit 100 and the second unit 200 at the same time, or may only include any one of the first unit 100 and the second unit 200, a developer is accommodated in the first unit casing 1, an end with the driving force receiving member X4 is referred to as a driving end C1, the other end opposite to the above end is referred to as a non-driving end C2, a driving end cover/first end cover 300 is mounted at the driving end C1, the driving force receiving member X4 is exposed from the driving end C1, a non-driving end cover/second end cover 400 is mounted at the non-driving end C2, the first unit 100 and the second unit 200 may engage with each other through the first end cover 300 and the second end cover 400, or may engage with each other through pins, buckles, etc., and the first end cover 300 and the second end cover 400 may serve as a part of the first unit 100 or the second unit 200, or may serve as components independent of the first unit 100 or the second unit 200, as long as the first unit 100 and the second unit 200 can engage with each other; and the first rotating member 11 may be a developing roller, the second rotating member 21 may be a photosensitive drum, however, the first rotating member 11 and the second rotating member 21 may further be other components required to rotate in the process cartridge, such as a charging member 24 for charging the photosensitive drum, a supplying member 102 for supplying the developer to the developing roller, or a stirring member for stirring the developer, etc., as long as the driving force receiving member X4 can receive a driving force from a force output member arranged in an image forming apparatus and drive the rotating member to rotate, that is, the photosensitive drum 21, the charging member 24, the developing roller 11, the supplying member 102, the stirring member, etc. rotationally mounted in the process cartridge C may be referred to as the rotating member, the driving force receiving member X4 receives the driving force from the image forming apparatus so as to drive the rotating member to rotate, and therefore the engagement of the rotating member with the driving force receiving member X4 may be referred to as a rotating assembly.

When the process cartridge C operates, the photosensitive drum 21 makes contact with the developing roller 11, the developer is supplied to the photosensitive drum 21 by the developing roller 11, the driving force receiving member is represented as a number 4 below, a driving force receiving member 4 is fixedly mounted at one longitudinal tail end of the rotating member, and therefore the driving force receiving member 4 and the rotating member have the same axis of rotation.

Figure 3A:
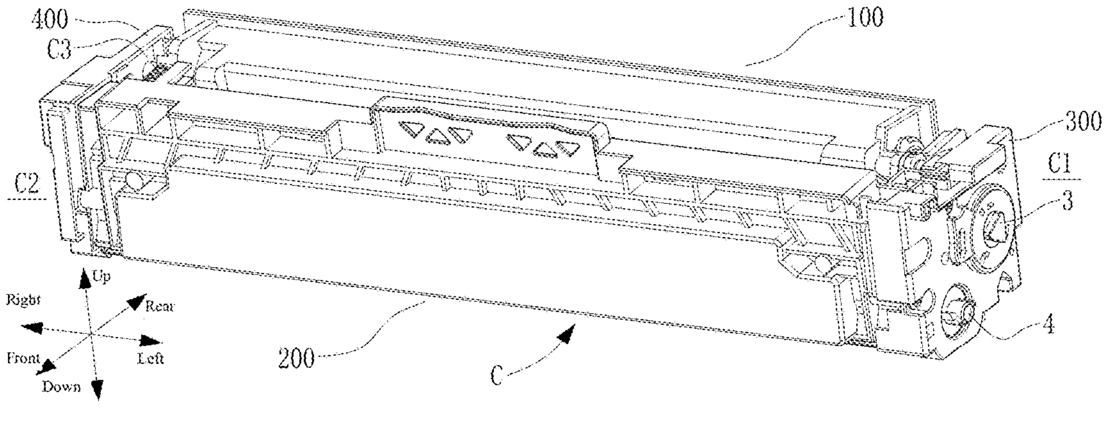
FIG. 3A and FIG. 3B are stereograms of a process cartridge involved in the present invention.
Figure 3B:
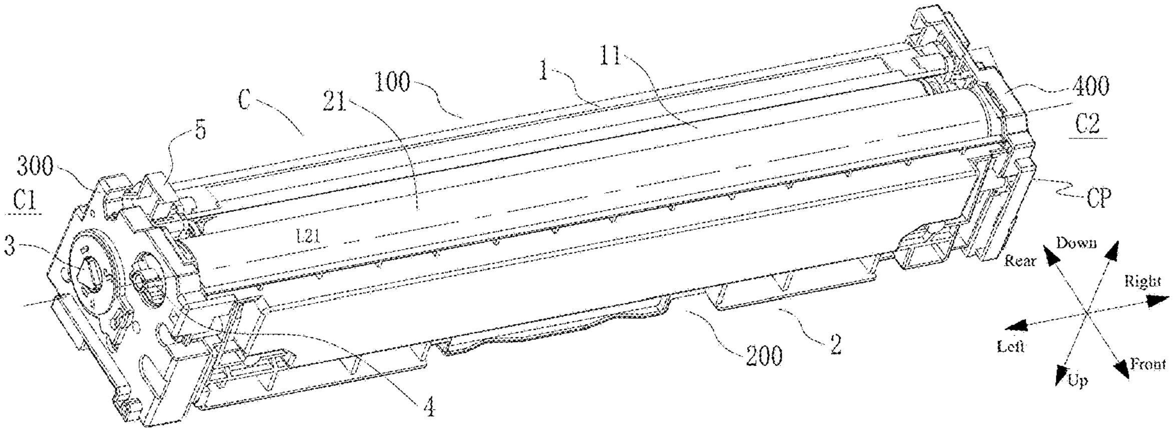

FIG. 3A and FIG. 3B are stereograms of the process cartridge involved in the present invention.

In order to facilitate the description below, it is defined here that a side, provided with the photosensitive drum 21 and the developing roller 11, in the process cartridge C is oriented towards a side, not provided with the photosensitive drum 21 and the developing roller 11, which is an upper side, a side opposite to the upper side is a lower side, a direction from the first unit 100 to the second unit 200 is a front side, a side opposite to the front side is a rear side, a side receiving the driving force is a left side, and a side opposite to the left side is a right side; and the process cartridge C is mounted to the image forming apparatus from top to bottom in a top-bottom direction, the left side is the driving end C1, the right side is the non-driving end C2, the first end cover 300 is mounted at the driving end C1, the second end cover 400 is mounted at the non-driving end C2, and a first driving force receiving member 3 (also referred to as "developing driving force receiving member 3") for receiving the driving force for the developing roller 11 and the driving force receiving member 4 for receiving the driving force for the photosensitive drum 21 are both exposed from the first end cover 300.

The driving force receiving member 4 being directly mounted at a tail end of the photosensitive drum 21 is taken as an example for description below.

[Force Output Member in Image Forming Apparatus]

In order to more clearly describe below, it is necessary to further describe the force output member 203 with reference to the drawings in the patent application (referred patent application) in the background art here.

Figure 48:
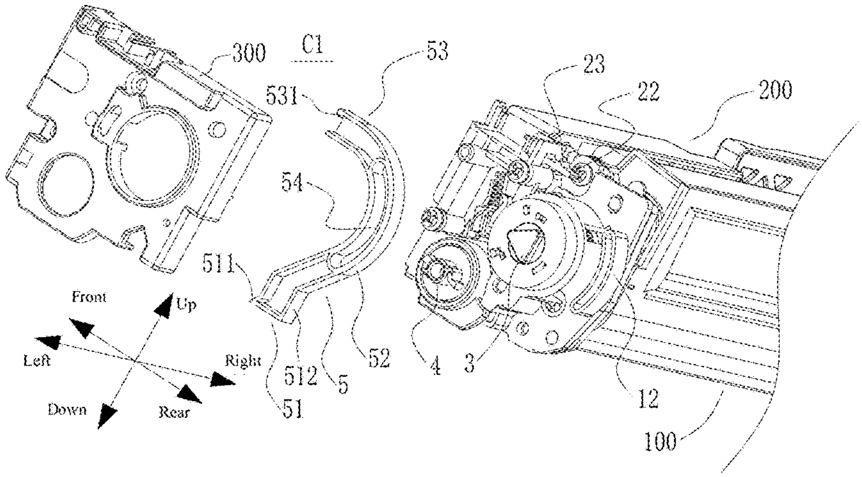
FIG. 48 is a schematic decomposition diagram of a first separation contact mechanism in a process cartridge and a process cartridge casing involved in the present invention.

As shown in FIG. 2A to FIG. 2D in this patent application, a driving force output member 180 includes a cylindrical portion 180*c*, and a flange portion 180*a* and a driving portion 180*h* which are located at two ends of the cylindrical portion 180*c* respectively, and a braking force output member includes a first braking engagement member 204 and a second braking engagement member 208 which engage with each other. As shown in FIG. 48 in the referred patent application and FIG. 32 and FIG. 34B in this patent application, the driving force output member 180 and the braking force output member can rotate around the axis of rotation M1 in the same direction of rotation r, the braking force output member can rotate with the driving force output member 180, and before the process cartridge C is mounted to the image forming apparatus, the driving force output member 180 and the braking force output member are partially overlapped.

The driving force output member 180 includes a first driving force output portion 180*h* and a second driving force output portion 180*m* which are oppositely arranged in a radial direction of the force output member, and the braking force output member includes a first braking force output portion 203*a* and a second braking force output portion 203*b* which are oppositely arranged in the radial direction of the force output member. As shown in FIG. 2D, the first driving force output portion 180*h*, the first braking force output portion 203*a*, the second driving force output portion 180*m* and the second braking force output portion 203*b* are sequentially arranged in the direction of rotation.

As shown in FIG. 2D, a parting line x that passes through the axis of rotation M1 and positions between the first braking force output portion 203*a* and the second driving force output portion 180*m* and between the first driving force output portion 180*h* and the second braking force output portion 203*b* is made. In FIG. 2D, the force output member 203 is divided by the parting line x into a first force output portion 2031 and a second force output portion 2032, wherein the first force output portion 2031 includes the first driving force output portion 180*h* and the first braking force output portion 203*a*, and the second force output portion 2032 includes the second driving force output portion 180*m* and the second braking force output portion 203*b*. The first driving force output portion 180*h* and the second driving force output portion 180*m* have the same structure, the first braking force output portion 203*a* and the second braking force output portion 203*b* have the same structure, and engaging processes between the driving force receiving member 4 and the first force output portion 2031 and between the driving force receiving member and the second force output portion 2032 are the same.

In order to facilitate the description, the engaging process between the first force output portion 2031 and the driving force receiving member 4 is taken as an example for description. Furthermore, the first driving force output portion 180*h* in the first force output portion 2031 is a driving force output portion/driving portion 180*h* for short, the first braking force output portion 203*a* in the first force output portion 2031 is a braking portion 203*a* for short, the braking portion 203*a* is located on a downstream side of the driving portion 180*h* in the direction of rotation r, the driving portion 180*h* and the braking portion 203*a* can rotate around the axis of rotation M1 in the same direction, the braking portion 203*a* can rotate with the driving portion 180*h*, and before the process cartridge is mounted to the image forming apparatus, the driving portion 180*h* and the braking portion 203*a* are partially overlapped.

Figure 43A:
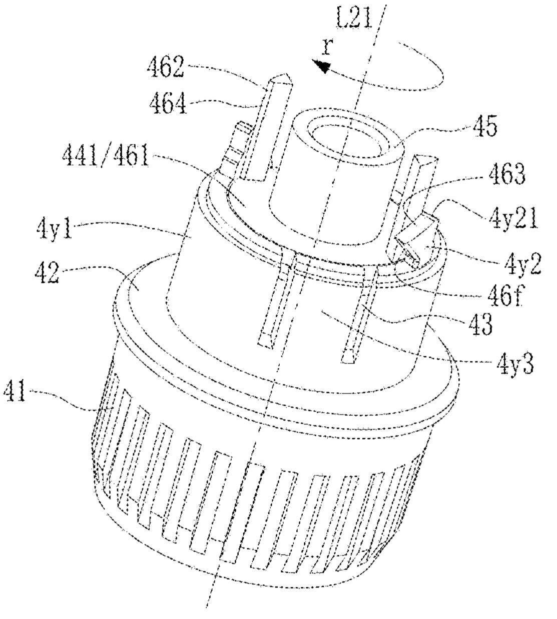
FIG. 43A is a stereogram of a driving force receiving member involved in Embodiment 20 of the present invention.
Figure 43B:
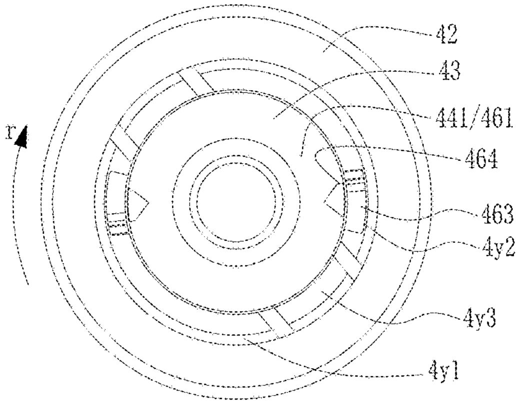
FIG. 43B of a side view as viewed along an axis of rotation of a driving force receiving member involved in Embodiment 20 of the present invention.

The braking portion 203*a* includes the first braking engagement member 204 and the second braking engagement member 208, and the first braking engagement member 204 is located on an outer side of the second braking engagement member 208 in the radial direction of the force output member 203. As shown in FIGS. 43A and 43B in the referred patent application, the first braking engagement member 204 and the second braking engagement member 208 engage with each other through a rotation stop recess 204*c* and a rotation stop projection 208*c*, and therefore the first braking engagement member 204 and the second braking engagement member 208 can rotate around the axis M1 together.

Figure 44A:
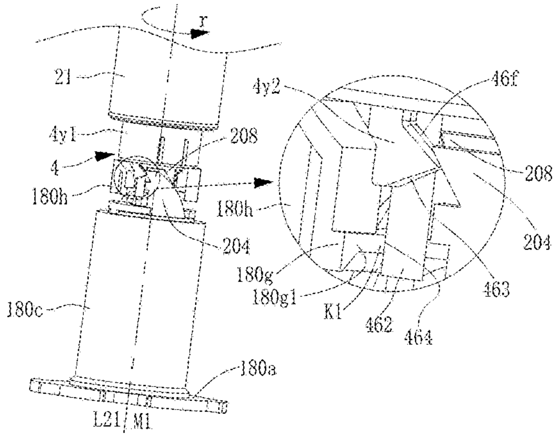
FIG. 44A and FIG. 44B are state diagrams after engagement of a driving force receiving member with a force output member involved in Embodiment 20 of the present invention.
Figure 44B:
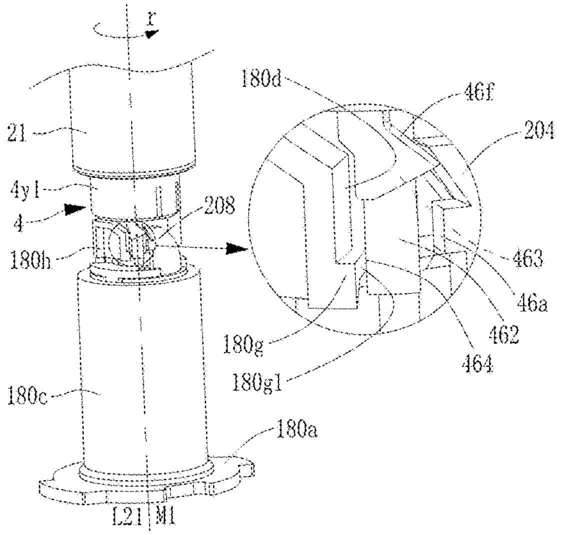

Furthermore, the force output member 203 further includes a first spring (drum drive coupling spring) 210 and a second spring (braking engagement spring) 211, the first spring 210 abuts against a brake transmission member 207, a flange portion 207*a* of the brake transmission member 207 abuts against the second braking engagement member 208, and meanwhile, a projection 207*f* of the brake transmission member 207 further abuts against a contact surface 180*f* (as shown in FIGS. 44A and 44B in the referred patent application) of the driving force output member; and the second spring 211 abuts against a flange portion 204*a* of the first braking engagement member 204. Along the axis M1, the first braking engagement member 204, the second braking engagement member 208 and the driving portion 180*h* are arranged to be capable of retracting and extending along the axis M1, that is, to move in directions M1A and M1B in FIG. 48 in the referred patent application, wherein, the first braking engagement member 204 and the second braking engagement member 208 can retract and extend along the axis M1 at the same time, both of which can also retract and extend along the axis M1 respectively in some image forming apparatuses; when the first braking engagement member 204 moves in the direction (direction close to the flange portion 180*a*) M1A along the axis M1, after the rotation stop recess 204*c* and the rotation stop projection 208*c* disengage from each other, the first braking engagement member 204 can freely rotate around the axis M1; and when the second braking engagement member 208 moves in the direction M1A along the axis M1, the first braking engagement member 204 will also move in the direction M1A along the axis M1 through the rotation stop recess 204*c* and the rotation stop projection 208*c*, and finally, the first braking engagement member 204 and the second braking engagement member 208 can both freely rotate around the axis M1.

Figure 47:
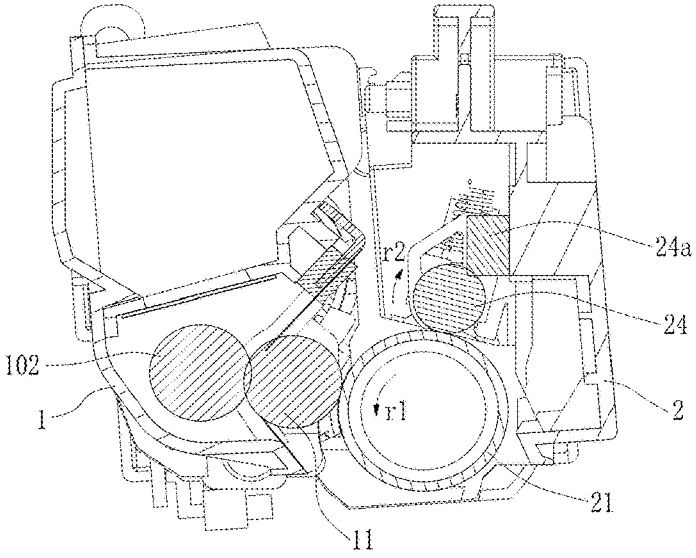
FIG. 47 is a sectional view of a process cartridge with a second unit involved in Embodiment 22 of the present invention that is sectioned along a plane perpendicular to an axis of rotation of a photosensitive drum.

Furthermore, as shown in FIG. 47 in the referred patent application and FIG. 2D in the present patent application, the second braking engagement member 208 further has an inward projection 208*e* projecting inwards in a radial direction of a coupling engaging portion 208*b*, and the inward projection 208*e* is located at a free end of the second braking engagement member 208 in the direction M1B (as shown in FIG. 48 in the referred patent application) opposite to the direction M1A. As shown in FIG. 2A to FIG. 2D, a driving force output surface 180*d* is located on the driving portion 180*h*, the driving portion 180*h* is opposite to the first braking engagement member 204 in the direction of rotation of the force output member 203, that is, a circle is made in a plane perpendicular to the axis of rotation M1 with a point where the axis of rotation M1 passes as a center of the circle, and the circle will pass through at least a part of the driving portion 180*h* and at least a part of the first braking engagement member 204 at the same time.

Figure 2A:
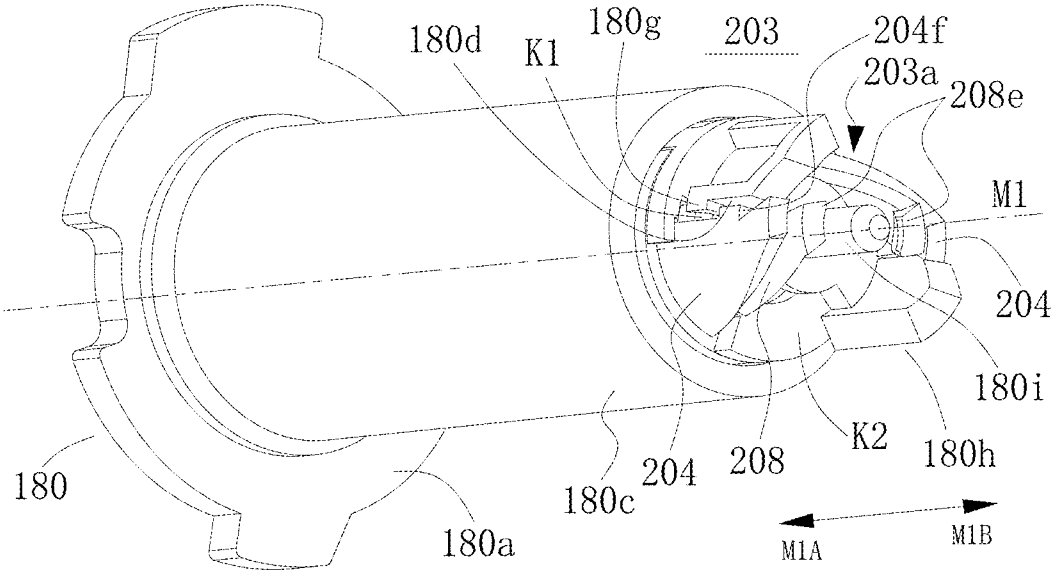
FIG. 2A (Prior Art)
FIG. 2A is a stereogram of an existing force output member.
Figure 2B:
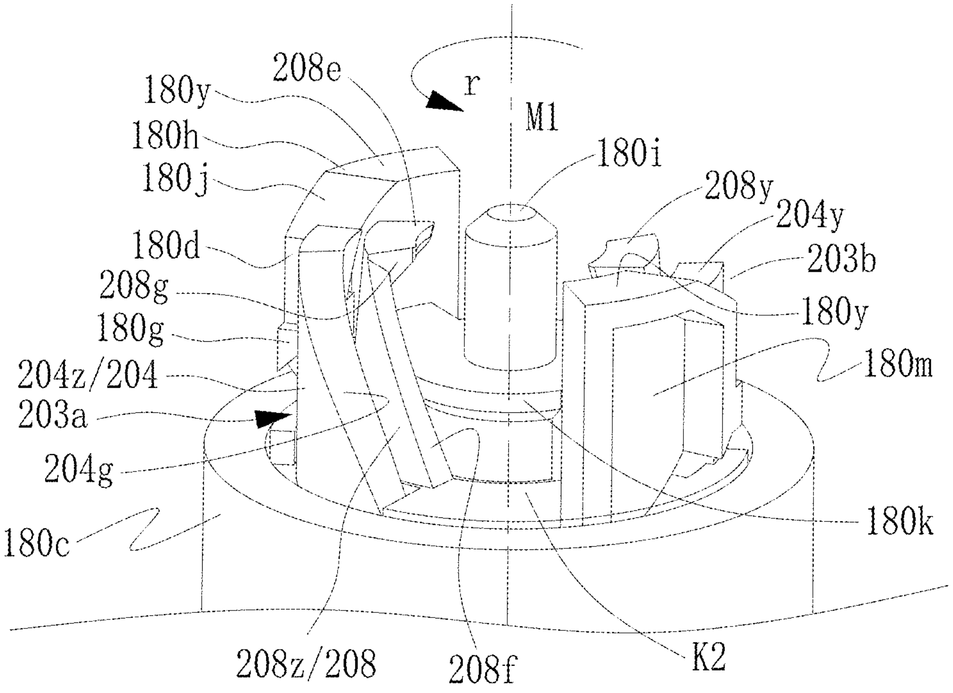
FIG. 2B (Prior Art)
FIG. 2B is a local stereogram of an existing force output member.
Figure 2C:
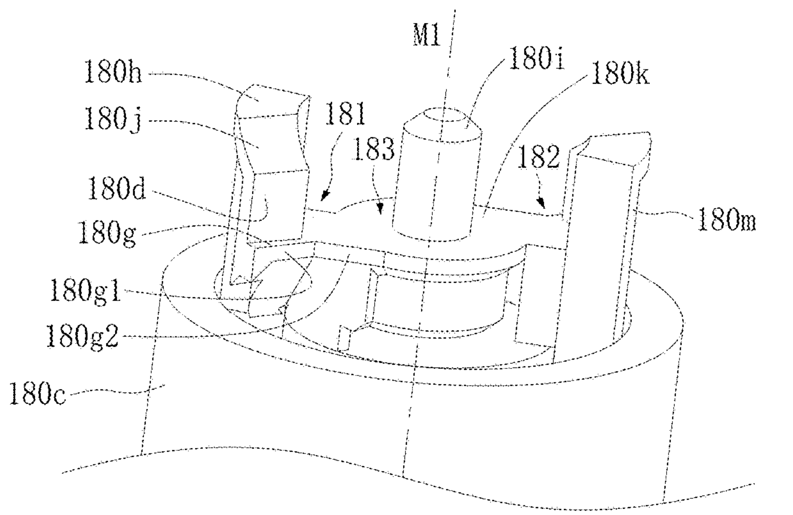
FIG. 2C (Prior Art)
FIG. 2C is a local stereogram after hiding a braking force output member in an existing force output member.
Figure 2D:
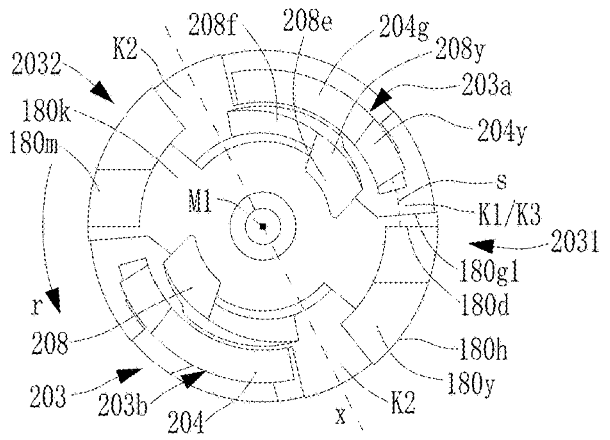
FIG. 2D (Prior Art)
FIG. 2D is a top view as viewed along an axis of rotation of an existing force output member.

Further referring to FIG. 2A to FIG. 2D, the second braking engagement member 208 has the inward projection 208*e* projecting towards the axis of rotation M1, furthermore, in the direction of rotation r of the force output member 203, the first braking engagement member 204 has an outer output surface 204*g* located on a downstream side of a first braking engagement member body 204*z*, and the second braking engagement member 208 has an inner output surface 208*f* located on a downstream side of a second braking engagement member body 208*z*; the inward projection 208*e* projects inwards or towards the axis of rotation M1 in a radial direction of the second braking engagement member body 208*z*, the inward projection 208*e* has a plane 208*g* located on a downstream side in the direction of rotation r, and the plane 208*g* is adjacent to the inner output surface 208*f*; and furthermore, as shown in FIG. 2B, along the axis of rotation M1, the driving portion 180*h* has a driving tail end surface 180*y* located at a tail end, the first braking engagement member 204 has a first braking tail end surface 204*y* located at a tail end, the second braking engagement member 208 has a second braking tail end surface 208*y* located at a tail end, and the tail ends refer to ends, farthest from the flange portion 180*a*, of the driving portion 180*h*, the first braking engagement member 204 and the second braking engagement member 208.

When the driving portion 180*h* and the braking portion 203*a* get close to each other, the driving portion 180*h* and the braking portion 203*a* cannot cling to each other, as shown in FIG. 2D, a gap is formed between the first braking tail end surface 204*y* and the driving portion 180*h* in the direction of rotation r, a minimum value of the gap is s, that is, a shortest distance between the first braking tail end surface 204*y* and the driving portion 180*h* is s.

As shown in FIG. 2C, the two driving portions 180*h* are oppositely arranged in the radial direction of the driving force output member 180, the driving force output member 180 further includes a connecting member 180*k* connecting the two driving portions, the connecting member 180*k* includes an intermediate plate 183, and a first connecting member 181 and a second connecting member 182 which are located on two radial sides in a radial direction of the intermediate plate 183 respectively, a following positioning boss 180*i* projects from the intermediate plate 183 along the axis of rotation M1, and the first connecting member 181 and the second connecting member 182 have the same structure, and are connected with the driving portion respectively.

Furthermore, a lower projecting portion 180*g* is arranged on a surface (driving force output surface) 180*d* of a side, facing the first braking engagement member 204, of the driving portion 180*h*, the driving portion 180*h* further has an inclined surface 180*j* adjacent to the driving force output surface 180*d* in the direction of rotation r, an upper projecting portion 204*f* is arranged on a surface of a side, facing the driving portion 180*h*, of the first braking engagement member 204, before the process cartridge 100 is mounted, the driving portion 180*h* and the first braking engagement member 204 get close to each other in the direction of rotation r, and the upper projecting portion 204*f* and the lower projecting portion 180*g* are opposite/overlapped along the axis of rotation M1.

On the whole, the lower projecting portion 180*g* and the first connecting member 181 are integrally formed, the driving force output surface 180*d* projects from the lower projecting portion 180*g* along the axis of rotation M1, the lower projecting portion 180*g* further may be appraised to project from the first connecting member 181/driving force output surface 180*d* in the direction of rotation r, and a tail end of the lower projecting portion 180*g* is formed as a front surface 180*g*1 capable of rotating with the driving portion 180*h*; and furthermore, the first connecting member 181 further has a sub front surface 180*g*2 located on a downstream side of the direction of rotation in the direction of rotation r, the front surface 180*g*1 is connected with the sub front surface 180*g*2, and the front surface 180*g*1 and the sub front surface 180*g*2 are both located at a downstream tail end of the first connecting member 181, and therefore the front surface 180*g*1 and the sub front surface 180*g*2 may be collectively referred to as a downstream tail end surface of the first connecting member 181.

The force output member 203 has a first space K1, a second space K2 and a third space K3 in the direction of rotation r, wherein the first space K1 refers to a space between the front surface 180*g*1 and the braking portion 203*a*, the second space K2 refers to a space between the braking portion 203*a* and the driving portion 180*h* located on the downstream side of the braking portion, specifically, as shown in FIG. 2D, the second space K2 refers to a space between the first braking force output portion 203*a* and the second driving force output portion 180*m*, or a space between the second braking force output portion 203*b* and the first driving force output portion 180*h*, and the third space K3 refers to a space between the driving portion 180*h*/driving force output surface 180*d* and the first braking engagement member 204; and as shown in FIG. 2D, the second space K2 is larger than the first space K1/third space K3 in the direction of rotation r.

Figure 4A:
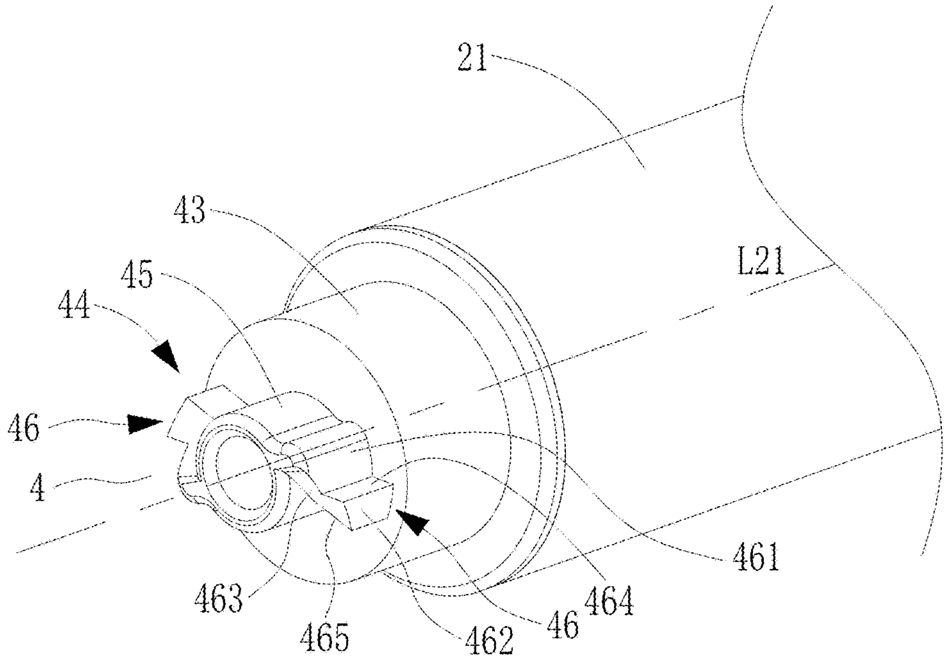
FIG. 4A is a stereogram of a photosensitive drum of a driving force receiving member involved in Embodiment 1 of the present invention.

As shown in FIG. 4A, the driving force receiving member 4 involved in the present invention has an axis of rotation L21, including a connecting portion 41, a base tray 42, a substrate 43 and an engaging portion 44, the connecting portion 41, the base tray 42, the substrate 43 and the engaging portion 44 are sequentially arranged along the axis of rotation L21, the connecting portion 41 directly or indirectly engages with the rotating member to be used for transmitting the driving force to the rotating member to drive the rotating member to rotate, the base tray 42 abuts against the rotating member to position the driving force receiving member 4 relative to the rotating member, the substrate 43 extends from the base tray 42, and the engaging portion 44 extends from the substrate 43 in a direction away from the base tray 42; and as a simplified structure, the base tray 42 may be omitted, the substrate 43 directly extends from the connecting portion 41, and more simply, the substrate 43 may also be omitted, and the engaging portion 44 extends from the connecting portion 41.

The structure of the engaging portion 44 will be described below, and other structures of the driving force receiving member 4 will not limited here. In order to more clearly describe the structure of the driving force receiving member involved in the present invention, only the driving force receiving member 4 is described below; however, it should be understood that the driving force receiving member 4 can be suitable for various rotating members in the process cartridge.

Driving Force Receiving Member

Embodiment 1

Figure 4B:
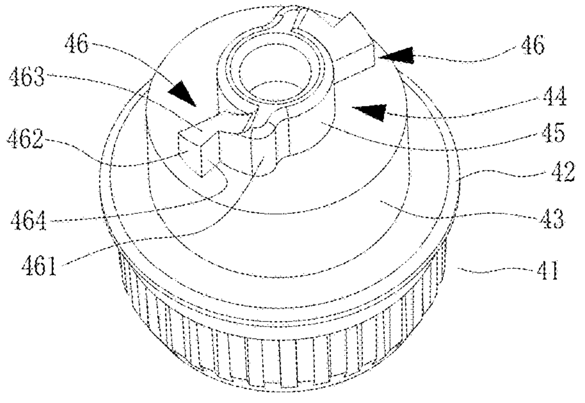
FIG. 4B is a stereogram of a first driving force receiving member involved in Embodiment 1 of the present invention.
Figure 4C:
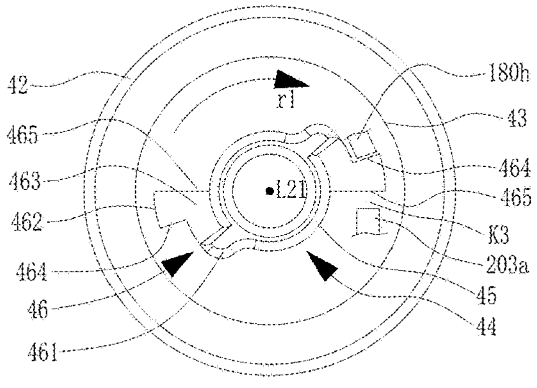
FIG. 4C is a side view as viewed along an axis of rotation of a first driving force receiving member involved in Embodiment 1 of the present invention.

As shown in FIG. 4A to FIG. 4C, a photosensitive drum 21 has an axis of rotation L21, a driving force receiving member 4 includes a connecting portion 41 (as shown in FIG. 4B), a base tray 42, a substrate 43 and an engaging portion 44, the driving force receiving member 4 is connected with the photosensitive drum 21 in a manner that the connecting portion 41 is embedded into the photosensitive drum 21, the base tray 42 abuts against the photosensitive drum 21 to position the driving force receiving member 4 relative to the photosensitive drum 21, the substrate 43 extends from the base tray 42, and the engaging portion 44 extends from the substrate 43 in a direction away from the base tray 42; and as a simplified structure, the base tray 42 may be omitted, the substrate 43 directly extends from the connecting portion 41, and more simply, the substrate 43 may also be omitted, and the engaging portion 44 extends from the connecting portion 41.

The structure of the engaging portion 44 will be described below, and other structures of the driving force receiving member 4 will not limited here.

The engaging portion 44 includes a central pillar 45 and driving force receiving portions 46 extending outwards in a radial direction of the central pillar 45, an axis of rotation L21 penetrates through the central pillar 45, and the two driving force receiving portions 46 are oppositely arranged on a periphery of the central pillar 45 radially. As shown in FIG. 4A and FIG. 4B, each driving force receiving portion 46 includes a base 461 connected with the central pillar 45 and a convex block 462 located on a radial outer side of the base 461, the convex block 462 is located on the radial outer side of the base 461 in a radial direction of the driving force receiving member 4, a guide surface 463 extends from the base 461 to the convex block 462, the convex block 462 has a first surface/driving surface 464 and a second surface/braking surface 465 adjacent to the guide surface 463, and the first surface 464 and the second surface 465 are both parallel to the axis of rotation L21.

As a process cartridge C is mounted towards an image forming apparatus, the guide surface 463 guides a braking portion 203*a* to move relative to a driving portion 180*h*, so that the corresponding driving force receiving portion 46 enters a position between the driving portion 180*h* and the braking portion 203*a*, that is, the driving force receiving portion 46 enters a first space K3, as shown in FIG. 4C, a driving force output surface 180*d* abuts against the first surface 464, the second surface 465 is spaced from the braking portion 203*a*, when the driving portion 180*h* rotates in a direction of rotation r, a driving force is transmitted to an engaging portion 44 through the first surface 464, and therefore the photosensitive drum 21 is driven to rotate around the axis of rotation L21.

Since the second surface 465 is separated from the braking portion 203*a*, that is, the driving force receiving member 4 is not necessary to be braked when stopping operating, and in the process where the cartridge C returns to an inoperative state from an operating state or the photosensitive drum 21 returns to a non-rotating state from a rotating state, the braking portion 203*a* does not apply an acting force/braking force to the driving force receiving member 4 in a circumferential direction of the photosensitive drum 21, and equivalently, the braking portion 203*a* is disabled, which is conducive to relieving abrasion generated when the driving force receiving member 4 operates; and furthermore, after the driving force receiving member 4 involved in the embodiment is adopted, the braking portion 203*a* in the image forming apparatus does not need to return to a position where the braking portion and the driving portion 180*h* get close to each other or are partially overlapped, which is conducive to simplifying the structure of the image forming apparatus, as for the driving portion 180*h* and the braking portion 203*a* which are already in a separated state, a driving force receiving member 4 of a next process cartridge may not have a guide surface 463, and therefore the structure of the process cartridge C may also be simplified.

Embodiment 2

Figure 5A:
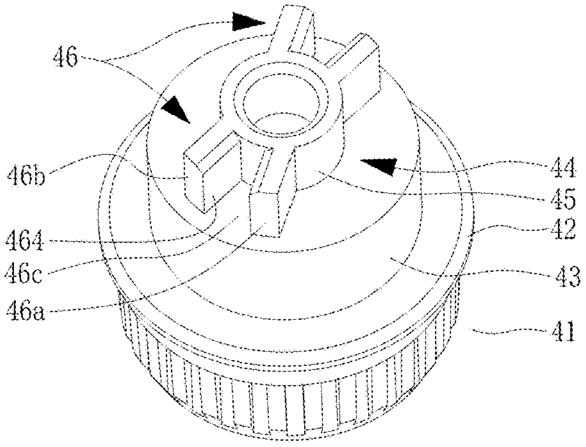
FIG. 5A is a stereogram of a driving force receiving member involved in Embodiment 2 of the present invention.
Figure 5B:
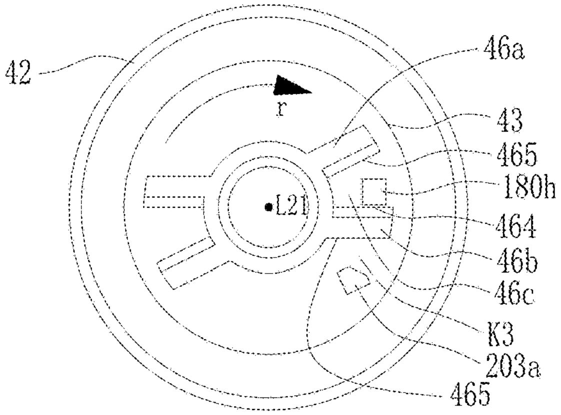
FIG. 5B is a side view as viewed along an axis of rotation of a driving force receiving member involved in Embodiment 2 of the present invention.

As shown in FIG. 5A and FIG. 5B, in order to facilitate the understanding, structures the same as those of the above first driving force receiving member 4 will adopt the same numbers. The structure of each driving force receiving portion 46 in the embodiment is different from that in Embodiment 1. As shown in figures, the driving force receiving portion 46 in this embodiment is formed as at least one pair of convex blocks 46*a*/46*b* spaced from each other, the convex blocks 46*a*/46*b* extend from a central pillar 45 in a direction away from an axis of rotation L21, a driving space 46*c* is formed therebetween, and each convex block has a first surface 464 and a second surface 465 which are opposite to each other; and as shown in FIG. 5B, the second surface 465 of the convex block 46*a* and the first surface 464 of the convex block 46*b* are formed as edges of the driving space 46*c*, when a process cartridge C is mounted, a driving portion 180*h* enters the driving space 46*c*, a braking portion 203*a* is located outside the driving space 46*c*, or the second convex block 46*b* enters a third space K3, when the process cartridge C operates, the driving portion 180*h* abuts against the first surface 464 of the convex block 46*b*, the braking portion 203*a* is away from the second surface 465 of the convex block 46*b*, and a driving force receiving member 4 rotates around the axis of rotation L21 in a direction r under a driving action of the driving portion 180*h*.

Different from Embodiment 1, the driving force receiving member 4 involved in this embodiment has a braked function, specifically, when the driving portion 180*h* stops applying a driving force to the first surface 464 of the convex block, a photosensitive drum 21/driving force receiving member 4 may continue to rotate in the direction r under an inertia action, at this moment, the second surface 465 of the convex block 46*a* will abut against the driving portion 180*h*, since the driving portion 180*h* has stopped rotating, the driving force receiving member 4 is braked under the braking action of the driving portion 180*h*, that is, in the process where the process cartridge C returns to an inoperative state from an operating state or the photosensitive drum 21 returns to a non-rotating state from a rotating state, the braking portion 203*a* does not apply an acting force/braking force to the driving force receiving member in a circumferential direction of the photosensitive drum 21, equivalently, the braking portion 203*a* is disabled, and braking of the driving force receiving member 4 is completed through abutment between the driving portion 180*h* and the convex block 46*a*.

Similarly, after the driving force receiving member 4 involved in this embodiment is adopted, the braking portion 203*a* in an image forming apparatus does not need to return to a position where the braking portion and the driving portion 180*h* get close to each other or are partially overlapped, which is conducive to simplifying the structure of the image forming apparatus; and as for the driving portion 180*h* and the braking portion 203*a* which are already in a separated state, a driving force receiving member 4 of a next process cartridge may not have a guide surface 463, and therefore the structure of the process cartridge C may also be simplified.

Wherein, in order to facilitate the distinguishment, the convex block 46*a* may be referred to as the first convex block, the convex block 46*b* may be referred to as the second convex block, and the first convex block 46*a* is located on an upstream side of the second convex block 46*b* in the direction of rotation r of the photosensitive drum 21/driving force receiving member 4; and it can be understood that as shown in FIG. 5B, when the process cartridge C operates in the image forming apparatus, a minimum distance between the second surface 465 of the first convex block and the driving portion 180*h* is less than a minimum distance between the second surface 465 of the second convex block and the braking portion 203*a*, so as to ensure that the first convex block 46*a* abuts against the driving portion 180*h* and the second convex block 46*b* cannot abut against the braking portion 203*a* in the process where the driving force receiving member 4 is braked.

Embodiment 3

Figure 6A:
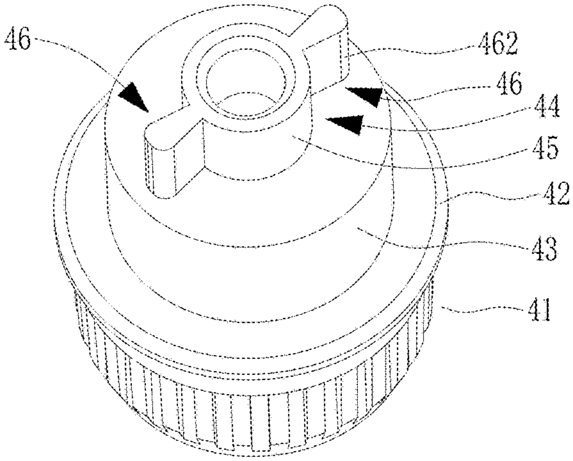
FIG. 6A is a stereogram of a driving force receiving member involved in Embodiment 3 of the present invention.
Figure 6B:
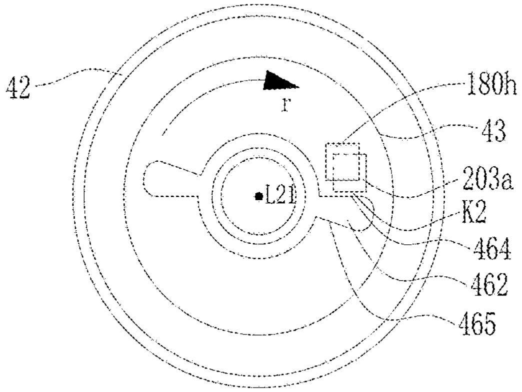
FIG. 6B is a side view as viewed along an axis of rotation of a driving force receiving member involved in Embodiment 3 of the present invention.
Figure 7:
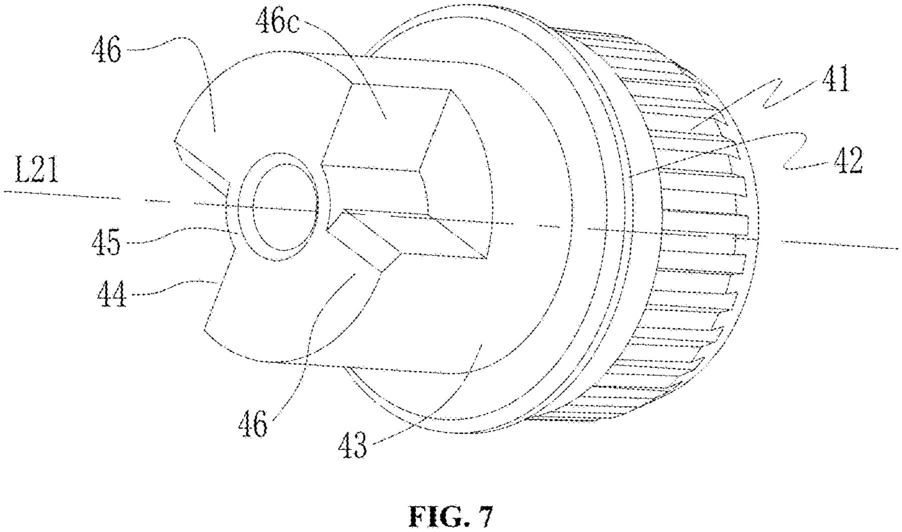
FIG. 7 is a stereogram of a driving force receiving member involved in Embodiment 4 of the present invention.

As shown in FIG. 6A and FIG. 6B, in order to facilitate the understanding, structures the same as those of the above first driving force receiving member 4 will adopt the same numbers.

The structure of each driving force receiving portion 46 in this embodiment is different from that in Embodiment 1. As shown in FIG. 6A, in this embodiment, the driving force receiving portion 46 is simplified into at least one independent convex block 462, the convex block 462 also has a first surface 464 and a second surface 465 which are opposite, and the first surface 464 is located on an upstream side of the second surface 465 in a direction of rotation r; and when a process cartridge C is mounted at a preset position of an image forming apparatus, the first surface 464 reaches a downstream space K2 (second space K2) of a braking portion 203*a*, and at this moment, the first surface 464 is opposite to the braking portion 203*a*.

When the process cartridge C starts to operate, the braking portion 203*a* rotates with a driving portion 180*h*, at this moment, the braking portion 203*a* abuts against the first surface 464 and drives a braking force receiving member 4 to rotate in the direction of rotation r, and in the same way as Embodiment 1, the driving force receiving member 4 in this embodiment also does not need to be braked by the braking portion when stopping operating, which is conducive to relieving abrasion generated when the driving force receiving member 4 operates; and in the process where the process cartridge C returns to an inoperative state from an operating state or a photosensitive drum 21 returns to a non-rotating state from a rotating state, the driving portion 180*h* does not apply an acting force/braking force to the driving force receiving member in a circumferential direction of the photosensitive drum 21, and equivalently, the driving portion 180*h* is disabled.

The structure of the driving force receiving member 4 in this embodiment is simplified, meanwhile, a contact surface between the driving force receiving portion 46 and a force output member 203 is increased, which is conducive to improving the engaging stability of the driving force receiving portion 46 and the force output member 203 and the force bearing stability of the driving force receiving portion 46, and the driving force receiving portion 46 and the force output member 203 are not prone to disengagement.

Since the second space K2 is the largest, the driving force receiving portion 46 is more likely to enter the second space K2 compared to the driving force receiving portion 46 entering a first space K1 or a third space K3, the engaging efficiency of the driving force receiving member 4 and the force output member 203 can further be improved by the adoption of the solution that the braking portion 203*a* drives the driving force receiving member 4 accordingly, thereby preventing engaging dislocation of the driving force receiving member 4 and the force output member 203.

Embodiment 4

As shown in FIG. 7, FIG. 8A, FIG. 8B and FIG. 9, a driving force receiving member 4 in this embodiment still includes a connecting portion 41, a base tray 42, a substrate 43 and an engaging portion 44, the connecting portion 41 is connected with a photosensitive drum, the base tray 42 abuts against the photosensitive drum, the driving force receiving member 4 is fixed to the photosensitive drum 21, the substrate 43 extends from the base tray 42, and the engaging portion 44 extends from the substrate 43 in a direction away from the base tray 42; and in the same way as Embodiment 1, at least one of the base tray 42 and the substrate 43 may be omitted. The engaging portion 44 includes a central pillar 45 and driving force receiving portions 46 extending outwards in a radial direction of the central pillar 45, an axis of rotation L21 penetrates through the central pillar 45, and the two driving force receiving portions 46 are oppositely arranged on a periphery of the central pillar 45 radially; under the condition that the substrate 43 is arranged, preferably, the driving force receiving portions 46 and the substrate 43 are integrally formed, two driving spaces 46*c* are formed between the two driving force receiving portions 46 in a circumferential direction of the driving force receiving member 4, each driving space 46*c* can accommodate a part of a force output member 203 in an image forming apparatus at the same time, at least one part of a first force output portion 2031 enters one driving space 46*c*, and at least one part of a second force output portion 2032 enters the other driving space 46*c*.

Figure 8A:
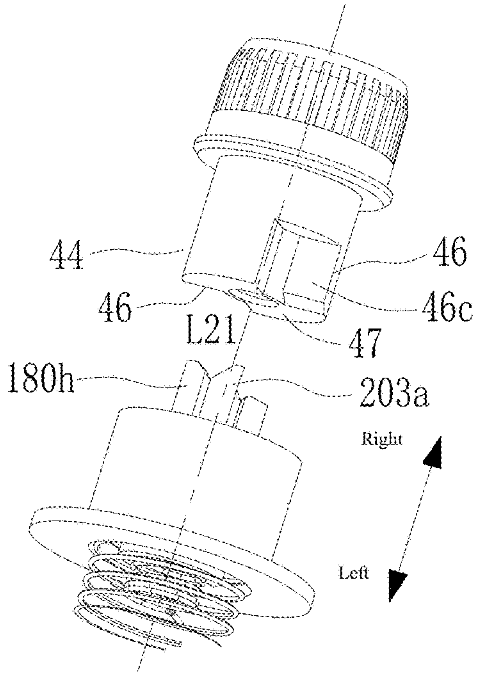
FIG. 8A and FIG. 8B are schematic state diagrams before and after engagement of a driving force receiving member with a driving force output member and a braking force output member in an image forming apparatus involved in Embodiment 4 of the present invention.
Figure 8B:
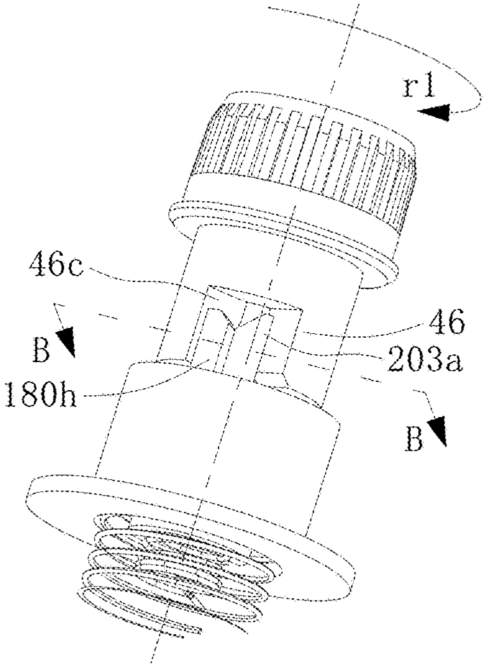
Figure 9:
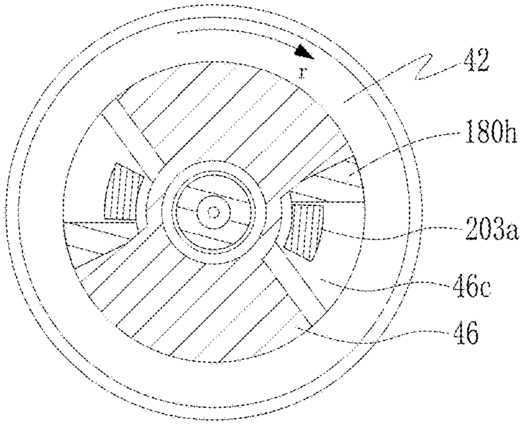
FIG. 9 is a sectional view after sectioning along a plane perpendicular to an axis of rotation of a driving force receiving member after engagement of the driving force receiving member with a driving force output member and a braking force output member in an image forming apparatus involved in Embodiment 4 of the present invention.

As shown in FIG. 8A, the photosensitive drum 21 with the driving force receiving member 4 is mounted with a process cartridge C, in the process where the process cartridge C is mounted towards the image forming apparatus, if a driving portion 180*h* and a braking portion 203*a* are just opposite to the driving spaces 46*c*, the driving portion 180*h* and the braking portion 203*a* will directly enter the driving spaces 46*c*, and if the driving portion 180*h* and the braking portion 203*a* cannot be completely opposite to the driving spaces 46*c*, the driving portion 180*h* and the braking portion 203*a* can finally enter the driving spaces 46*c* with rotation of the driving portion 180*h*/braking portion 203*a*.

The braking portion 203*a* outputs a driving force to the driving force receiving portions 46 in a direction of rotation r, so as to drive the driving force receiving member 4 to rotate; in the same way as Embodiment 2, when the braking portion 203*a* stops transmitting the driving force to the driving force receiving portions 46, the driving portion 180*h* will brake the driving force receiving member 4 continuing to rotate, that is, when the driving force receiving member 4 involved in this embodiment is adopted in the process cartridge C, functions of the driving portion 180*h* and the braking portion 203*a* in the image forming apparatus will be exchanged, that is, in the operating process of the process cartridge C, the braking portion 203*a* in the image forming apparatus has a driving effect, and in the process where the process cartridge C needs to return to an inoperative state or the photosensitive drum 21 returns to a non-rotating state from a rotating state, the driving portion 180*h* in the image forming apparatus has a braking effect, so that the structures of the driving force receiving member and the image forming apparatus are both simplified, and the driving force receiving portions 46 can also easily enter a second space K2.

Embodiment 5

Figure 10A:
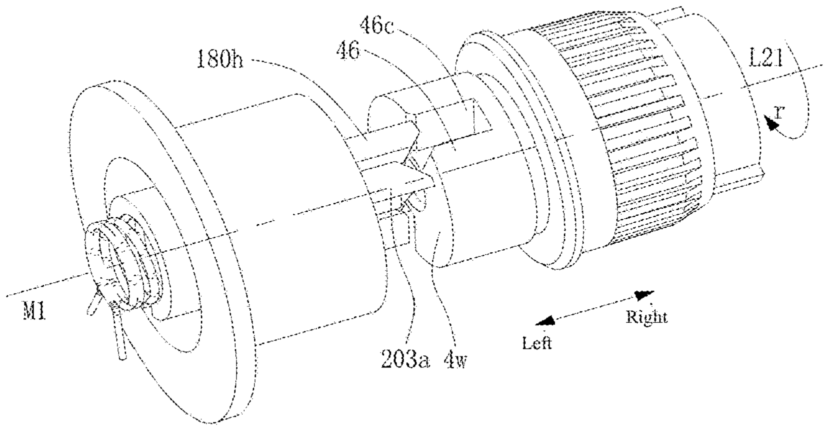
FIG. 10A and FIG. 10B are schematic state diagrams before and after engagement of a driving force receiving member with a driving force output member and a braking force output member in an image forming apparatus involved in Embodiment 5 of the present invention.
Figure 10B:
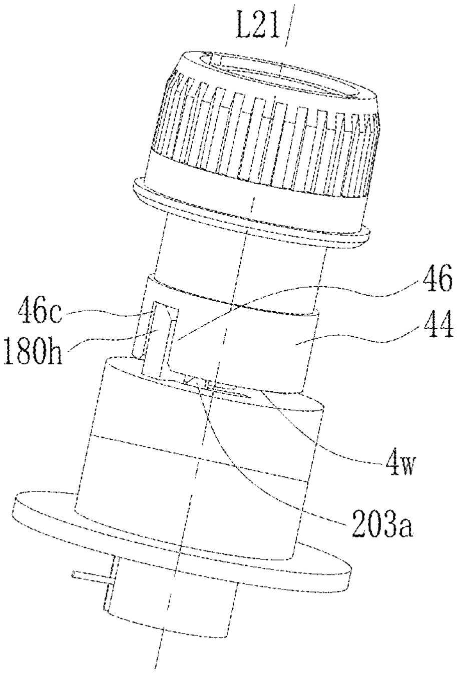

As shown in FIG. 10A and FIG. 10B, in this embodiment, at least one of a driving portion 180*h* and a braking portion 203*a* in an image forming apparatus is arranged to be capable of extending and retracting along an axis of rotation M1, and a driving space 46*c* is still formed between two driving force receiving portions 46 of a driving force receiving member 4; and when the driving force receiving member 4 is mounted with a process cartridge C, a tail end surface 4*w* of the driving force receiving member 4 will abut against one of the driving portion 180*h* and the braking portion 203*a*, or the tail end surface 4*w* abuts against the driving portion 180*h* and the braking portion 203*a* at the same time, and therefore at least one of the driving portion 180*h* and the braking portion 203*a* is pressed to retract into the image forming apparatus.

As shown in FIG. 10B, when the driving portion 180*h* or the braking portion 203*a* enters the driving spaces 46*c*, the driving portion 180*h* or the braking portion 203*a* will drive the driving force receiving member 4 to rotate around an axis of rotation L21 in a direction r with start of the image forming apparatus; and when the driving portion 180*h* and the braking portion 203*a* are pressed at the same time, the driving portion 180*h* and the braking portion 203*a* start to rotate at the same time with start of the image forming apparatus, however, the driving force receiving member 4 is not driven till one of the driving portion 180*h* and the braking portion 203*a* enters the corresponding driving space 46*c*.

The driving force receiving member 4 in this embodiment can be driven by the driving portion 180*h* or the braking portion 203*a*, when the driving force receiving member 4 is driven by the driving portion 180*h*, the braking portion 203*a* is pressed by the tail end surface 4*w* to retract, and equivalently, the braking portion 203*a* is disabled; in the process where the process cartridge C operates and the process cartridge C returns to an inoperative state from an operating state, the braking portion 203*a* does not act, and the braking portion 203*a* does not transmit an acting force to the driving force receiving member in a circumferential direction of a photosensitive drum 21; when the driving force receiving member 4 is driven by the braking portion 203*a*, the driving portion 180*h* is pressed by the tail end surface 4*w* to retract, and equivalently, the driving portion 180*h* is disabled; in the process where the process cartridge C operates, and the process cartridge C returns to the inoperative state from the operating state or the photosensitive drum 21 returns to a non-rotating state from a rotating state, the driving portion 180*h* does not transmit the acting force to the driving force receiving member 4 in the circumferential direction of the photosensitive drum 21, that is, the driving portion 180*h* does not act; and similarly, the structures of the driving force receiving member 4 and the image forming apparatus are both simplified.

It can be shown from the above embodiment that the driving portion 180*h* or the braking portion 203*a* can transmit a driving force to the driving force receiving member 4, when the driving portion 180 is adopted to transmit the driving force to the driving force receiving member 4, and in the process where the process cartridge returns to the inoperative state from the operating state or the photosensitive drum 21 returns to the non-rotating state from the rotating state, the braking portion 203*a* does not transmit the acting force to the driving force receiving member in the circumferential direction of the photosensitive drum 21, at this moment, the braking portion 203*a* is disabled, specifically, the braking portion may be disabled in a manner that the braking portion 203*a* is away from the corresponding driving force receiving portion 46 in the driving force receiving member 4 in the direction of rotation r, or the braking portion 203*a* is pressed by the tail end surface 4*w* of the driving force receiving member 4 to a retracted state along the axis of rotation L21, and similarly, the disabling manner is also suitable for the driving portion 180*h*.

In order to facilitate the understanding, all components in the following embodiment and components with functions the same as those of the above embodiment will adopt the same names and numbers.

Embodiment 6

Figure 11A:
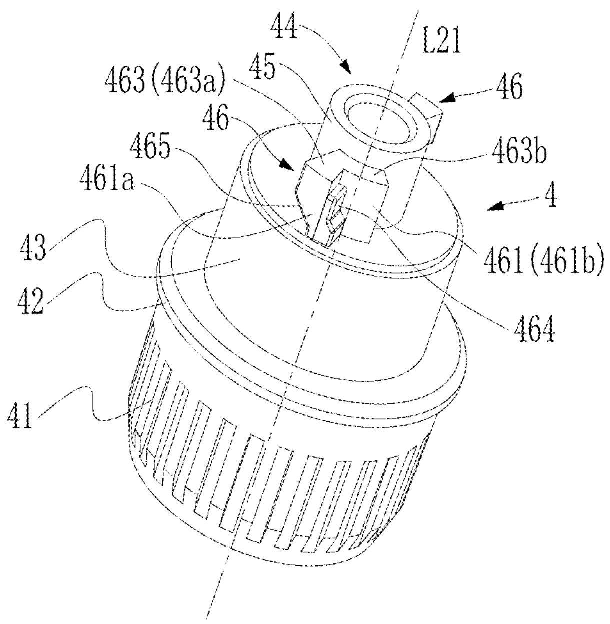
FIG. 11A is a stereogram of a driving force receiving member involved in Embodiment 6 of the present invention.
Figure 11B:
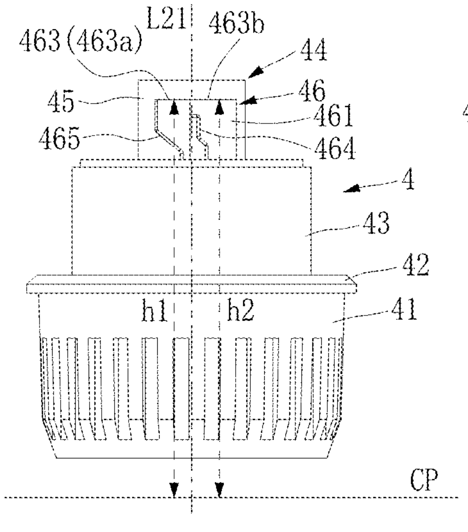
FIG. 11B is a side view of a driving force receiving member as viewed in a direction perpendicular to an axis of rotation of the driving force receiving member involved in Embodiment 6 of the present invention.
Figure 11C:
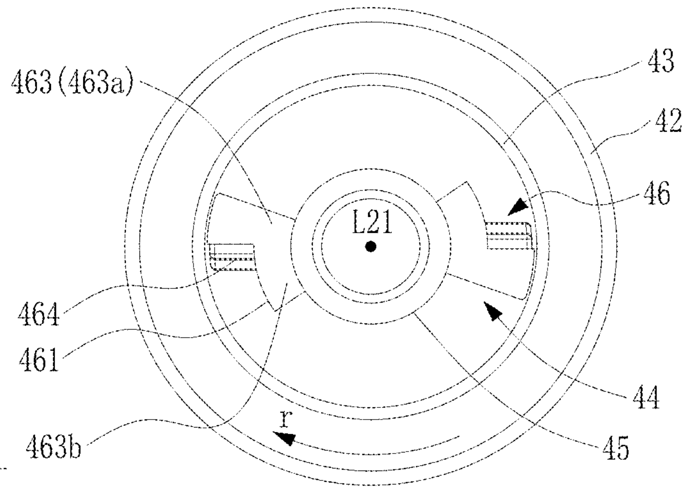
FIG. 11C is a side view of a driving force receiving member as viewed along an axis of rotation of the driving force receiving member involved in Embodiment 6 of the present invention.

As shown in FIG. 11A, FIG. 11B and FIG. 11C, an engaging portion 44 includes a central pillar 45 and driving force receiving portions 46 extending outwards in a radial direction of the central pillar 45, an axis of rotation L21 penetrates through the central pillar 45, and one or a plurality of driving force receiving portions 46 may be arranged in a circumferential direction of the central pillar 45; and furthermore, one or the plurality of driving force receiving portions 46 may further be appraised as formed by extending from a substrate 43 along the axis of rotation L21.

One driving force receiving portion 46 is taken as an example. The driving force receiving portion 46 includes a base 461 connected with the central pillar 45, a driving surface 464, a braking surface 465 and a contact surface 463, wherein the above surfaces are arranged on the base 461, and the driving surface 464 and the braking surface 465 are oppositely arranged in a direction of rotation of the driving force receiving member 4. When the driving force receiving member 4 is mounted towards an image forming apparatus with a process cartridge C, the contact surface 463 abuts against at least one of a coupling engaging portion 204*b* of a first braking engagement member 204 and a coupling engaging portion 208*b* of a second braking engaging member 208, so that the driving force receiving portion 46 reaches a position where a driving force output surface 180*d* is opposite to the driving surface 464, and when a force output member 203 rotates, the driving force receiving member 4/driving force receiving portion 46 rotates in the direction r shown in FIG. 11C.

The base 461 includes a first portion 461*a* and a second portion 461*b* which are adjacent in the direction of rotation of the driving force receiving member 4, wherein the driving surface 464 and the braking surface 465 are located on the first portion, the contact surface 463 extends from the first portion 461*a* and the second portion 461*b* at the same time, the first portion 461*a* projects farther than the second portion 461*b* in a radial direction of the driving force receiving member 4, and preferably, the first portion 461*a* and the second portion 461*b* are integrally formed.

In this embodiment, the contact surface 463 is formed as a tail end surface of the base 461, as shown in FIG. 11B, when viewed in a direction perpendicular to the axis of rotation L21, the contact surface 463 is perpendicular to the axis of rotation L21, specifically, in the direction of rotation of the driving force receiving member 4, the contact surface 463 includes a first contact surface 463*a* corresponding to the first portion 461*a* and a second contact surface 463*b* corresponding to the second portion 461*b*, and the first contact surface 463*a* and the second contact surface 463*b* are both perpendicular to the axis of rotation L21, so that the structure of the driving force receiving portion 46 may be simplified, which is conducive to improving the production efficiency of the driving force receiving portion 46 and the driving force receiving member 4 including the driving force receiving portion 46.

When the process cartridge C with the driving force receiving member 4 is mounted, the contact surface 463 abuts against a tail end of a braking portion 203*a* (first braking engaging member 204 and second braking engagement member 208), as the process cartridge C continues to be mounted, the braking portion 203*a* is pressed into the image forming apparatus, the first braking engagement member 204 disengages from a brake transmission member 207 in the patent application in the background art, the driving surface 464 reaches a position where the driving surface is opposite to a driving force output surface 180*d*, and the braking surface 465 is not opposite to the braking portion 203*a*. When the process cartridge C stops operating, the driving force output surface 180*d* does not output a driving force to the driving surface 464. In this embodiment, the contact surface 463 has the effect of pressing the braking portion 203*a* into the image forming apparatus and then guiding the driving force receiving member 4 to engage with the force output member, and therefore the contact surface 463 may also be referred to as a pressing surface or a guide surface. In the operating process of the process cartridge C, the braking portion 203*a* may be arranged either to apply a braking force to the braking surface 465, or not to apply the braking force to the braking surface 465.

When viewed in the direction perpendicular to the axis of rotation L21, the first contact surface 463*a* and the second contact surface 463*b* may be aligned or staggered, and when the two are staggered, a height difference will be formed between the first contact surface 463*a* and the second contact surface 463*b*. In the mounting process of the process cartridge C, the braking portion 203*a* is still pressed towards the inside of the image forming apparatus by the first contact surface 463*a* and the second contact surface 463*b*, however, since the first contact surface 463*a* and the second contact surface 463*b* are still arranged as planes perpendicular to the axis of rotation L21, the structure is still conducive to improving the production efficiency of the driving force receiving portion 46 and the driving force receiving member 4 including the driving force receiving portion 46 compared to an existing helical guide surface X463.

Preferably, when viewed in the direction perpendicular to the axis of rotation L21, the first contact surface 463*a* and the second contact surface 463*b* are aligned. More preferably, when viewed in the direction perpendicular to the axis of rotation L21, the first contact surface 463*a* and the second contact surface 463*b* are connected into a whole, that is, a tail end surface of the driving force receiving portion 46 is formed by the first contact surface 463*a* and the second contact surface 463*b* together, and the tail end surface is perpendicular to the axis of rotation L21. Based on that a process cartridge casing is located on a surface CP, farthest from a driving end C1, of a non-driving end C2, when measured along the axis of rotation L21, a distance between the first contact surface 463*a* and the surface CP is h1, a distance between the second contact surface 463*b* and the surface CP is h2, and h1=h2, so that the structure of the driving force receiving portion 46 can be simplified, which is conducive to improving the production efficiency of the driving force receiving portion 46 and the driving force receiving member 4 including the driving force receiving portion 46.

(Variant Structure 1)

Figure 12A:
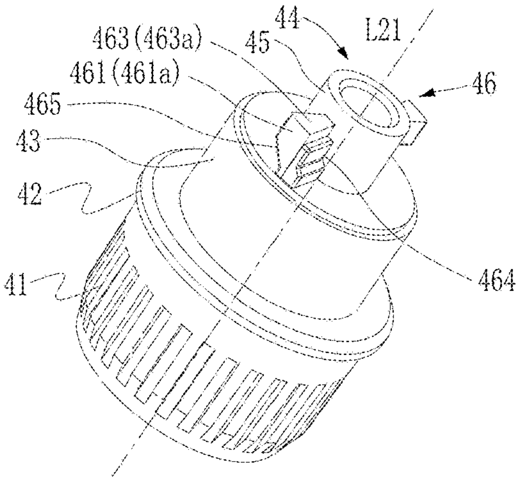
FIG. 12A is a stereogram of a variant structure of a driving force receiving member involved in Embodiment 6 of the present invention.
Figure 12B:
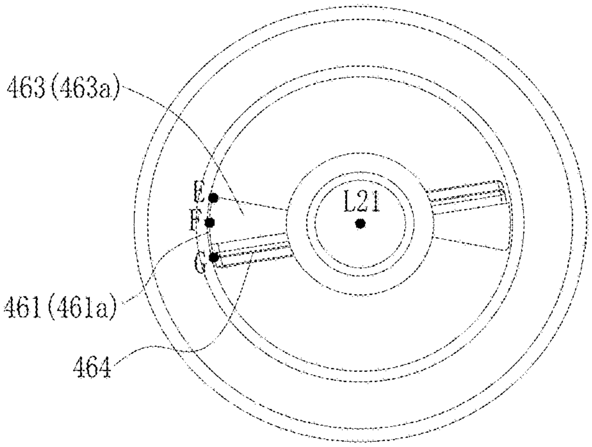
FIG. 12B is a side view of a driving force receiving member as viewed along an axis of rotation of the driving force receiving member shown in FIG. 12A.

As shown in FIG. 12A and FIG. 12B, the second portion 461*b* is cut off, the first portion 461*a* is retained, and thus the overall structure of the driving force receiving portion 46 is further simplified. Similarly, the tail end surface 463*a* of the first portion 461*a* is the contact surface along the axis of rotation L21, and the contact surface 463*a* is further perpendicular to the axis of rotation L21. The contact surface 463*a*, the driving surface 464 and the braking surface 465 all extend to a tail end of the base 461 in the radial direction of the driving force receiving portion 4. As shown in FIG. 12B, outermost points in the radial direction of the contact surface 463*a*, the braking surface 465 and the driving surface 464 are E, F and G respectively in the radial direction of the driving force receiving member 4, and distances between the axis of rotation L21 and the points E, F and G are equal, thereby improving the production efficiency of the driving force receiving portion 46 and the driving force receiving member 4 including the driving force receiving portion 46.

(Variant Structure 2)

Figure 13A:
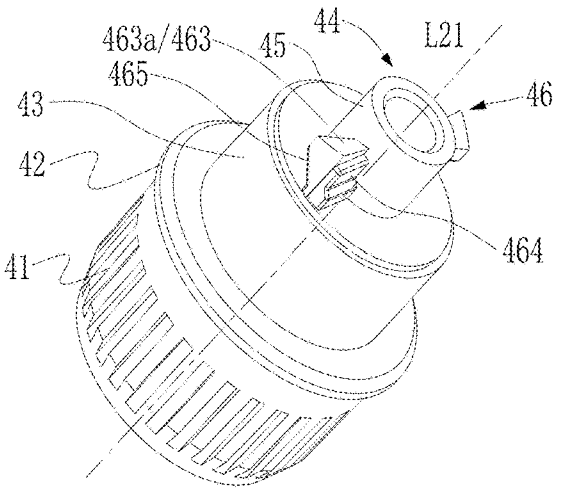
FIG. 13A is a stereogram of another variant structure of a driving force receiving member involved in Embodiment 6 of the present invention.
Figure 13B:
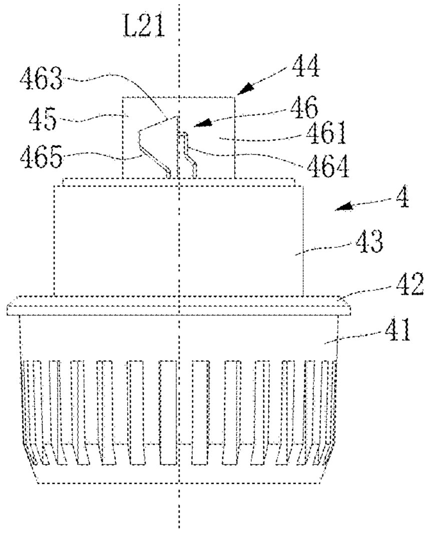
FIG. 13B is a side view of a driving force receiving member as viewed in a direction perpendicular to an axis of rotation of the driving force receiving member shown in FIG. 13A.

As shown in FIG. 13A and FIG. 13B, similar to the above variant structure 1, the tail end surface 463*a* of the first portion 461*a* is arranged not to be perpendicular to the axis of rotation L21, but to be a slope inclined relative to the axis of rotation L21 or a helical surface extending in the direction of rotation of the driving force receiving member 4, the tail end surface 463*a*, the driving surface 464 and the braking surface 465 all extend to the tail end of the base 461 in the radial direction of the driving force receiving member 4, and distances between the axis of rotation L21 and outermost points in the radial direction of the contact surface 463*a*, the braking surface 465 and the driving surface 464 respectively are equal, thereby improving the production efficiency of the driving force receiving portion 46 and the driving force receiving member 4 including the driving force receiving portion 46.

Embodiment 7

Figure 14A:
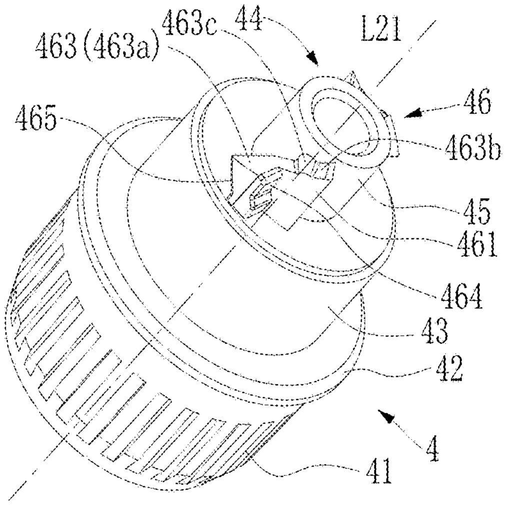
FIG. 14A is a stereogram of a driving force receiving member involved in Embodiment 7 of the present invention.
Figure 14B:
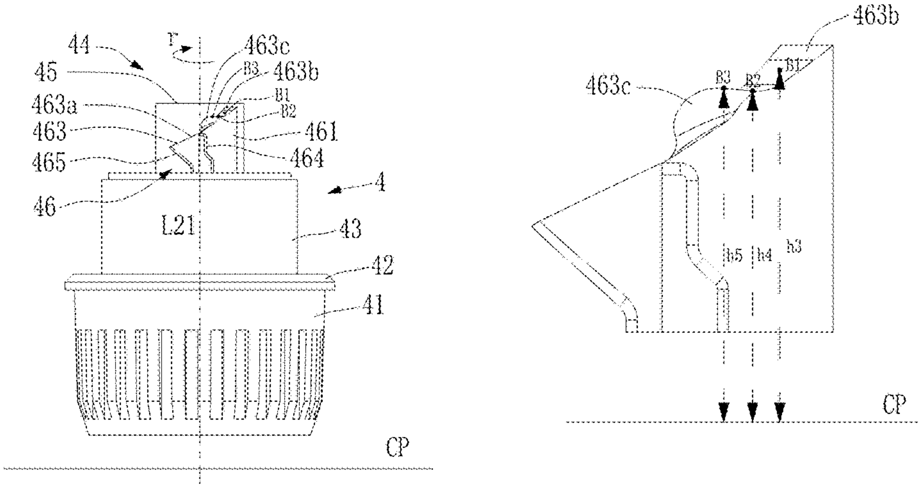
FIG. 14B is a side view of a driving force receiving member as viewed in a direction perpendicular to an axis of rotation of the driving force receiving member involved in Embodiment 7 of the present invention.

Different from the background art, each driving force receiving portion 46 in this embodiment further includes a projecting portion 463*c* arranged on a guide surface 463. As shown in FIG. 14A and FIG. 14B, when measured along an axis of rotation L21, a distance between the guide surface 463 and a certain fixing surface (such as a surface, perpendicular to the axis of rotation L21, of one of a substrate 43, a base tray 42 and a connecting portion 41) of a driving force receiving member 4 or a certain fixing surface (such as the above surface CP) of a process cartridge is no longer a fixed value or a gradient value, but is changed across dimensional scales with projecting of the projecting portion 463*c*. As shown in FIG. 14B, with the surface CP as a reference surface, a point B1, located on an upstream side of the projecting portion 463*c*, of the guide surface 463, a point B2 at an interaction between the upstream side of the projecting portion 463*c* and the guide surface 463, and a highest point B3 of the projecting portion 463*c* are selected in a direction of rotation r, the point B1 is located on a most upstream side of the direction of rotation r, the point B3 is located on a most downstream side of the direction of rotation r, and when viewed along the axis of rotation L21, a distance between the point B1 and the surface CP is h3, a distance between the point B2 and the surface CP is h4, a distance between the point B3 and the surface CP is h5, and h3>h5>h4. In the mounting process of the process cartridge C, the projecting portion 463*c* abuts against a braking portion 203*a*, thereby reducing friction force between the receiving force receiving member 4 and the braking portion 203*a* and then allowing the driving force receiving portion 46 to engage with a force output member 203 more easily. Meanwhile, the engaging speed of a braking surface 465 and a coupling engaging portion 204*b*/208*b* in the braking portion 203*a* can further be reduced by the projecting portion 463*c*, so that noise generated during engagement of the driving force receiving member 4 and the braking portion 203*a* can be reduced, as well as the braking portion 203*a* can be prevented from being damaged.

In the mounting process of the process cartridge C, under the condition that a driving portion 180*h* and the braking portion 203*a* get close to each other, the guide surface 463 is used for separating a driving force output surface 180*d* from the coupling engaging portion 204*b*/208*b* in the braking portion 203*a*, the driving force output surface 180*d* is opposite to a driving surface 464, and the coupling engaging portion 204*b*/208*b* is opposite to a braking surface 465. In the operating process of the process cartridge C, the driving force output surface 180*d* applies a driving force to the driving surface 464, when the process cartridge C stops operating, the driving force output surface 180*d* no longer outputs the driving force to the driving surface 464, the coupling engaging portion 204*b*/208*b* applies a braking force to the braking surface 465 on a downstream side in a direction of rotation of the driving force receiving portion 46, and the driving force receiving member 4/driving force receiving portion 46 stops rotating.

(Variant Structure)

Figure 15A:
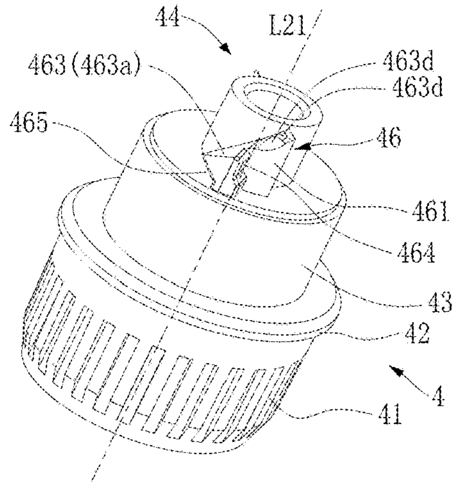
FIG. 15A is a stereogram of a variant structure of a driving force receiving member involved in Embodiment 7 of the present invention.
Figure 15B:
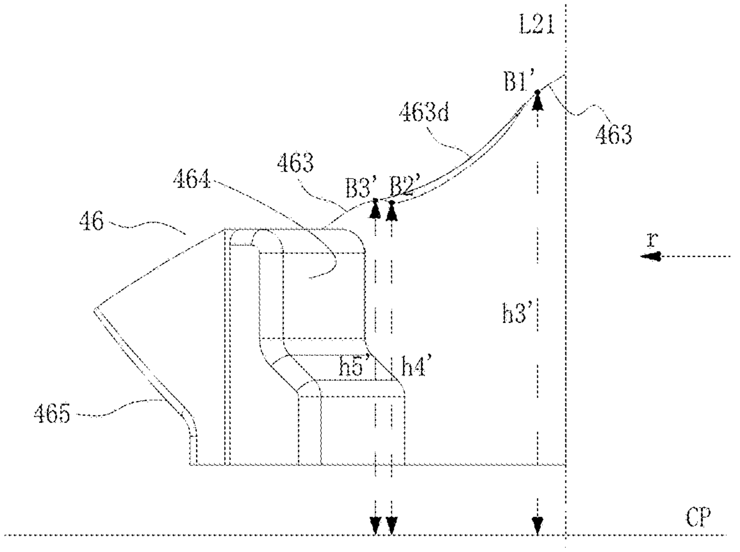
FIG. 15B is a side view of a driving force receiving portion as viewed in a direction perpendicular to an axis of rotation of the driving force receiving member involved in Embodiment 7 of the present invention.

In this variant structure, the projecting portion 463*c* projecting from the guide surface 463 is replaced with a recess 463*d*. When measured along the axis of rotation L21, a distance between the guide surface 463 and the certain fixing surface (such as the surface, perpendicular to the axis of rotation L21, of one of the substrate 43, the base tray 42 and the connecting portion 41) of the driving force receiving member 4 or the certain fixing surface (such as the above surface CP) of the process cartridge is no longer the fixed value or the gradient value, but is changed across dimensional scales with recessing of the recess 463*d*. As shown in FIG. 15A and FIG. 15B, with the surface CP as the reference surface, a point B1', located on an upstream side of the recess 463*d*, of the guide surface 463, a lowest point B2' of the recess 463*d*, and a point B3', located on a downstream side of the recess 463*d*, of the guide surface 463 are selected in the direction of rotation r, the point B1' is located on a most upstream side in the direction of rotation r, the point B3' is located on a most downstream side in the direction of rotation r, when measured along the axis of rotation L21, a distance between the point B1' and the surface CP is h3', a distance between the point B2' and the surface CP is h4', a distance between the point B3' and the surface CP is h5', and h3'>h5'>h4'.

Embodiment 8

Figure 16A:
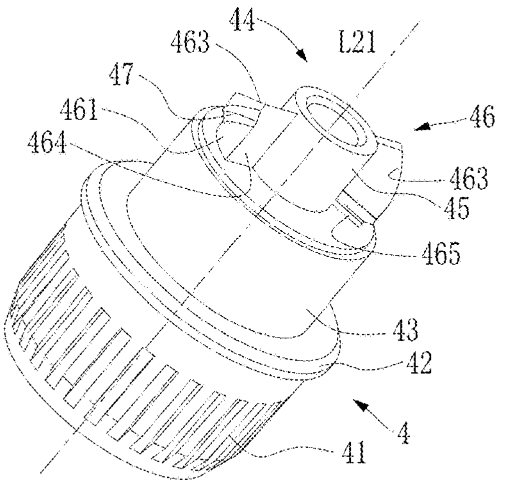
FIG. 16A is a stereogram of a driving force receiving member involved in Embodiment 8 of the present invention.
Figure 16B:
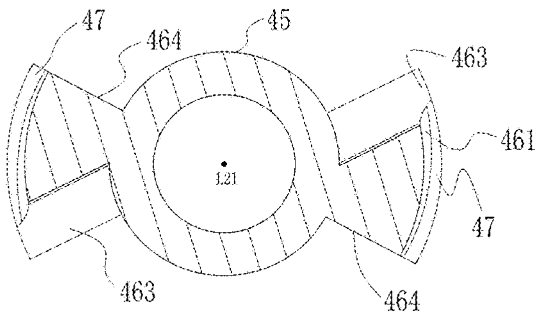
FIG. 16B is a sectional view after sectioning along a plane perpendicular to an axis of rotation in FIG. 16A and passing through a braking surface.

As shown in FIG. 16A and FIG. 16B, the present invention differs from the background art in that each driving force receiving portion 46 in this embodiment further includes a flange portion 47 located on a radial outer side of at least one of a driving surface 464 and a braking surface 465. Preferably, the flange portion 47 extends outwards along a radial outer side of a guide surface 463, a surface, away from a substrate 43/base tray 42/connecting portion 41, of the flange portion 47 and the guide surface 463 are coplanar along an axis of rotation L21, and therefore at least one part of the guide surface 463 may further be appraised as located on the radial outer side of at least one of the driving surface 464 and the braking surface 465.

When a process cartridge C with the driving force receiving portion 46/driving force receiving member 4 in this embodiment is mounted towards an image forming apparatus, a coupling engaging portion 204*b*/208*b* in a braking portion 203*a* can more easily reach a position where the coupling engaging portion 204*b*/208*b* is opposite to the braking surface 465 by engaging with the flange portion 47.

Embodiment 9

Figure 17:
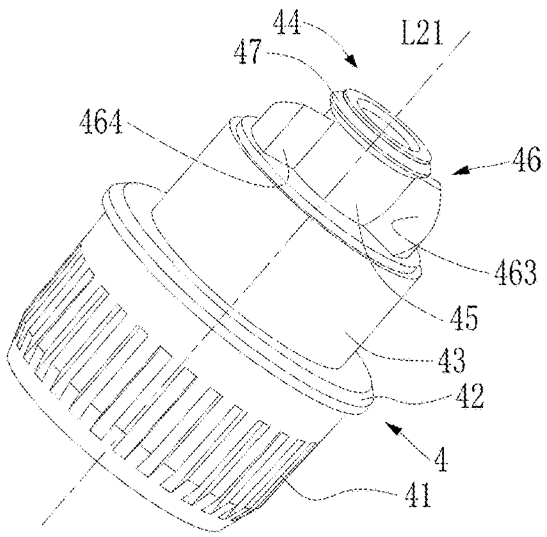
FIG. 17 is a stereogram of a driving force receiving member involved in Embodiment 9 of the present invention.

As shown in FIG. 17, in this embodiment, the above braking surface 465 is omitted. As shown in the figure, each driving force receiving portion 46 only has a driving surface 464 and a guide surface 463, and the guide surface 463 helically extends upward from a substrate 43. When a process cartridge C with the driving force receiving portion 46/driving force receiving member 4 is mounted to an image forming apparatus, the guide surface 463 may further be opposite to a coupling engaging portion 204*b*/208*b* of a braking portion 203*a* to achieve the same effect as a braking surface 465, so that the structure of the driving force receiving portion 46 is simplified, which is conducive to improving the production efficiency of the driving force receiving portion 46 and the driving force receiving member 4 including the driving force receiving portion 46.

Furthermore, a flange portion 47 is arranged on an outer circumference of a central pillar 45, or the flange portion 47 projects radially and outwards from the outer circumference of the central pillar 45. Preferably, the flange portion 47 is located at a free tail end 451 (end away from a connecting portion 41) of the central pillar 45 along an axis of rotation L21. When viewed in a direction perpendicular to the axis of rotation L21, the driving force receiving portion 46 does not misalign with the flange portion 47, and a projecting dimension of the flange portion 47 does not go beyond a dimension of a base 461/driving surface 464/guide surface 463 in a radial direction of the driving force receiving member 4. When the driving force receiving member 4 with such structure engages with a force output member 203, the coupling engaging portion 204*b*/208*b* of the braking portion 203*a* hooks the flange portion 47 to achieve engagement of the driving force receiving member 4 and the force output member 203, which can effectively prevent the driving surface 464 of the driving force receiving member 4 from disengaging from a driving force output surface 180*d* of the force output member 203, thereby ensuring that the driving force receiving member 4 can stably receive a driving force from the force output member.

(Variant Structure)

Figure 18:
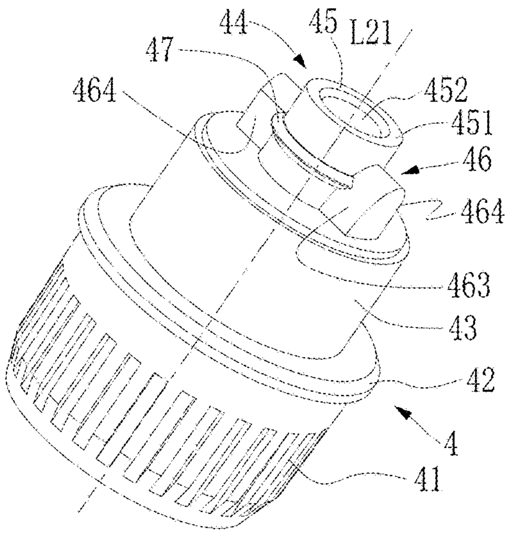
FIG. 18 is a stereogram of a variant structure of a driving force receiving member involved in Embodiment 9 of the present invention.
Figure 19:
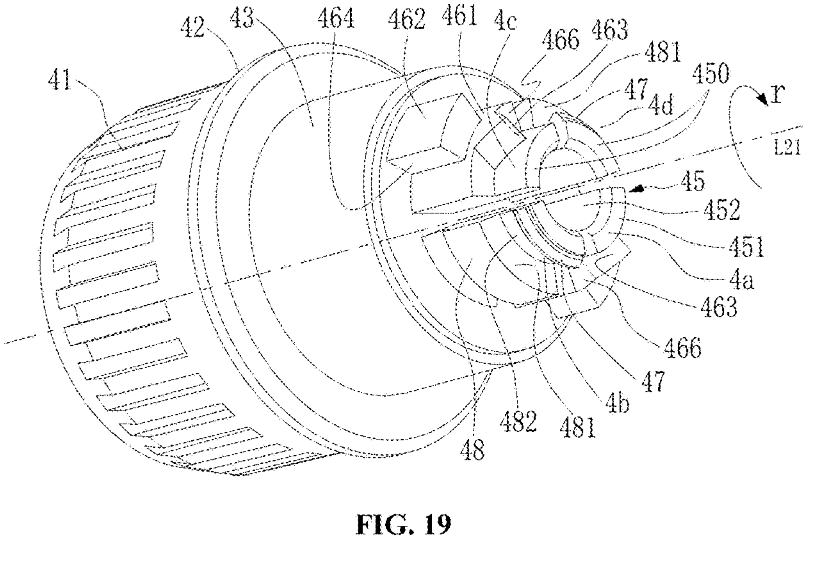
FIG. 19 is a stereogram of a driving force receiving member involved in Embodiment 10 of the present invention.

As shown in FIG. 18, in the variant structure, the flange portion 47 is arranged towards a position where the flange portion gets close to the connecting portion 41 (position away from the free tail end 451 of the central pillar) along the axis of rotation L21 relative to the free tail end 451 of the central pillar 45, and the projecting dimension of the flange portion 47 does not go beyond the dimension of the base 461/driving surface 464/guide surface 463 in the radial direction of the driving force receiving member 4.

Figure 51:
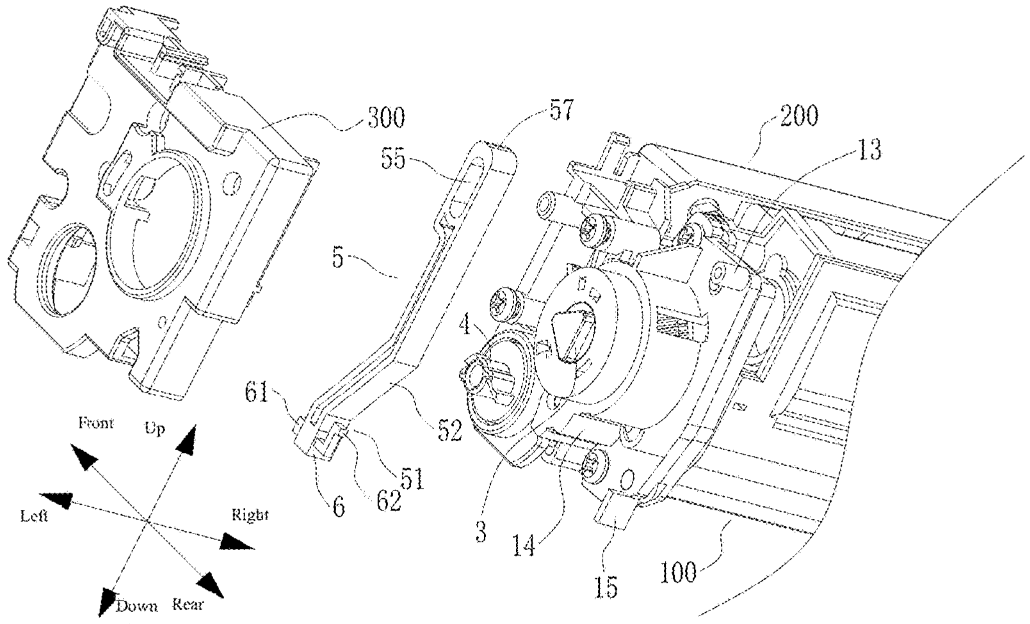
FIG. 51 is a schematic decomposition diagram of a third separation contact mechanism in a process cartridge and a process cartridge casing involved in the present invention.

As shown in FIGS. 44A and 44B in the patent application in the background art, besides the above driving portion 180*h* and braking portion 203*a*, the force output member 203 further has a positioning pillar (positioning boss) 180*i* located in the driving portion 180*h*. When the driving force receiving member 4 engages with the force output member, as shown in FIG. 51 in the patent application in the background art, the positioning pillar 180*i* located on the force output member enters a positioning hole 452 of the central pillar 45, and the flange portion 47 will gradually get close to the braking portion 203*a* with the driving force receiving portion 46 till the coupling engaging portion 204*b*/208*b* hooks the flange portion 47, so that the flange portion 47 is arranged towards the position where the flange portion gets close to the connecting portion 41 to allow the coupling engaging portion 204*b* to more compactly engage with the flange portion 47, the driving surface 464 can be more effectively prevented from disengaging from the driving force output surface 180*d*, and the driving force receiving member 4 can more stably receive the driving force from the force output member accordingly.

Embodiment 10

As shown in FIG. 19, FIG. 20A, FIG. 20B and FIG. 20C, a driving force receiving member 4 in this embodiment is arranged such that at least one part of an engaging portion 44 may move in a direction intersecting with an axis of rotation L21. As shown in the figures, when viewed from the engaging portion 44 to a connecting portion 41 along the axis of rotation L21 of the driving force receiving member, the driving force receiving member 4 can rotate around the axis of rotation L21 in a direction r (clockwise direction), and the engaging portion 44 is divided into a plurality of sub-engaging portions spaced from one another in the direction of rotation r.

An example of arranging four sub-engaging portions is taken. A first sub-engaging portion 4*a*, a second sub-engaging portion 4*b*, a third sub-engaging portion 4*c* and a fourth sub-engaging portion 4*d* are sequentially arranged in the direction of rotation r, wherein the first sub-engaging portion 4*a* and the third sub-engaging portion 4*c* are radially opposite, the second sub-engaging portion 4*b* and the fourth sub-engaging portion 4*d* are radially opposite, and a part of at least one of the second sub-engaging portion 4*b* and the fourth sub-engaging portion 4*d* is arranged to be capable of moving relative to the first sub-engaging portion 4*a* and the third sub-engaging portion 4*c*. Each sub-engaging portion includes a part of a central pillar 45. The first sub-engaging portion 4*a* and the third sub-engaging portion 4*c* may also be referred to as fixed engaging portions, the second sub-engaging portion 4*b* and the fourth sub-engaging portion 4*d* may also be referred to as movable engaging portions, and the movable engaging portions can move relative to the fixed engaging portions.

Preferably, structures of the first sub-engaging portion 4*a* and the third sub-engaging portion 4*c* are the same, and structures of the second sub-engaging portion 4*b* and the fourth sub-engaging portion 4*d* are the same. The fixed engaging portions and the movable engaging portions are formed by extending from the connecting portion 41/base tray 42/substrate 43, wherein the movable engaging portions are arranged as cantilevers formed by extending from the connecting portion 41/base tray 42/substrate 43, for example, dimensions of joints of the movable engaging portions and the connecting portion 41/base tray 42/substrate 43 are less than those of joints of the fixed engaging portions and the connecting portion 41/base tray 42/substrate 43 in a radial direction of the driving force receiving member 4. More preferably, the fixed engaging portions and the movable engaging portions are formed by extending from a side, away from the connecting portion 41, of the substrate 43.

Each fixed engaging portion includes a base plate 450, a base 461 and a convex block 462, the base plate 450, the base 461 and the convex block 462 are sequentially arranged and gradually away from the axis of rotation L21 in a radial direction perpendicular to the axis of rotation L21, the base plate 450 is a part of the central pillar 45, a guide surface 463 is arranged on the base 461, a driving surface 464 is arranged on the convex block 462, the driving surface 464 is located on an upstream side of the guide surface 463 in the direction of rotation r, and an abutting surface 466 is further formed on the base 461 along the axis of rotation L21. Each movable engaging portion includes a base plate 450, and a flange portion 47 and a pressing portion 48 which are arranged on the base plate 450, the pressing portion 48 extends from the base plate 450 in a direction away from the axis of rotation L21, and a pressing surface 481 is formed at an end away from the connecting portion 41. The flange portion 47 in this embodiment also has the effect of preventing the driving force receiving member 4 from disengaging from a force output member 203, so that the flange portion 47 may be appraised as an embodiment of an anti-disengaging portion, and specifically, the flange portion 47 in this embodiment is arranged to be formed by projecting outwards in a radial direction of a free tail end (free tail end of the central pillar) 451 of the base plate 450.

Preferably, when viewed in the direction perpendicular to the axis of rotation L21, the abutting surface 466 is basically flush with the pressing surface 481 and perpendicular to the axis of rotation L21, furthermore, the abutting surface 466 and the pressing surface 481 are both separated from the free tail end 451 of the central pillar along the axis of rotation L21, or the abutting surface 466 and the pressing surface 481 are closer to the connecting portion 41 than the free tail end 451 of the central pillar, and a limiting space 482 is formed between the pressing surface 481 and the free tail end 451 of the central pillar.

In order to more clearly describe the engaging process of the driving force receiving member 4 and the force output member 203, a part of the force output member 203 in this embodiment and the following embodiment is cut off, so that a driving portion 180*h* and a braking portion 203*a* are both exposed.

Figure 20A:
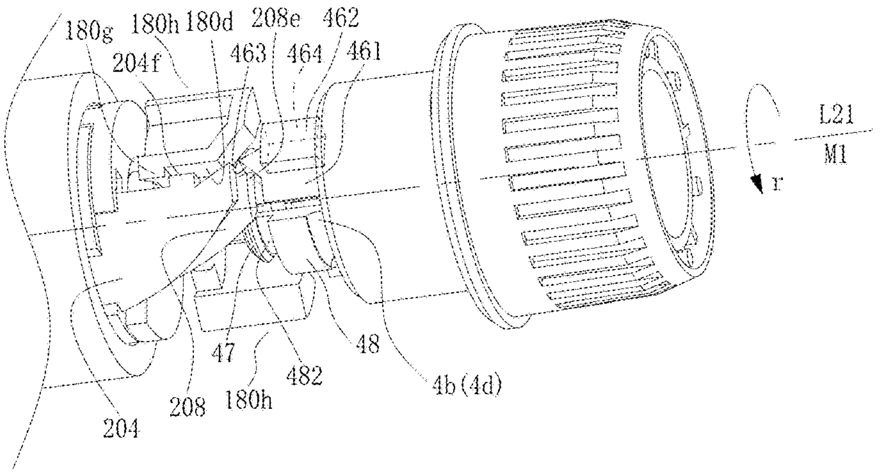
FIG. 20A is a stereogram showing that a driving force receiving member starts to engage with a force output member involved in Embodiment 10 of the present invention.
Figure 20B:
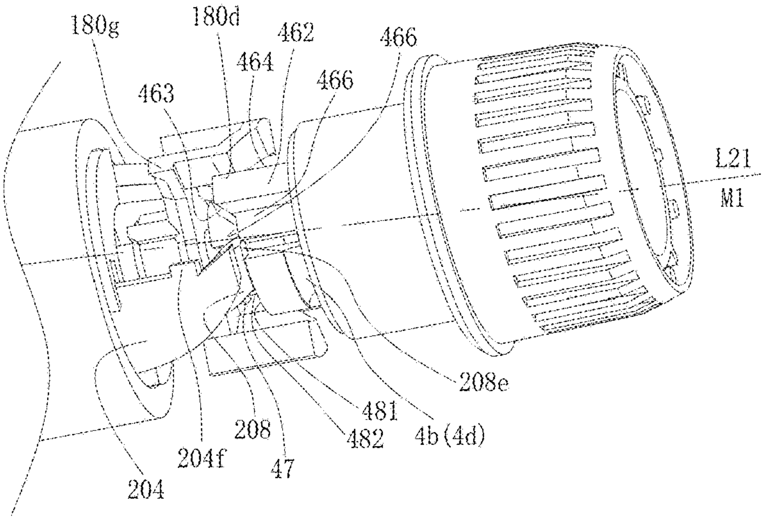
FIG. 20B is a stereogram after engagement of a driving force receiving member with a force output member involved in Embodiment 10 of the present invention.
Figure 20C:
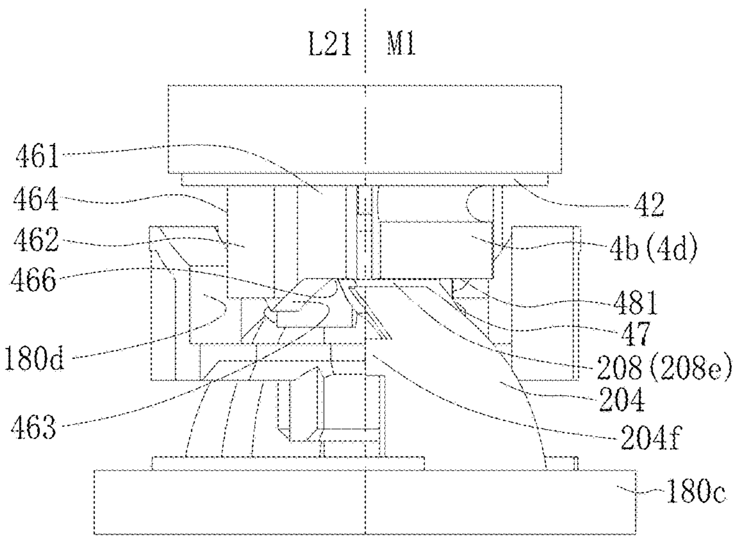
FIG. 20C is a side view as viewed in a direction perpendicular to an axis of rotation of a driving force receiving member after engagement of the driving force receiving member with a force output member involved in Embodiment 10 of the present invention.

As shown in FIG. 20A, FIG. 20B and FIG. 20C, when the driving force receiving member 4 gradually gets close to the force output member 203 along the axis of rotation L21 with a process cartridge C, the guide surface 463 starts to abut against an inward projection 208*e* of a second braking engagement member 208, and as the process cartridge C continues to be mounted, the second braking engagement member 208 starts to be guided by the guide surface 463 in the direction of rotation r, so that a first braking engagement member 204 will also move in the direction of rotation r, that is, the whole braking portion 203*a* is gradually away from the driving portion 180*h* in the direction of rotation r, meanwhile, an upper projecting portion 204*f* and a lower projecting portion 180*g* are no longer opposite, but are gradually staggered along the axis of rotation L21, the whole braking portion 203*a* further retracts (retracted state) into a cylindrical portion 180*c*, and thus the driving portion 180*h* cannot be driven by the braking portion 203*a* to retract into the cylindrical portion 180*c*.

As the driving portion 180*h* is separated from the braking portion 203*a*, the convex block 462, in the direction of rotation r, migrates into a position between the driving portion 180*h* and the braking portion 203*a*. In this configuration, a driving force output surface 180*d* is located opposite to the driving surface 464. The braking portion 203*a* (second braking engagement member 208) at least abuts against the abutting surface 466 to be kept in the retracted state, and the driving force receiving member 4 engages with the force output member 203; and when the driving portion 180*h* starts to rotate, the driving force output surface 180*d* outputs a driving force to the driving surface 464, and the driving force receiving member 4 starts to rotate around the axis of rotation L21.

It should be noted that during engagement of the driving force receiving member 4 with the force output member 203, if the braking portion 203*a* (second braking engagement member 208) slides over the abutting surface 466 after being guided by the guide surface 463 to reach a position where the braking portion is opposite to the pressing surface 481, the braking portion 203*a* (second braking engagement member 208) can still be kept in the retracted state, that is, the pressing surface 481 has the effect of preventing the braking portion 203*a* (second braking engagement member 208) from extending from the retracted state and restoring to an initial state (extended state).

In this embodiment, the braking portion 203*a* is kept in the retracted state, in the operating process of the process cartridge, the braking portion 203*a* no longer outputs a braking force to the driving force receiving member 4, and in the process where the process cartridge is taken out, a friction force between the braking portion 203*a* and the driving force receiving member 4 can be reduced. Furthermore, during engagement of the driving force receiving member 4 with the force output member 203, the movable engaging portion is pressed by the braking portion 203*a* (second braking engagement member 208) to deform in a direction close to the axis of rotation L21 till the inward projection 208*e* passes over the flange portion 47 to enter the limiting space 482, and a positioning pillar 180*i* of the driving portion enters a positioning hole 452 of the central pillar 45, then the movable engaging portion is reset, and the inward projection 208*e* engages (is clamped) with the flange portion 47. Meanwhile, the positioning pillar 180*i* further pushes/extrudes the central pillar 45/base plate 450 in the direction away from the axis of rotation L21, the first braking engagement member 204 is stably positioned in the driving force receiving member 4 along an axis M1, the first braking engagement member 204 compactly engages with the flange portion 47, potential axial movement of the force output member 203 is restricted, and the force output member 203 cannot retract in the direction away from the driving force receiving member 4, but disengages from the driving force receiving member 4. It can be shown that the movable engaging portion in this embodiment can swing between being close to the axis of rotation L21 and being away from the axis of rotation L21 relative to the fixed engaging portion, meanwhile, the inward projection 208*e* is further kept to abut against the abutting surface 466, and the force output member 203 and the driving force receiving member 4 can be kept to stably engage with each other.

Embodiment 11

Figure 21A:
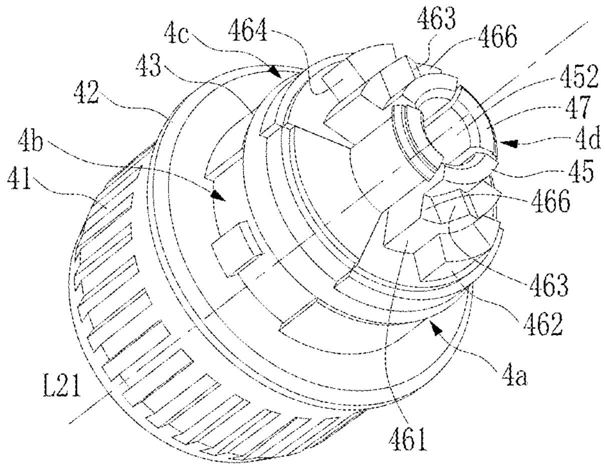
FIG. 21A is a stereogram of a driving force receiving member involved in Embodiment 11 of the present invention.
Figure 21B:
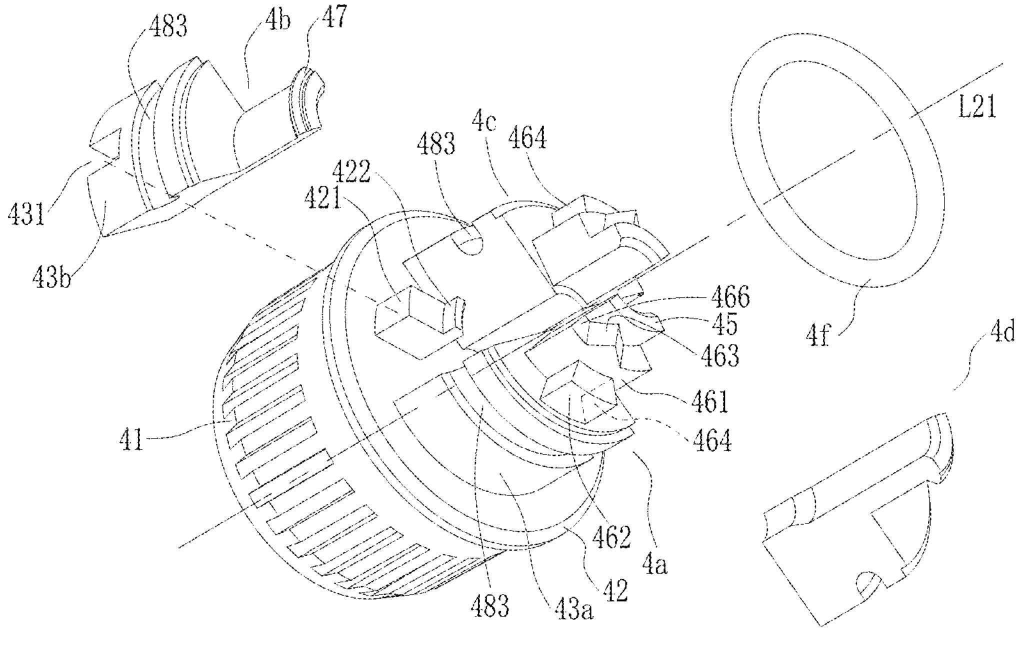
FIG. 21B is a schematic decomposition diagram of a driving force receiving member involved in Embodiment 11 of the present invention.
Figure 22:
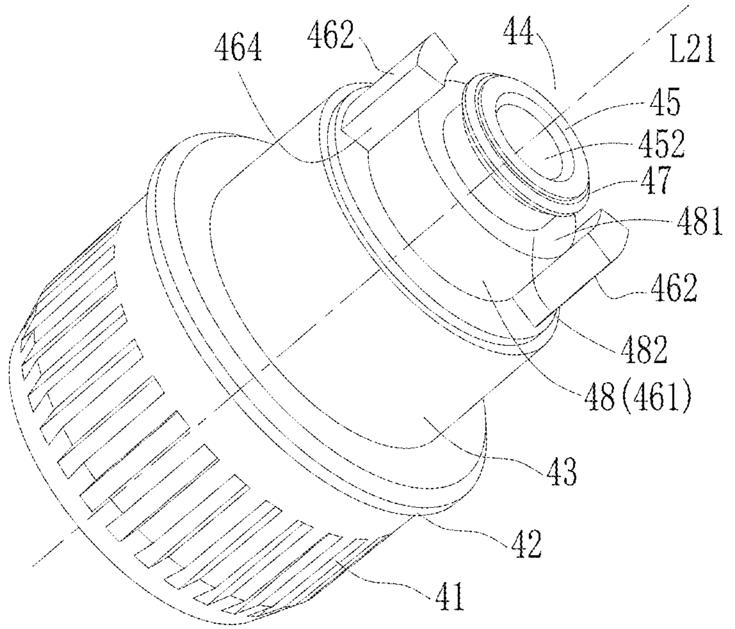
FIG. 22 is a stereogram of a driving force receiving member involved in Embodiment 12 of the present invention.

As shown in FIG. 21A and FIG. 21B, a driving force receiving member 4 in this embodiment still includes a fixed engaging portion and a movable engaging portion. This embodiment differs from Embodiment 10 in that the movement manner of the movable engaging portion in this embodiment is arranged as sliding, specifically, the movable engaging portion can slide in a direction intersecting with an axis of rotation L21 relative to the fixed engaging portion, and preferably, the sliding direction of the movable engaging portion is perpendicular to the axis of rotation L21.

As shown in the figures, a substrate 43 in this embodiment is also cut, that is, the fixed engaging portion and the movable engaging portion in this embodiment further include a part of the substrate 43. In order to facilitate the understanding, the substrate located in the fixed engaging portion is referred to as a first substrate 43*a*, the substrate located in the movable engaging portion is referred to as a second substrate 43*b*, a base 461 and a convex block 462 are both located above (direction away from a connecting portion 41) the first substrate 43*a*, a part of a central pillar 45 extends upward from the second substrate 43*b*, a flange portion 47 is located at a free tail end of the central pillar 45, the second substrate 43*b* further has a guided portion 431, a base tray 42 has a guide 421, and the movable engaging portion can slide in the direction intersecting with the axis of rotation L21 through the cooperation between the guide 421 and the guided portion 431. Preferably, the guided portion 431 is arranged as a guided recess, the guide 421 is guided as a guiding projection, and at least one of the guided recess 431 and the guiding projection further has a restricting projection 422 for restricting the movable engaging portion from moving close to the axis of rotation L21.

In some embodiments, positions of the guided recess and the guiding projection further may be exchanged.

In some embodiments, an anti-disengaging portion is arranged to prevent the movable engaging portion from moving away from the axis of rotation L21, the anti-disengaging portion and a restricting projection 422 jointly restrict the movement range of the movable engaging portion in a radial direction of the driving force receiving member 4, on one hand, the driving force receiving member 4 more stably engages with a force output member 203, and on the other hand, the driving force receiving member 4 can more easily disengages from the force output member 203. As shown in FIG. 21B, the substrate 43 has a mounting portion 483 used for engaging with the anti-disengaging portion 4*f*, preferably, the anti-disengaging portion 4*f* is an elastic member sleeving an outer surface of the substrate 43, the mounting portion 483 is a mounting groove formed in the substrate 43, the anti-disengaging portion 4*f* is mounted in the mounting groove 483, when the movable engaging portion is propelled by an acting force (such as a pushing force applied by a following pushing member) to move away from the axis of rotation L21, the movable engaging portion propels the elastic member to elastically deform, and when the acting force is withdrawn, the elastic member pushes the movable engaging portion to move close to the axis of rotation L21.

In some embodiments, the driving force receiving member 4 is further provided with the pushing member for pushing the movable engaging portion away from the axis of rotation L21, preferably, the pushing member is arranged as the elastic member with elasticity, when the driving force receiving member 4 has engaged with the force output member 203, a positioning pillar 180*i* of a driving portion enters a positioning hole 452 of the central pillar 45, the pushing member elastically deforms to generate the pushing force away from the axis of rotation L21, under the action of the pushing force of the pushing member, the flange portion 47 can more compactly engage with an inward projection 208*e* of a second braking engagement member, potential axial movement of the force output member 203 is stopped, and the force output member 203 cannot retract away from the driving force receiving member 4, but disengages from the driving force receiving member 4. When a process cartridge needs to be taken out, as the driving force receiving member 4 is pulled away from the force output member 203, the inward projection 208*e* extrudes the flange portion 47 to overcome the pushing force of the pushing member, the movable engaging portion moves close to the axis of rotation L21 till the inward projection 208*e* disengages from the flange portion 47, and then the pushing member propels the movable engaging portion to move away from the axis of rotation L21 again.

Similar to Embodiment 10, the positioning pillar 180*i* entering the positioning hole 452 also can achieve the effect of extruding/pushing the movable engaging portion away from the axis of rotation L21, so that the flange portion 47 can also compactly engage with the inward projection 208*e* even when there is no elastic member, and it can be shown that the positioning pillar 180*i* may also be appraised as a type of the pushing member.

Embodiment 12

As shown in FIG. 22, FIG. 23A, FIG. 23B and FIG. 23C, an engaging portion 44 includes a central pillar 45, a base 461 and a convex block 462. The central pillar 45, the base 461 and the convex block 462 are sequentially located away from an axis of rotation L21 in a radial direction perpendicular to the axis of rotation L21 of a driving force receiving member. In this embodiment, the base 461 extends around an outer circumferential surface of the central pillar 45, that is, enclosing the central pillar 45, so that the base 461 may further be appraised as a pressing portion 48, and a tail end surface of the base 461 is a pressing surface 481. The convex block 462 extends further away from a connecting portion 41 than the base 461 along the axis of rotation L21, that is, the convex block 462 exceeds the pressing surface 481, and meanwhile a driving surface 464 for receiving a driving force is further formed on the convex block 462.

Furthermore, the engaging portion 44 further includes an anti-disengaging portion arranged on the central pillar 45, preferably, the anti-disengaging portion is a flange portion 47 arranged at a free tail end of the central pillar 45, and a limiting space 482 is formed between the flange portion 47 and the pressing surface 481 along the axis of rotation L21.

Figure 23A:
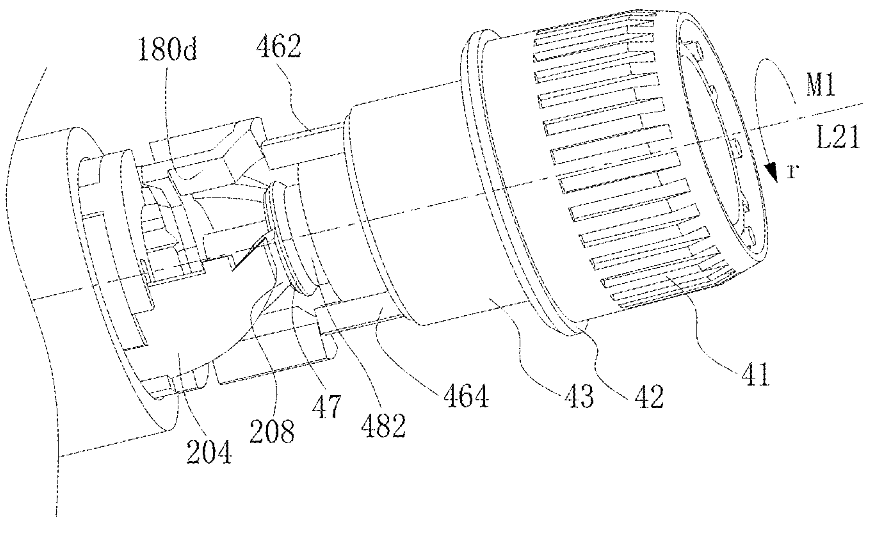
FIG. 23A is a stereogram showing that a driving force receiving member starts to engage with a force output member involved in Embodiment 12 of the present invention.
Figure 23B:
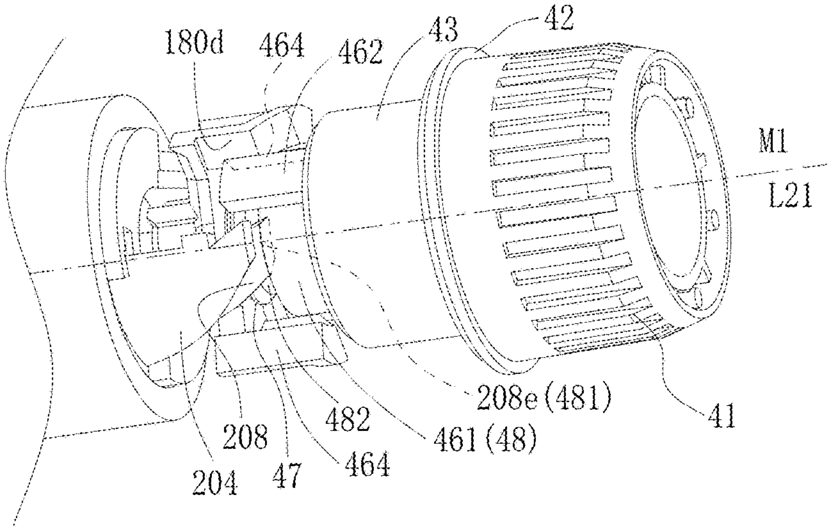
FIG. 23B is a stereogram after engagement of a driving force receiving member with a force output member involved in Embodiment 12 of the present invention.
Figure 23C:
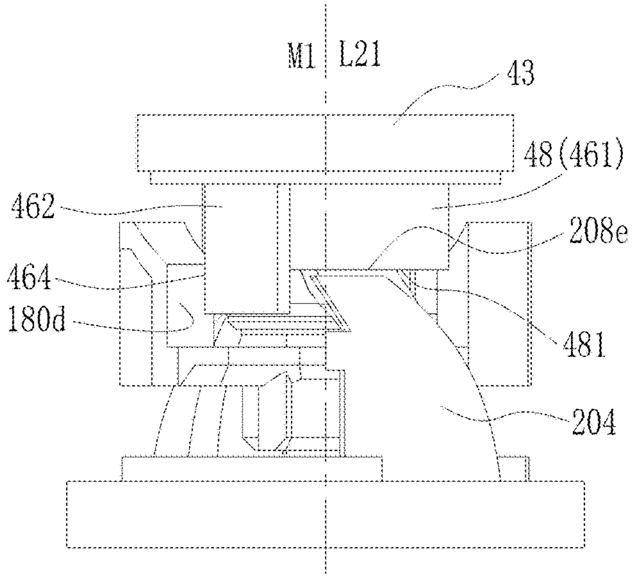
FIG. 23C is a side view as viewed in a direction perpendicular to an axis of rotation of a driving force receiving member after engagement of the driving force receiving member with a force output member involved in Embodiment 12 of the present invention.
Figure 24:
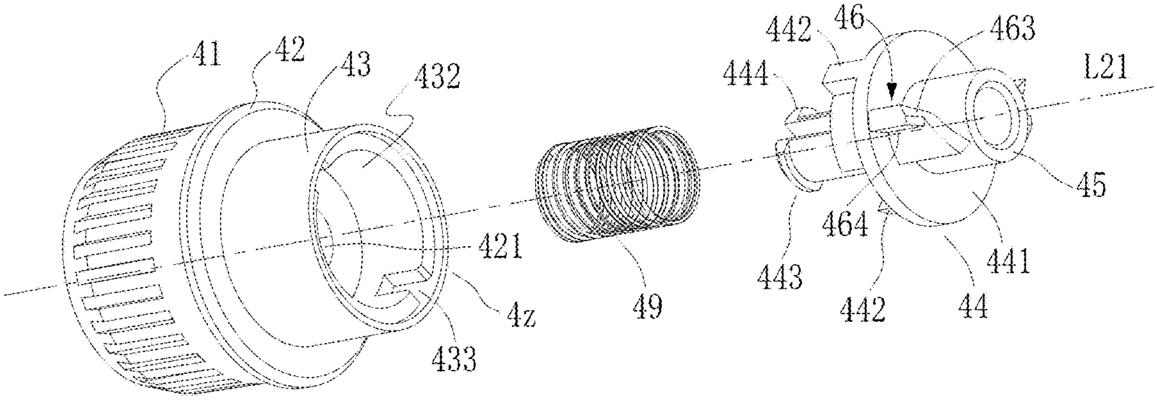
FIG. 24 is a schematic decomposition diagram of a driving force receiving member involved in Embodiment 13 of the present invention.
Figure 25A:
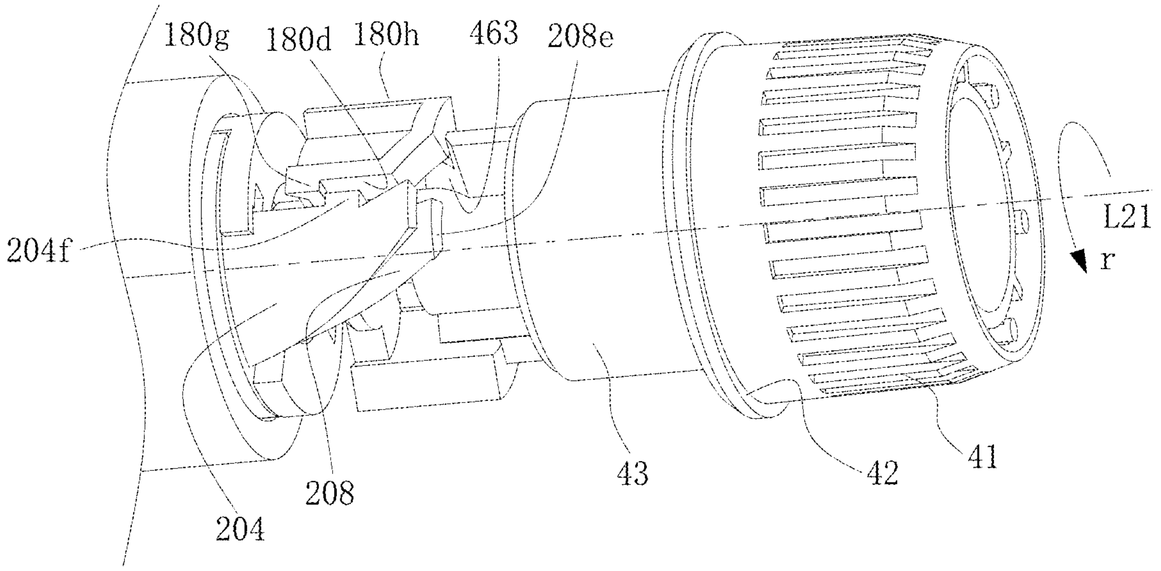
FIG. 25A is a stereogram showing that a driving force receiving member starts to engage with a force output member involved in Embodiment 13 of the present invention.
Figure 25B:
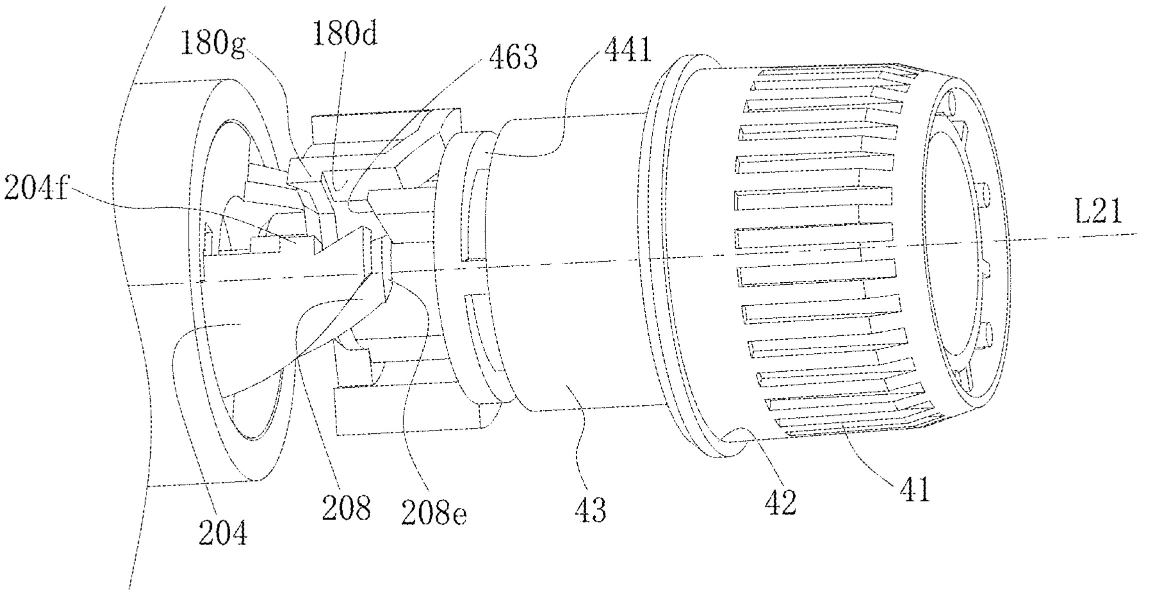
FIG. 25B is a stereogram after engagement of a driving force receiving member with a force output member involved in Embodiment 13 of the present invention.
Figure 25C:
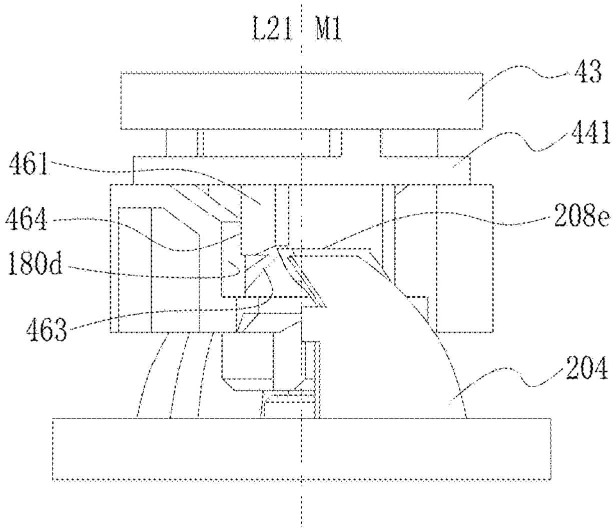
FIG. 25C is a side view as viewed in a direction perpendicular to an axis of rotation of a driving force receiving member after engagement of the driving force receiving member with a force output member involved in Embodiment 13 of the present invention.
Figure 26:
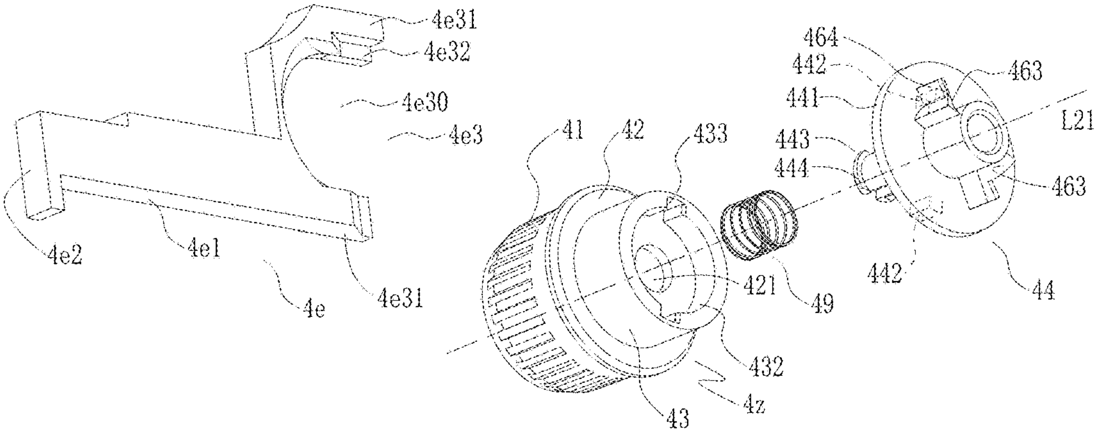
FIG. 26 is a schematic decomposition diagram of a driving force receiving member involved in Embodiment 14 of the present invention.

As shown in FIG. 23A, before the driving force receiving member 4 engages with a force output member 203, a driving portion 180*h* is separated from a braking portion 203*a* in a direction of rotation r, the engaging portion 44 does not need to have a guide surface for separating the braking portion 203*a* from the driving portion 180*h*, and therefore the structure of the engaging portion 44 can be simplified.

When the driving force receiving member 4 engages with the force output member 203, the braking portion 203*a* (inward projection 208*e* of second braking engagement member) is firstly pressed by the flange portion 47 to retract. As a process cartridge C is mounted, the inward projection 208*e* of the second braking engagement member extrudes the flange portion 47 mutually and finally passes over the flange portion 47 to enter the limiting space 482, similarly, a positioning pillar 180*i* of the driving portion enters a positioning hole 452 of the central pillar 45, the braking portion 203*a* (inward projection 208*e* of second braking engagement member) is pressed by the pressing surface 481 and cannot extend out, the inward projection 208*e* engages with the flange portion 47, potential axial movement of the force output member 203 is stopped, and the force output member 203 cannot retract away from the driving force receiving member 4, but becomes disengaged from the driving force receiving member 4. The convex block 462 enters a position between the driving portion 180*h* and the braking portion 203*a*, a driving force output surface 180*d* is opposite to the driving surface 464, and the driving force receiving member 4 has engaged with the force output member 203. As the driving portion 180*h* starts to rotate in the direction r, the driving force output surface 180*d* outputs the driving force to the driving surface 464, the driving force receiving member 4 also rotates in the direction r, and the braking portion 203*a* will no longer output a braking force to the driving force receiving member 4.

Embodiment 13

As shown in FIG. 24, FIG. 25A, FIG. 25B and FIG. 25C, in this embodiment, an engaging portion 44 is arranged to be capable of moving relative to a second rotating member/photosensitive drum 21 or a connecting portion 41 along an axis of rotation L21, that is, the engaging portion 44 can move between a position (retracted state of engaging portion) where the engaging portion gets close to the connecting portion 41 and a position (extended state of engaging portion) where it moves away from the connecting portion 41.

As shown in the figures, the engaging portion 44 and a substrate 43 are formed in a split manner, a driving force receiving member 4 further includes a movable cavity 432 formed inside the substrate 43 and a holding member 49 for keeping the engaging portion 44 at a position where the engaging portion moves away from the second rotating member/photosensitive drum 21 or the connecting portion 41, and the holding member 49 is preferably arranged as a compression spring. At this moment, the driving force receiving member 4 may be split into an engaged portion 4*z* including the connecting portion 41, a base tray 42 and the substrate 43, the engaging portion 44, and the holding member 49 located between the engaged portion and the engaging portion, wherein the engaging portion and the engaged portion 4*z* are formed in a split manner. The engaged portion 4*z* is used for transmitting a driving force received by the engaging portion 44, and the holding member 49 is used for pushing the engaging portion 44 away from the engaged portion 4*z* along the axis of rotation L21. The engaging portion 44 includes a bottom plate 441, a central pillar 45 and driving force receiving portions 46 which extend from one side of the bottom plate 441, and a driving force transmitting portion 442 extending from the other side of the bottom plate 441. Along the axis of rotation L21, the central pillar 45 and each driving force receiving portion 46 extends away from the connecting portion 41, and the driving force transmitting portion 442 extends close to the connecting portion 41.

Each driving force receiving portion 46 still has a guide surface 463 and a driving surface 464, wherein when the driving force receiving member 4 engages with a force output member 203, the guide surface 463 is used for propelling a braking portion 203*a* to rotate relative to a driving portion 180*h* so that the braking portion 203*a* and the driving portion 180*h* can be separated from each other, and the driving surface 464 is used for receiving a driving force. Each driving force receiving portion 46 in this embodiment does not have a braking surface for receiving a braking force.

The driving force transmitting portion 442 is used for engaging with the substrate 43 to transmit the driving force received by each driving force receiving portion 46 to the substrate 43, so as to drive the rotating member 21 connected with the connecting portion 41 to rotate. In some embodiments, the driving force transmitting portion 442 is provided with a projection extending from the bottom plate 441 in the direction close to the connecting portion 41 along the axis of rotation L21, correspondingly, a groove 433 capable of fitting with the projection is formed in a side wall of the movable cavity 432, or positions of the projection and the groove are exchanged. The bottom tray 42 is formed as a bottom wall of the movable cavity 432, one end of the compression spring 49 abuts against the base tray 42, and the other end thereof abuts against a surface of a side, facing the connecting portion 41, of the bottom plate 441.

Furthermore, the engaging portion 44 further includes a guiding engagement pillar 443 arranged on the same side as the driving force transmitting portion 442, correspondingly, a guiding hole 421 fitting with the guiding engagement pillar 443 is formed in the base tray 42, the guiding engagement pillar 443 is arranged as a cantilever capable of elastically deforming in a direction intersecting with the axis of rotation L21, and a clamping projection 444 is arranged at a tail end of the cantilever. When the engaging portion 44 is mounted, the guiding engagement pillar 443 is extruded to elastically deform, the clamping projection 444 is clamped with the guiding hole 421, and the engaging portion 44 can stably engage with the connecting portion 41/substrate 43. When the engaging portion 44 moves along the axis of rotation L21, it can be ensured that a movement trajectory of the engaging portion 44 does not deviate due to the cooperation between the guiding engagement pillar 443 and the guiding hole 421.

When the driving force receiving member 4 engages with the force output member 203, the guide surface 463 force the braking portion 203*a* to rotate in the direction of rotation r to be separated from the driving portion 180*h*, then the driving surface 464 is opposite to a driving force output surface 180*d*, the driving force receiving member 4 engages with the force output member 203, and the driving force receiving member 4 can receive the driving force output by the driving portion 180*h*.

In this embodiment, the braking portion 203*a* will further gradually retract towards a retracted state while being pushed and guided by the guide surface 463, when the driving surface 464 is opposite to the driving force output surface 180*d*, the braking portion 203*a* can either be in a state of being pressed by the guide surface 463, or in an extended state where it is no longer pressed by the guide surface 463, output of the driving force to the driving surface 464 by the driving force output surface 180*d* cannot be influenced no matter which state the braking portion 203*a* is in, and the braking portion 203*s* at this moment may be considered disabled since it cannot apply the braking force to the driving force receiving member 4.

Different from the above embodiment, the engaging portion 44 in this embodiment is arranged to be capable of extending and retracting. When the driving force receiving member 4 engages with the force output member 203, the braking portion 203*a* is pressed by the guide surface 463, the guide surface 463 is also pressed by the braking portion 203*a* in turn, the engaging portion 44 retracts close to the connecting portion 41/photosensitive drum 21, and the compression spring 49 will also elastically deform. Therefore, each driving force receiving portion 46 will be pushed by the compression spring 49 towards the force output member 203, that is, each driving force receiving portion 46 can move with the driving portion 180*h*/braking portion 203*a*, and finally the driving force receiving member 4 and the force output member 203 can be kept in stable and compact engagement similarly.

Embodiment 14

As shown in FIG. 26, FIG. 27A, FIG. 27B and FIG. 28, the engaging portion 44 in Embodiment 13 can move with the driving portion 180*h*/braking portion 203*a* under the action of a pushing force of the compression spring 49, so as to ensure that the driving force receiving member 4 and the force output member 203 are kept in stable and compact engagement, that is, the engaging portion 44 can actively move with the driving portion 180*h*/braking portion 203*a*. The engaging portion 44 in this embodiment will be arranged to passively move with the driving portion 180*h*/braking portion 203*a*.

As shown in the figures, the holding member 49 is preferably arranged as a tension spring, and the tension spring 49 is used for keeping the engaging portion 44 in a retracted state of the engaging portion. The driving force receiving member 4 further includes an acting member 4*e*, the acting member 4*e* is movably mounted on a driving end cover 300/non-driving end cover 400/first unit casing 1/second unit casing 2, and the acting member 4*e* is used for propelling the engaging portion 44 to move from the retracted state to an extended state when receiving an external acting force.

The structure of the engaging portion 44 and the engaging structure of the engagement portion 44 and a substrate 43 are the same as those in Embodiment 13, and the acting member 4*e* and its movement process will be described in detail here.

The acting member 4*e* is preferably an acting rod movably arranged in a process cartridge, the acting rod 4*e* includes an intermediate rod 4*e*1, and a force bearing portion 4*e*2 and a pushing portion 4*e*3 which are located at two ends of the intermediate rod 4*e*1 respectively. The pushing portion 4*e*3 is forked, including two pushing rods 4*e*31 connected with the intermediate rod 4*e*1. At least one pushing rod 4*e*31 has a pushing force 4*e*32 inclined relative to an axis of rotation L21, and an accommodating space 4*e*30 is formed between the two pushing rods 4*e*31.

Figure 27A:
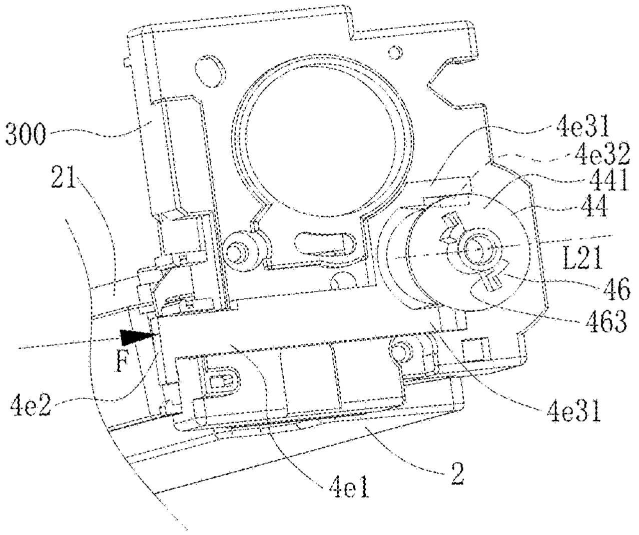
FIG. 27A is a state diagram of a driving force receiving member in a process cartridge before engagement of the driving force receiving member with a force output member involved in Embodiment 14 of the present invention.
Figure 27B:
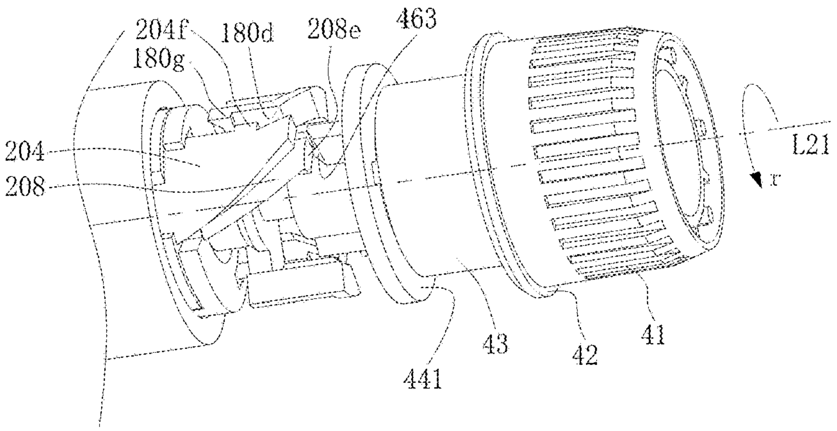
FIG. 27B is a stereogram before engagement of a driving force receiving member with a force output member involved in Embodiment 14 of the present invention.

FIG. 27A shows an example that the acting rod 4*e* is mounted on the driving end cover 300. Before the driving force receiving member 4 engages with the force output member 203, the engaging portion 44 is in the retracted state, and the pushing surface 4*e*32 is opposite to a surface of a side, facing a connecting portion 41, of a bottom plate 441. As the force bearing portion 4*e*2 receives the external acting force F, the pushing surface 4*e*32 starts to push the bottom plate 441, and then the engaging portion 44 gradually moves towards the extended state of the engaging portion. As shown in FIG. 27B, a guide surface 463 arranged in the engaging portion 44 propels a braking portion 203*a* to be away from a driving portion 180*h* in a direction of rotation r, and then a driving surface 464 is opposite to a driving force output surface 180*d*. As described above, the force output member 203 can move towards a flange portion 180*a* (direction away from the driving force receiving member 4) along an axis M1. When the driving force receiving member 4 engages with the force output member 203, and if the force output member 203 is pressed to move towards the flange portion 180*a*, the engaging portion 44 will also passively move with the force output member 203 under a pushing action of the pushing rods 4*e*31 till the force output member 203 no longer moves towards the flange portion 180*a* along the axis M1, and finally the engaging portion 44 and the force output member 203 can be kept in stable and compact engagement.

Figure 28:
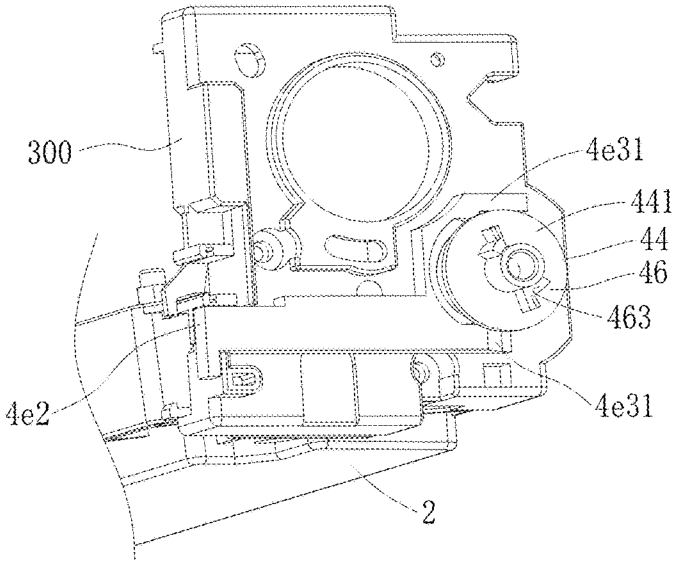
FIG. 28 is a state diagram of a driving force receiving member in a process cartridge after engagement of the driving force receiving member with a force output member involved in Embodiment 14 of the present invention.
Figure 29:
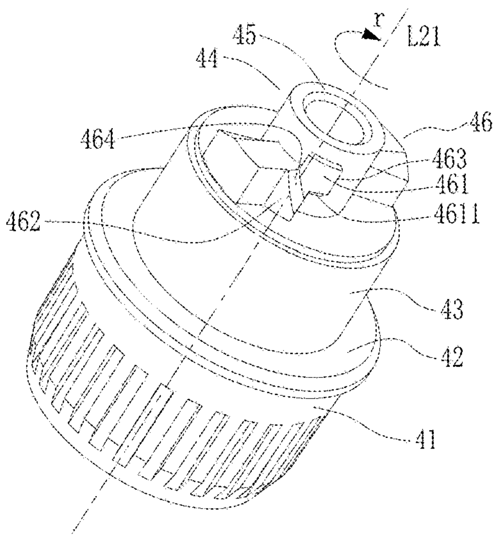
FIG. 29 is a stereogram of a driving force receiving member involved in Embodiment 15 of the present invention.

Preferably, the driving force receiving member 4 further includes a reset member (not shown) for propelling the acting rod 4*e* to be reset, for example, the reset member is a compression spring or tension spring mounted between the acting rod 4*e* and the process cartridge casing/end cover. As shown in FIG. 28, the engaging portion 44 is in the extended state of the engaging portion, the reset member does not elastically deform, when the external acting force F applied to the force bearing portion 4*e*2 is withdrawn, the reset member releases a reset force, the acting rod 4*e* is reset, and meanwhile, the tension spring 49 pulls the engaging portion 44 back to the retracted state from the extended state.

In some embodiments, the external acting force F may come from a door cover of an image forming apparatus, and when closed, the door cover applies the acting force to the force bearing portion 4*e*2.

In some embodiments, the external acting force may further come from an inner wall of the image forming apparatus, the image forming apparatus with a drawer type accommodating portion is available, a process cartridge is mounted in the drawer type accommodating portion, when the process cartridge needs to be mounted or taken out, the door cover is opened, the drawer type accommodating portion firstly ascends by a certain distance with opening of the door cover, and then is pulled out, after the process cartridge is mounted or taken out, the drawer type accommodating portion is pushed into a preset position in the image forming apparatus, and finally, when the door cover is closed, the drawer type accommodating portion descends by a certain distance and then gets close to a transfer apparatus arranged in the image forming apparatus. As for this image forming apparatus, the external acting force may be generated by mutual interference between the inner wall of the image forming apparatus and the force bearing portion 4*e*2 when the drawer type accommodating portion is pushed into the image forming apparatus, or generated by mutual interference between the transfer apparatus and the force bearing portion 4*e*2 when the drawer type accommodating portion descends during closing of the door cover. In some embodiments, during closing of the door cover, the drawer type accommodating portion does not descend, but rather the transfer apparatus opposite to the drawer type accommodating portion ascends to come into close proximity with it, and the external acting force is generated by mutual interference between the transfer apparatus and the force bearing portion 4*e*2 when the transfer apparatus ascends.

Embodiment 15

The embodiment in which a driving force output surface 180*d* arranged in a driving portion 180*h* is used for applying a driving force to a driving force receiving member 4 is described above, however, when a force output member 203 operates, a braking portion 203*a* will also rotate with the driving portion 180*h*, so that the braking portion 203*a* may also serve as a component for applying the driving force to the driving force receiving member 4. The embodiment in which the braking portion 203*a* engages with the driving force receiving member 4 to transmit the driving force will continue to be described below.

As shown in FIG. 29, FIG. 30A, FIG. 30B, FIG. 31A, FIG. 31B, and FIG. 32, each driving force receiving portion 46 stills include a base 461 and a convex block 462 which are located on a radial outer side of a central pillar 45, wherein the convex block 462 is farther away from an axis of rotation L21 than the base 461, the convex block 462 has a driving surface 464 for receiving the driving force, the driving surface 464 may engage with a first braking engagement member 204 or a second braking engagement member 208, and engagement of the driving surface 464 with the second braking engagement member 208 will be described in this embodiment.

As described above, the second braking engagement member 208 is located on an inner side of the first braking engagement member 204 in a radial direction of the force output member 203, and preferably, the driving surface 464 will be opposite to the second braking engagement member 208 in the direction of rotation r.

As shown in the figures, the second braking engagement member 208 has an inner output surface 208*f* located on a downstream side in the direction of rotation r, the inner output surface 208*f* helically ascends in a direction against the direction of rotation r relative to the axis of rotation L21, and preferably, the driving surface 464 is arranged as a helical surface fitting with the inner output surface 208*f*.

Figure 31A:
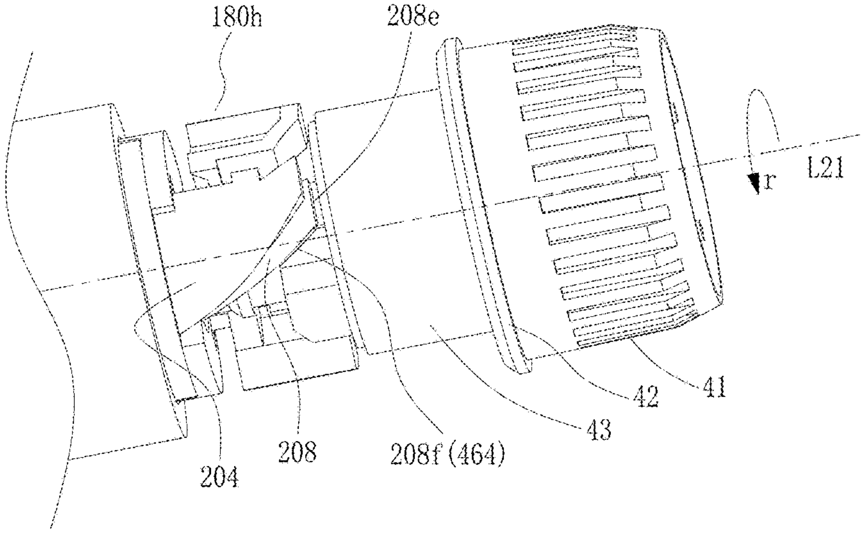
FIG. 31A is a stereogram after engagement of a driving force receiving member with a force output member in a first state involved in Embodiment 15 of the present invention.
Figure 31B:
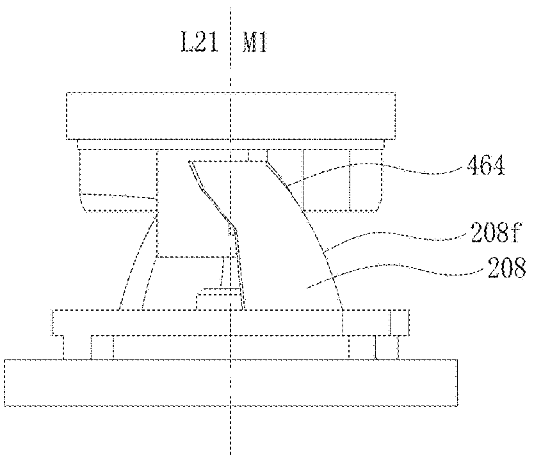
FIG. 31B is a stereogram as viewed in a direction perpendicular to an axis of rotation of a driving force receiving member after engagement of the driving force receiving member with a force output member in a first state involved in Embodiment 15 of the present invention.

In order to more clearly describe the engagement state of the second braking engagement member 208 with the driving force receiving member 4, the driving portion 180*h* and the first braking engagement member 204 are hidden in FIG. 31B.

Before the driving force receiving member 4 engages with the force output member 203, the driving portion 180*h* is away from the braking portion 203*a* in the direction of rotation r. When the driving force receiving member 4 engages with the force output member 203, and if the braking portion 203*a* abuts against the convex block 462, the braking portion 203*a* will be pressed to retract; with rotation of the force output member 203, when the driving portion 180*h* abuts against the braking portion 203*a*, the driving portion 180*h* and the braking portion 203*a* rotate in the direction r together till the convex block 462 no longer abuts against the braking portion 203*a* and the driving portion 180*h*, and the braking portion 203*a* and the driving portion 180*h* will extend out. As shown in FIG. 31B, the inner output surface 208*f* abuts against the driving surface 464, the second braking engagement member 208 starts to output the driving force to the driving force receiving member 4, and the braking portion 203*a* no longer applies a braking force to the driving force receiving member 4.

Figure 32:
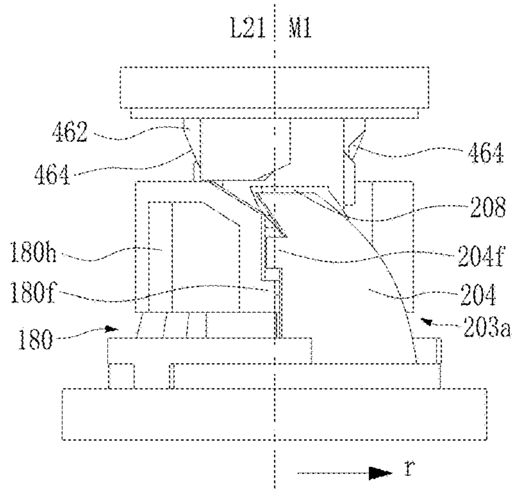
FIG. 32 is a stereogram as viewed in a direction perpendicular to an axis of rotation of a driving force receiving member when the driving force receiving member starts to engage with a force output member in a second state involved in Embodiment 15 of the present invention.

As shown in FIG. 32, before the driving force receiving member 4 engages with the force output member 203, the driving portion 180*h* and the braking portion 203*a* get close to each other in the direction of rotation r, as a process cartridge C is mounted, the convex block 462 extrudes the driving portion 180*h* and/or the braking portion 203*a*, and the driving portion 180*h* and/or the braking portion 203*a* retract/retracts. With rotation of the driving portion 180*h*, the driving portion 180*h* will push the braking portion 203*a* to rotate together, when the driving portion 180*h* and/or the braking portion 203*a* no longer are/is extruded by the convex block 462, a first spring/drum drive coupling spring 210 and/or a second spring/braking engagement spring 211 arranged in the force output member 203 release/releases elastic force to allow the driving portion 180*h* and/or the braking portion 203*a* to extend out, then the inner output surface 208*f* abuts against the driving surface 464, the second braking engagement member 208 starts to output the driving force to the driving force receiving member 4, and the braking portion 203*a* no longer applies the braking force to the driving force receiving member 4.

Furthermore, the base 461 further has a holding surface 4611, the holding surface 4611 faces a connecting portion 41 along the axis of rotation L21, the holding surface 4611 is closer to the axis of rotation L21 than the driving surface 464 in a radial direction perpendicular to the axis of rotation L21, when the inner output surface 208*f* abuts against the driving surface 464, an inward projection 208*e* of the second braking engagement member abuts against the holding surface 4611, the braking portion 203*a* may be kept in stable and compact engagement with the driving force receiving member 4, and therefore the holding surface 4611 may be appraised as an embodiment of an anti-disengaging portion 47.

Figure 30A:
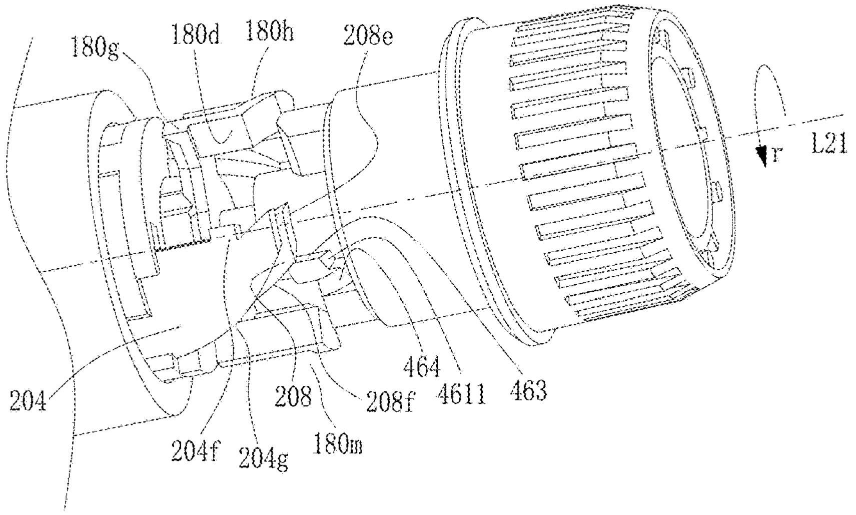
FIG. 30A is a stereogram as viewed in a direction intersecting with an axis of rotation of a driving force receiving member before engagement of the driving force receiving member with a force output member in a first state involved in Embodiment 15 of the present invention.
Figure 30B:
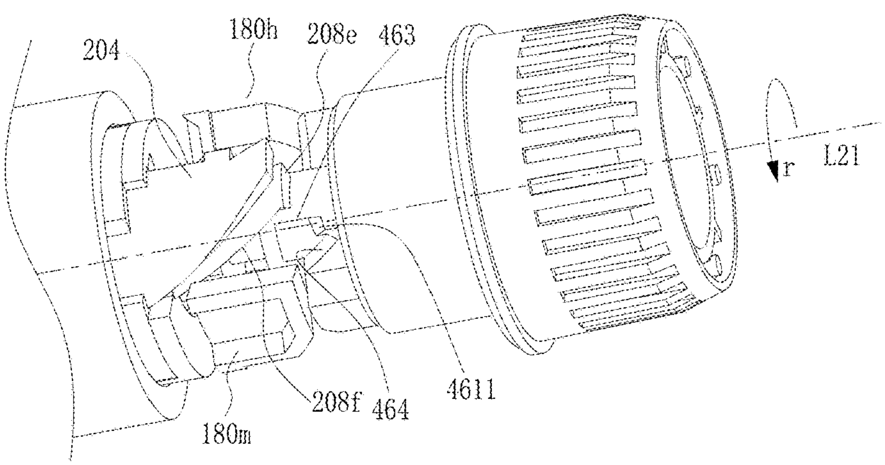
FIG. 30B is a stereogram as viewed in another direction intersecting with an axis of rotation of a driving force receiving member after engagement of the driving force receiving member with a force output member in a first state involved in Embodiment 15 of the present invention.

Furthermore, the base 461 further includes a guide surface 463 adjacent to the holding surface 4611. As shown in FIG. 30A and FIG. 30B, when the driving force receiving member 4 engages with the force output member 203, the guide surface 463 abuts against the braking portion 203*a* to guide the inward projection 208*e* to a position where the inward projection engages with the holding surface 4611, and guide an outer output surface 204*g*/inner output surface 208*f* to a position where the outer output surface/inner output surface is opposite to the driving surface 464.

Embodiment 16

Different from Embodiment 15, a driving force receiving member 4 in this embodiment is driven by a first braking engagement member 204, the first braking engagement member 204 has an outer output surface 204*g* located on a downstream side in a direction of rotation r, and the outer output surface 204*g* is also arranged to helically extend upward in a direction against the direction of rotation r.

Figure 33:
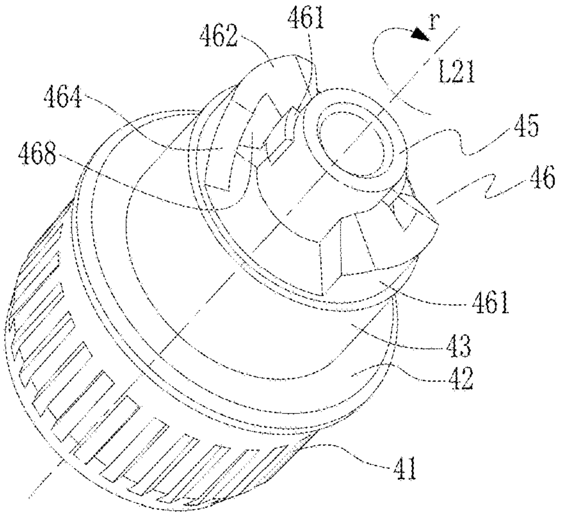
FIG. 33 is a stereogram of a driving force receiving member involved in Embodiment 16 of the present invention.
Figure 34A:
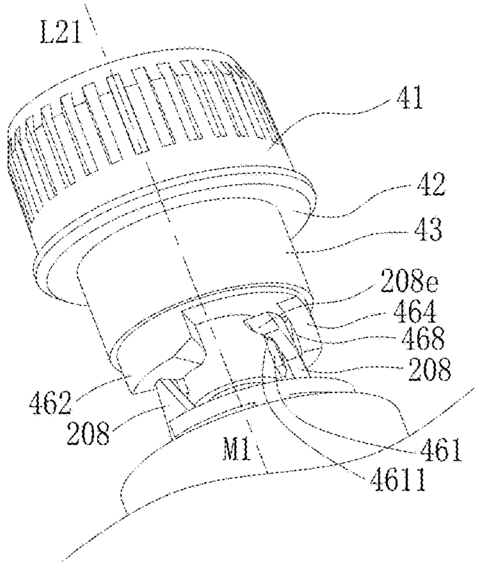
FIG. 34A is a stereogram after engagement of a driving force receiving member with a driving force output member involved in Embodiment 16 of the present invention.
Figure 34B:
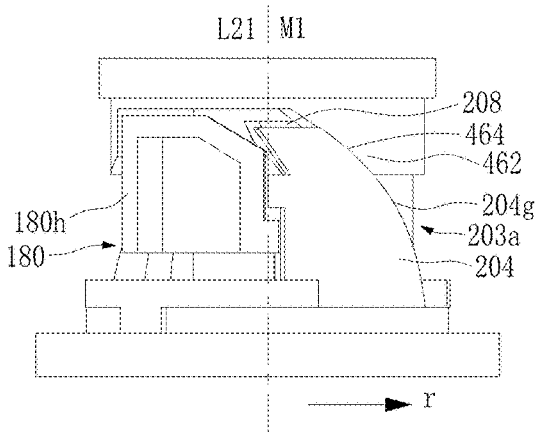
FIG. 34B is a side view as viewed in a direction perpendicular to an axis of rotation of a driving force receiving member after engagement of the driving force receiving member with a driving force output member involved in Embodiment 16 of the present invention.
Figure 35:
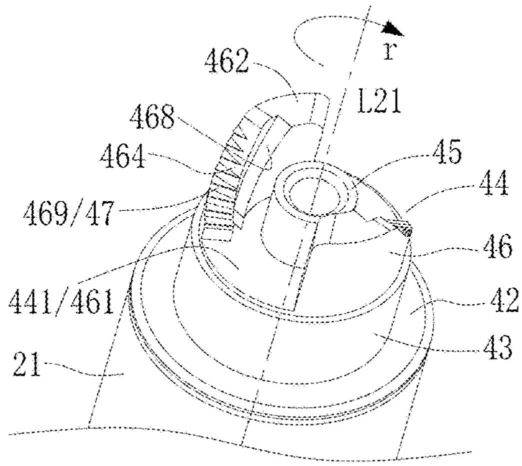
FIG. 35 is a stereogram of a driving force receiving member involved in Embodiment 17 of the present invention.
Figure 36:
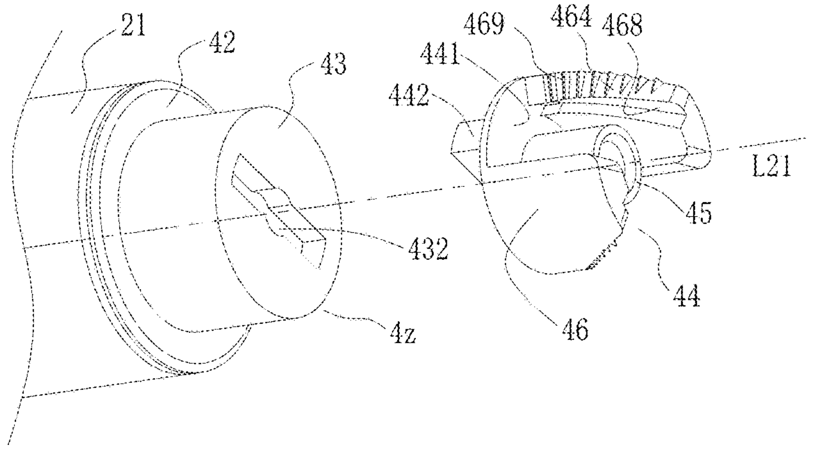
FIG. 36 is a schematic state diagram after separating an engaging portion of a driving force receiving member from a substrate involved in Embodiment 17 of the present invention.

As shown in FIG. 33, FIG. 34A, and FIG. 34B, each driving force receiving portion 46 in this embodiment includes a base 461 and a convex block 462 which are located on a radial outer side of a central pillar 45, the convex block 462 is farther away from an axis of rotation L21 than the base 461, a driving surface 464 capable of fitting with the outer output surface 204*g* is arranged on the convex block 462, a receding portion 468 is further formed between the driving surface 464 and the central pillar 45 in a radial direction perpendicular to the axis of rotation L21, and specifically, the receding portion 468 is formed on the convex block 462.

As shown in FIG. 34A, in order to more clearly describe functions of the receding portion 468, the first braking engagement member 204 is hidden in the figure. The engaging process of an engaging portion 44/driving force receiving member 4 with a force output member 203 in this embodiment is the same as that in Embodiment 15, which is not repeated here. However, when the driving force receiving member 4 has engaged with the force output member 203, at least one part of a second braking engagement member 208 enters the receding portion 468. As shown in FIG. 34B, the outer output surface 204*g* abuts against the driving surface 464, the first braking engagement member 204 starts to output a driving force to the driving force receiving member 4, and a braking portion 203*a* will no longer apply a braking force to the driving force receiving member 4.

Preferably, the base 461 in this embodiment may also have the above holding surface 4611 or a rough surface or a surface with additional elastic rubber, an inward projection 208*e* of the second braking engagement member 208 entering the receding portion 468 further engages with the holding surface 4611/rough surface/surface with the additional elastic rubber while the outer output surface 204*g* abuts against the driving surface 464, and therefore the braking portion 203*a* may be kept in stable and compact engagement with the driving force receiving member 4.

Optionally, in the absence of the holding surface 4611 in the engaging portion 44, it is permissible to exclude the base 461 which constitutes the holding surface 4611. Nevertheless, a bottom plate 441 located between the central pillar 45 and the convex block 462 may be appraised as fulfilling the role of the base 461 in the radial direction of the driving force receiving member 4. The structure of the engaging portion 44 may be simplified.

As mentioned above, the holding surface 4611 may be used to prevent the driving force receiving member 4 from disengaging from the force output member 203. Therefore, the holding surface 4611 or the rough surface or the surface with the additional elastic rubber may also be appraised as one embodiment of the anti-disengagement portion 47. In various embodiments involving the anti-disengagement portion 47, a person skilled in the art may make a selection according to design requirements to ensure stable and tight engagement of the driving force receiving member 4 with the force output member 203.

Embodiment 17

Similar to Embodiment 13 and Embodiment 14, in this embodiment, an engaging portion 44 and an engaged portion 4*z* are also formed as separated members, which allows the engaging portion 44 and the engaged portion 4*z* to be made of different materials, for example, the engaging portion 44 may be made of metal, while the engaged portion 4*z* may be made of a resin material. The engaging portion 44, which is used to engage with and disengage from a force output member 203, will thereby become more wear-resistant and have a higher hardness. In some embodiments, the engaging portion 44 and the engaged portion 4*z* may also be made of the same material.

As shown in FIGS. 35, 36, 37, and 38, the engaging portion 44 is provided with a bottom plate 441 and a driving force transmission portion 442 extending from one side of the bottom plate 441. Correspondingly, the engaged portion 4*z* is provided with a movable cavity 432 that may engage with the driving force transmission portion 442, and a central pillar 45 and driving force receiving portions 46 are both formed by extending from the other side of the bottom plate 441, that is, the driving force receiving portions 46 are connected with the central pillar 45 through the bottom plate 441. Therefore, at least one part of the bottom plate 441 may also be appraised as a base 461.

Each driving force receiving portion 46 includes the base 461 and a convex block 462 located on a radial outer side of the central pillar 45, the convex block 462 is farther away from an axis of rotation L21 than the base 461, the driving force receiving portion 46 is configured to engage with a braking portion 203*a*, and when the force output member 203 rotates in the direction of rotation r, at least one of an outer output surface 204*g* and an inner output surface 208*f* of the corresponding braking portion 203*a* outputs a driving force to the driving force receiving portion 46.

Similar to Embodiment 16, a receding portion 468 is further formed between the driving surface 464 and the central pillar 45 in the radial direction perpendicular to the axis of rotation L21. Specifically, the receding portion 468 is arranged on the corresponding convex block 462, when a driving force receiving member 4 engages with the force output member 203, a second braking engagement member 208 enters the receding portion 468, while a first braking engagement member 204 is opposite to the driving surface 464. Therefore, there are three methods by which the force output member 203 outputs the driving force to the driving force receiving member 4:

First, the outer output surface 204*g* of the first braking engagement member 204 engages with the driving surface 464, while the second braking engagement member 208 is not in contact with a surface in the receding portion 468, and the driving force from the force output member 203 is transmitted from the first braking engagement member 204 to the driving force receiving member 4;

second, the outer output surface 204*g* of the first braking engagement member 204 does not engage with the driving surface 464, while the second braking engagement member 208 is in contact with the surface in the receding portion 468, the driving force from the force output member 203 is transmitted from the second braking engagement member 208 to the driving force receiving member 4, and as a result, a surface for receiving the driving force in each driving force receiving portion 46 will be the surface in the receding portion 468; and third, the outer output surface 204*g* of the first braking engagement member 204 engages with the driving surface 464, while the second braking engagement member 208 is also in contact with the surface in the receding portion 468, the driving force from the force output member 203 is simultaneously transmitted from the first braking engagement member 204 and the second braking engagement member 208 to the driving force receiving member 4, and as a result, both the driving surface 464 and the surface in the receding portion 468 are the surfaces for receiving the driving force.

Further, each driving force receiving portion 46 further includes projections 469 arranged on the surface for receiving the driving force; when the driving force receiving member 4 engages with the force output member 203, the projections 469 engage with the braking portion 203*a*; during the process of the braking portion 203*a* outputting the driving force to the driving force receiving member 4, the braking portion 203*a* receives a reaction force from the driving force receiving member 4, which tends to disengage from the driving force receiving member 4. According to the arrangement of the above projections 469, the projections 469 may further be considered as one embodiment of the anti-disengagement portion 47, which may increase a friction force between the braking portion 203*a* and the driving force receiving member 4, thereby preventing the driving force receiving member 4 from disengaging from the braking portion 203*a*.

Figure 37:
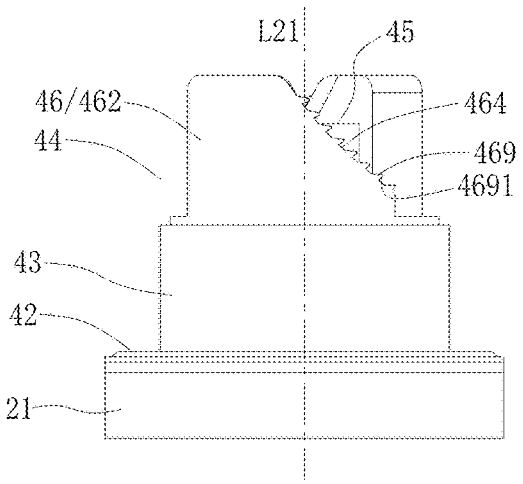
FIG. 37 is a side view as viewed in a direction perpendicular to an axis of rotation of a driving force receiving member involved in Embodiment 17 of the present invention.
Figure 38:
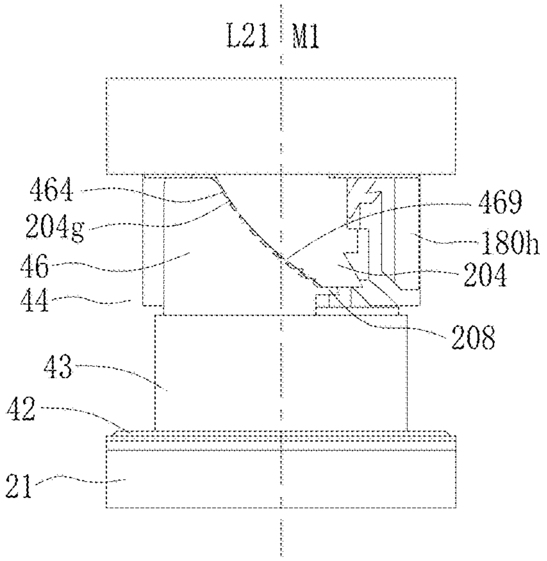
FIG. 38 is a side view as viewed in a direction perpendicular to an axis of rotation of a driving force receiving member after engagement of the driving force receiving member with a force output member involved in Embodiment 17 of the present invention.

The surface (taking the driving surface 464 as an example) for receiving the driving force has a shape that fits with the outer output surface 204*g* and/or the inner output surface 208*f*, and a plurality of projections 469 are arranged on the surface for receiving the driving force. As shown in FIGS. 37 and 38, the surface for receiving the driving force is configured as a helical surface extending around the axis of rotation L21. When viewed in the direction perpendicular to the axis of rotation L21, the projections 469, as a whole, incline towards one side of a photosensitive drum 21/a connecting portion 41, and have surfaces 4691 facing the photosensitive drum 21/the connecting portion 41, thereby increasing the friction force between the force output member 203 and the driving force receiving member 4. Alternatively, the plurality of projections 469 may further be replaced with rough surfaces, elastic rubber, and the like.

When the engaging portion 44 and the engaged portion 4*z* do not need to be made of different materials, the engaging portion 44 and the engaged portion 4*z* may further be formed integrally, making the driving force receiving member 4 manufactured more easily.

Embodiment 18

Figure 39:
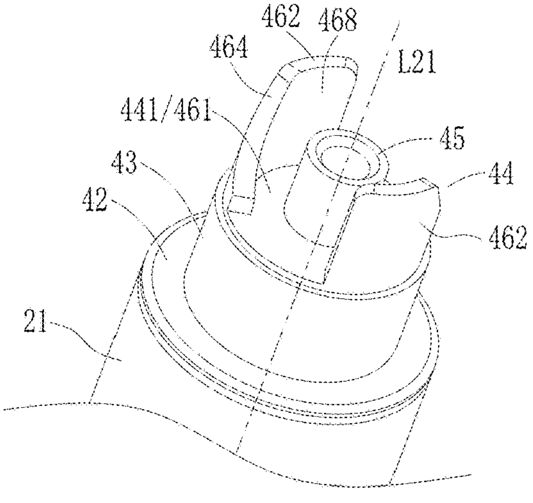
FIG. 39 is a stereogram of a driving force receiving member involved in Embodiment 18 of the present invention.

According to this embodiment, a structure of the convex block 462 is further simplified based on Embodiment 17. As shown in FIG. 39, a receding portion 468 is also formed between a driving surface 464 and a central pillar 45 in the radial direction perpendicular to an axis of rotation L21. However, the receding portion 468 is no longer formed on the corresponding convex block 462 but is located between the convex block 462 and the central pillar 45, that is, a space between the convex block 462 and the central pillar 45 constitutes the receding portion 468 in the radial direction perpendicular to the axis of rotation L21.

Upon the engagement of a driving force receiving member 4 with a force output member 203, a second braking engagement member 208 enters the receding portion 468; the driving surface 464, arranged on the convex block 462, is opposite to an outer output surface 204*g*; and a driving force output by the force output member 203 is transmitted from the outer output surface 204*g* to the driving surface 464.

Alternatively, the driving force receiving member 4 may be configured such that upon the engagement of the driving force receiving member 4 with the force output member 203, the driving surface 464 is opposite to an inner output surface 208*f*; and the driving force output by the force output member 203 is transmitted from the inner output surface 208*f* to the driving surface 464.

Embodiment 19

Figure 40:
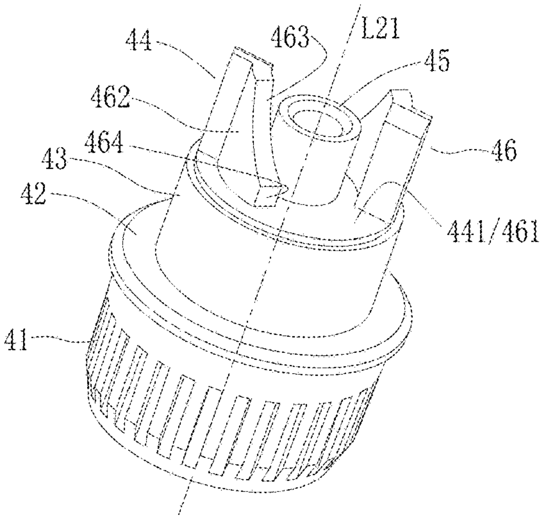
FIG. 40 is a stereogram of a driving force receiving member involved in Embodiment 19 of the present invention.
Figure 41:
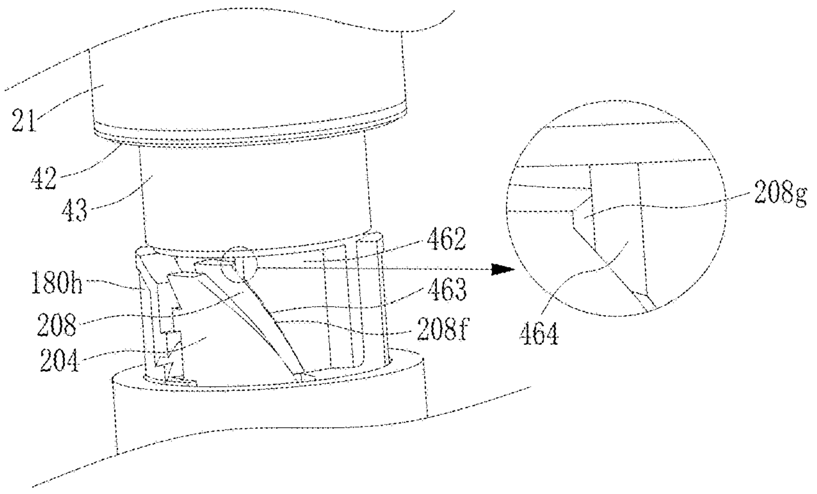
FIG. 41 is a stereogram showing engagement of a driving force receiving member and a force output member involved in Embodiment 19 of the present invention.
Figure 42:
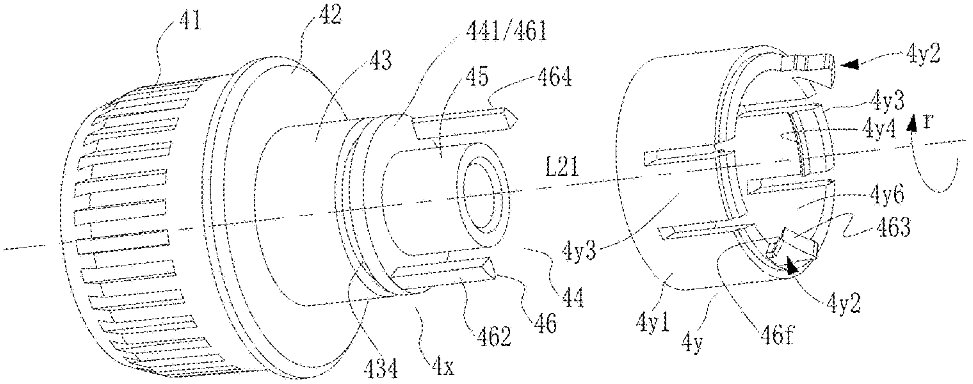
FIG. 42 is a schematic decomposition diagram of a driving force receiving member involved in Embodiment 20 of the present invention.

As shown in FIGS. 40 and 41, according to a structure of a force output member 203, a driving force receiving member 4 in this embodiment is configured such that upon the engagement of the driving force receiving member 4 with the force output member 203, the driving force receiving member 4 engages with a plane 208*g* of a second braking engagement member 208.

Each driving force receiving portion 46 includes a guide surface 463 arranged on a convex block 462 and a driving surface 464 adjacent to the guide surface 463, wherein the driving surface 464 is a surface that fits with the plane 208*g*. As shown in FIG. 40, the driving surface 464 is parallel to an axis of rotation L21.

Preferably, the guide surface 463 is configured as a helical surface extending around the axis of rotation L21. As shown in FIG. 41, during the engagement of the driving force receiving member 4 with the force output member 203, the guide surface 463 is guided by an outer output surface 204*g* or an inner output surface 208*f*, thus allowing the driving force receiving portion 46 to smoothly reach a position where the plane 208*g* is opposite to the driving surface 464. As the force output member 203 rotates, a driving force is transmitted from the plane 208*g* to the driving surface 464.

Embodiment 20

A driving force receiving member 4 in this embodiment is configured such that upon the engagement of the driving force receiving member 4 with a force output member 203, the driving force receiving member 4 engages with a front surface 180*g*1 of a driving portion 180*h*.

If the driving force receiving member 4 engages with the force output member 203 in the manner as described in the above embodiment, where a driving force is output to the driving force receiving member 4 by a braking portion 203*a*, in the practical testing, an image forming apparatus will produce noise that is deemed unacceptable. Initial analysis indicates that the noise is caused by the collision between the driving portion 180*h* and the braking portion 203*a*, which are in close proximity, or caused due to the collision between a component of the force output member 203 and an inner wall of the image forming apparatus, or caused by the retraction of the braking portion 203*a* into a cylindrical portion 180*c*.

To achieve this, this embodiment provides the driving force receiving member 4 for eliminating the noise as described above. As shown in FIGS. 42, 43A, 43B, 44A, and 44B, the driving force receiving member 4 includes a connecting portion 41, a base tray 42, a main body portion 4*x* and an auxiliary member 4*y*, wherein the main body portion 4*x* is connected with the connecting portion 41 or the base tray 42, the auxiliary member 4*y* is configured to make a rotation relative to the main body portion 4*x*/a process cartridge casing/a photosensitive drum 21. Specifically, the main body portion 4*x* includes a substrate 43 connected with the connecting portion 41 or the base tray 42 and an engaging portion 44 arranged on the substrate 43, the engaging portion 44 includes a central pillar 45 and driving force receiving portions 46 extending outwards in the radial direction of the central pillar 45, an axis of rotation L21 passes through the central pillar 45, and each driving force receiving portion 46 includes a base 461 and a convex block 462, the convex block 462 is located on a radial outer side of the base 461 in the radial direction of the driving force receiving member 4/the engaging portion 44. As mentioned above, the engaging portion 44 further includes a bottom plate 441, and the central pillar 45 extends from one side of the bottom plate 441 along the axis of rotation L21, and the engaging portion 44 is connected with the substrate 43 through the bottom plate 441. In this embodiment, at least one part of the bottom plate 441 may be considered as the base 461.

The convex block 462 is configured as a cylindrical object extending along the axis of rotation L21, and a driving surface 464 for receiving the driving force is arranged on the convex block 462. Preferably, the main body portion 4*x* is integrated with the connecting portion 41 and the base tray 42, and the substrate 43 is also integrated with the engaging portion 44. The convex block 462 has a fourth surface 4621, the fourth surface 4621 is a surface of the convex block 462 that is farthest from the connecting portion 41 along the axis of rotation L21. As the convex block 462 extends beyond the central pillar 45 along the axis of rotation L21, the fourth surface 4621 serves as a tail end surface 4*w* of the driving force receiving member 4. Preferably, the fourth surface 4621 is a plane, and more preferably, the fourth surface 4621 is a plane that is perpendicular to the axis of rotation L21.

The auxiliary member 4*y* includes a bearing body 4*y*1, a separating member 4*y*2 projecting from the bearing body 4*y*1, and a limited portion 4*y*4 arranged on the bearing body 4*y*1 or the separating members 4*y*2. In some embodiments, the auxiliary member 4*y*/bearing body 4*y*1 sleeves the main body portion 4*x*, the main body portion 4*x* is further provided with a limiting portion 434 engaging with the limited portion 4*y*4, and through the engagement of the limited portion 4*y*4 with the limiting portion 434, the auxiliary member 4*y* is limited along the axis of rotation L21, while the auxiliary member 4*y* is not limited in a direction of rotation r. In some embodiments, the bearing body 4*y*1 is configured to be a ring body internally forming an accommodating cavity 4*y*6, and at least one part of the main body portion 4*x* is accommodated in the accommodating cavity 4*y*6; the limited portion 4*y*4 is configured to be a snap-fit projection projecting radially from the ring body 4*y*1 towards the accommodating cavity 4*y*6; and the limiting portion 434 is a snap-fit groove formed in an outer surface of the substrate 43 or the engaging portion 44, and the snap-fit groove 434 extends in the direction of rotation r. Conversely, the snap-fit groove may also be formed in the ring body 4*y*1, and the snap-fit projection may also be arranged on the substrate 43 or the engaging portion 44, where the snap-fit projection may extend completely in the direction of rotation r or extend only for a preset angle in the direction of rotation r.

In some embodiments, to facilitate the engagement of the snap-fit projection with the snap-fit groove 434, the auxiliary member 4*y* is further provided with an elastic arm 4*y*3 connected to the ring body 4*y*1, the snap-fit projection/the snap-fit groove 434 is arranged on the elastic arm 4*y*3, which may be deformed elastically relative to the ring body 4*y*1 utilizing the elastic arm 4*y*3, thereby facilitating the convenient engagement of the auxiliary member 4*y* with the main body portion 4*x*. Preferably, the elastic arm 4*y*3 is integrally formed with the ring body 4*y*1, and a gap is formed between the elastic arm 4*y*3 and the ring body 4*y*1, so that the elastic arm 4*y*3 may be deformed elastically relative to the ring body 4*y*1. More preferably, in the presence of the elastic arm 4*y*3, the snap-fit portion 4*y*4/the snap-fitted portion 434 is only arranged on the elastic arm 4*y*3, which in turn facilitates the more convenient engagement of the auxiliary member 4*y* with the main body portion 4*x*.

In some embodiments, the auxiliary member 4*y* may also sleeve the process cartridge casing, and the auxiliary member 4*y* may be provided with the limited portion 4*y*4. A limiting portion is arranged on the casing for restricting the limited portion 4*y*4, as long as it is ensured that the auxiliary member 4*y* may rotate around a direction parallel to the axis of rotation L21 and will not disengage from the casing. For example, the restriction on the auxiliary member 4*y* may be achieved by an abutment of the casing against a tail end surface of the auxiliary member 4*y*. Based on the inventive concept, the auxiliary member 4*y* may be mounted at various positions, for example, the auxiliary member 4*y* sleeves at least one of a charging member, a supplying member, and a stirring member.

In some embodiments, the auxiliary member 4*y* may further be rotationally mounted in a positioning groove reserved for the casing or the main body portion 4*x*. In such a structure, a component to support the auxiliary member 4*y* does not need to be arranged additionally in the positioning groove, the auxiliary member 4*y* may be positioned by an inner wall of the positioning groove, and accordingly, the bearing body 4*y*1 may further be configured to be a solid object as long as the bearing body 4*y*1 may rotate relative to the casing/photosensitive drum 21.

Preferably, when the auxiliary member 4*y* and the main body portion 4*x* are coaxial, the separating member 4*y*2 and the convex block 462 are spaced apart from each other in the radial direction of the driving force receiving member 4, and thus, the auxiliary member 4*y* with the separating member 4*y*2 may rotate freely around the axis of rotation L21.

Furthermore, the separating member 4*y*2 has a guide surface 463 and a hooked surface 46*f*, and the separating member 4*y*2 has a tip portion 4*y*21 that is furthest away from the connecting portion 41 along the axis of rotation L21, wherein the guide surface 463 is used to guide the separating member 4*y*2 to a preset position, the hooked surface 46*f* is configured to incline relative to the axis of rotation L21, and the inclined direction of the hooked surface 46*f* is such that when viewed in a direction that is perpendicular to the axis of rotation L21, the hooked surface 46*f* faces the connecting portion 41, and thus, the hooked surface 46*f* may prevent the braking portion 203*a* from moving towards a flange portion 180*a*, that is, the hooked surface 46*f* may prevent the force output member 203 from being separated from the driving force receiving member 4.

During the process of the driving force receiving member 4 moving towards the force output member 203, the guide surface 463 abuts against the braking portion 203*a*, enabling the braking portion 203*a* to move away from the driving portion 180*h* in the direction of rotation r. Subsequently, the separating member 4*y*2 enters, in the direction of rotation r, a third space K3 between the driving portion 180*h* and the braking portion 203*a*, where the separating member 4*y*2 is opposite to a driving force output surface 180*d*. Meanwhile, the convex block 462 reaches the downstream side of the front surface 180*g*1, which are located in a first space K1, where the front surface 180*g*1 is opposite to the driving surface 464.

When the force output member 203 begins to rotate, a driving force output by the driving portion 180*h* is transmitted to the driving force receiving 4 through the abutment of the front surface 180*g*1 against the driving surface 464. The hooked surface 46*f* engages with the braking portion 203*a*, and since the hooked surface 46*f* is configured to be an inclined surface as mentioned above, the braking portion 203*a* is "hooked" by the hooked surface 46*f*, without moving towards the flange portion 180*a* along the axis of rotation L21. The hooked surface 46*f* may also be considered as one embodiment of an anti-disengaging portion.

The driving portion 180*h* is separated from the braking portion 203*a* by the separating member 4*y*2, or at least one part of the separating member 4*y*2 enters the third space K3. When the driving force receiving member 4 in this embodiment receives the driving force output by the force output member 203, the noise caused by an image forming apparatus is eliminated; and accordingly, as long as the separating member 4*y*2 can enter the third space K3 and allow the driving portion 180*h* and the braking portion 203*a* to be separated from each other in the direction of rotation r, no hooked surface 46*f* will be required.

As mentioned above, in this embodiment, the separating member 4*y*2 is configured to be movable with the rotation of the bearing body 4*y*1 relative to the casing/photosensitive drum 21. Therefore, during the mounting and removal of the process cartridge C, the movable bearing body 4*y*1/separating member 4*y*2 improves the flexibility of mounting and removal of the process cartridge C, and reduces the risk of interference between the process cartridge C and the image forming apparatus.

Embodiment 21

Figure 45:
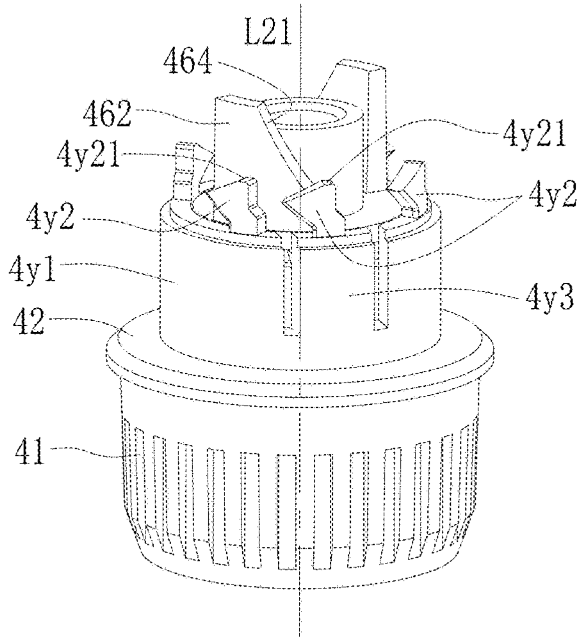
FIG. 45 is a stereogram of a driving force receiving member involved in Embodiment 21 of the present invention.

As shown in FIG. 45, an auxiliary member 4*y* is provided with a plurality of separating members 4*y*2 spaced apart from each other in a direction of rotation r. When a driving force receiving member 4 approaches a force output member 203 along an axis of rotation L21/M1, any one of the separating members 4*y*2 may enter a third space K3 along the axis of rotation L21/M1. After a convex block 462 with a driving surface 464 enters a second space K2, the driving force receiving member 4 may receive a driving force output by the force output member 203 smoothly, and noise caused by an image forming apparatus is eliminated.

In this embodiment, after the driving force receiving member 4 engages with the force output member 203, a braking surface 465 engages with a braking portion 203*a*, and with an inclined surface that the braking surface 465 has, the tendency of the braking portion 203*a* moving towards a flange portion 180*a* is stopped, and the driving surface 464 may stably receive the driving force.

Other separating members 4*y*2 among the plurality of separating members 4*y*2, other than the separating members 4*y*2 that enter the third space K3, may be considered as auxiliary projections, representing that multiple separating members 4*y*2 corresponding to the auxiliary projections may be provided; and the four auxiliary projections are spaced in a circumferential direction of the auxiliary member 4*y*. Preferably, the four auxiliary projections are evenly spaced in the circumferential direction of the auxiliary member 4*y*.

The auxiliary projections 4y5 are used for assisting the separating members 4y2 and/or the driving surface 464 in reaching a preset position, where the separating members 4y2 enter the third space K3 in the direction of rotation r, the convex block 462 with the driving surface 464 enters the second space K2, and the driving surface 464 is opposite to at least one of an outer output surface 204g and an inner output surface 208f.

Furthermore, five or six separating members 4y2 may further be provided, which are evenly distributed in the circumferential direction of the auxiliary member 4y; when the number of the separating members 4y2 is less than four, it is possible that the separating members 4y2 may not enter the third space K3, resulting in mis-engagement; and when the number of the separating members 4y2 exceeds six, a failure in the smooth engagement of the driving force receiving member 4 with the force output member 203 may be caused by interference between the separating members 4y2 and the force output member 203.

Embodiment 22

As described above, after a driving force receiving member 4 receives a driving force, a photosensitive drum 21 will be driven to rotate in a direction r1 in FIG. 47, a charging member 24 in contact with the photosensitive drum 21 is driven by friction force between a surface of the photosensitive drum 21 and a surface of the charging member 24 to rotate in a direction r2.

Figure 46:
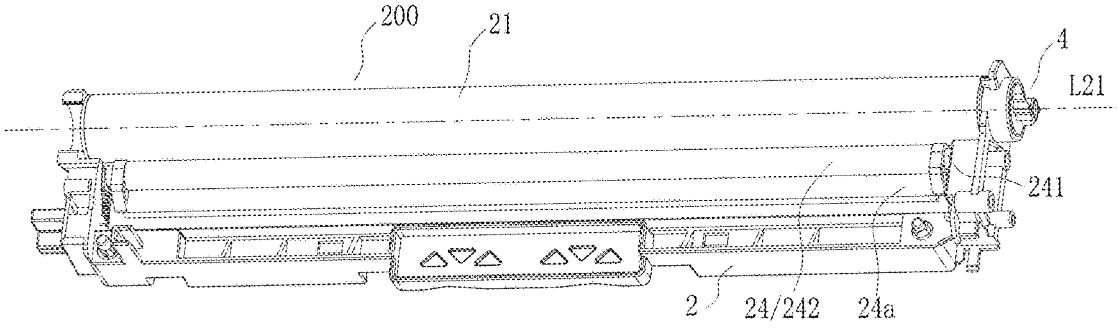
FIG. 46 is a stereogram of a second unit after hiding a part of components involved in Embodiment 22 of the present invention.

Generally, for the charging member 24 configured to make contact with the photosensitive drum 21 for charging, the charging member 24 includes a metal shaft 241 and an elastic material/coating 242 covering the metal shaft (as shown in FIG. 46). Apparently, the density of the metal shaft is greater than that of the elastic material, and accordingly, the inertia of the metal shaft is also greater than that of the elastic material. When the photosensitive drum 21 stops rotating, the charging member 24 will lose a power source, however, the metal shaft will, under the action of inertia, make the charging member 24 continue to rotate. As a result, the friction force between the surface of the charging member 24 and the surface of the photosensitive drum 21 may cause the photosensitive drum 21 to continue to rotate as well.

In some of the above embodiments, a braking portion 203a arranged in a force output member 203 applies a braking force to the driving force receiving member 4, which is used to drive the photosensitive drum 21 to rotate, to stop the potential continued rotation of the photosensitive drum 21. However, the structure of the force output member 203 with the braking portion 203a will become complex, which not only increases the manufacturing difficulty of an image forming apparatus and the driving force receiving member 4, but also enhances the control complexity of the image forming apparatus.

This embodiment provides a simple structure that may prevent the photosensitive drum 21 from continuing to rotate. As shown in FIGS. 46 and 47, a process cartridge C further includes a friction member 24a adjacent to and in contact with the charging member 24; the friction member 24a extends along an axis of rotation L21, when the charging member 24 loses the power source, the charging member 24 that continues to rotate due to inertia is propelled to stop rotating by the friction force between the friction member 24a and the charging member 24. Therefore, the risk of the photosensitive drum 21 continuing to rotate may be eliminated.

Conventionally, the friction member 24a may be configured as a sponge body, a rubber body, and other elastic components. When the charging member 24 is driven by the photosensitive drum 21 to rotate, the friction member 24a does not apply the excessive friction force to the charging member 24, resulting in an increase in a load of the charging member 24. However, when the charging member 24 is no longer driven by the photosensitive drum 21, the friction force between the friction member 24a and the charging member 24 is sufficient to stop rotating the charging member 24 that continues to rotate due to inertia.

During the operation of the process cartridge C, the high-speed rotation of the photosensitive drum 21 makes a developer on its surface separated from the photosensitive drum 21 under the action of a centrifugal force and reach the surface of the charging member 24; and the developer reaching the surface of the charging member 24 will reduce the charging efficiency of the charging member 24 for the photosensitive drum 21. The arrangement of the friction member 24a may also achieve the effect of cleaning the surface of the charging member 24. As the charging member 24 rotates, the developer reaching the surface of the charging member 24 may be adsorbed or scraped by the friction member 24a, and thus, the charging member 24 may efficiently charge the photosensitive drum 21.

[Separation Contact Mechanism]

It is known that when the process cartridge C operates in the image forming apparatus (i.e., performing development operation), a developing roller 11 and the photosensitive drum 21 get close to each other. When the process cartridge C stops operating in the image forming apparatus (i.e., not performing development operation), the developing roller 11 needs to be separated from the photosensitive drum 21 to prevent a surface of the developing roller 11 from being impressed due to prolonged contact with the photosensitive drum 21, or the surface of the photosensitive drum 21 from being contaminated by the developer on the surface of the developing roller 11.

To this end, the present invention further provides a separation contact mechanism 5, which makes, depending on whether the process cartridge C is in an operation state or not in the image forming apparatus, the developing roller 11 and the photosensitive drum 21 get close to or separated from each other.

Figure 49:
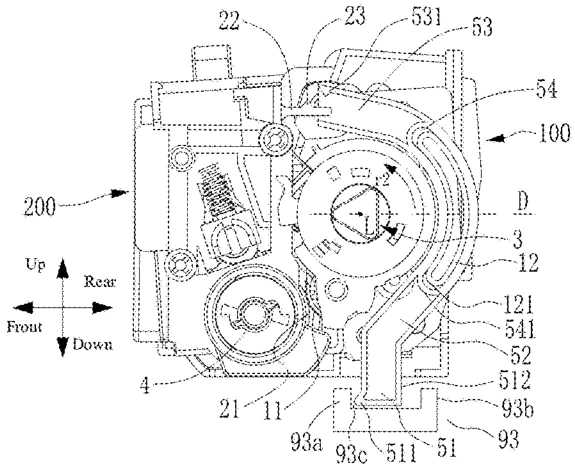
FIG. 49 is a side view showing that a first separation contact mechanism is mounted in a process cartridge casing as viewed from left to right in a left-right direction of a process cartridge involved in the present invention.

Before describing the separation contact mechanism 5, a separation control mechanism 93 that fits with the separation contact mechanism in the image forming apparatus is explained first in combination with FIG. 49. As shown in the figure, the separation control mechanism 93 is generally shaped like a Chinese character "ao" and extends in a front-rear direction. The separation control mechanism includes a separating force applying portion 93a located in the front and a restoring force applying portion 93b located in the rear, and a movable cavity 93c is formed therebetween.

After the process cartridge C reaches a preset position of the image forming apparatus, at least one part of the separation contact mechanism 5 enters the movable cavity 93c, however, the separation contact mechanism 5 does not make contact with the separation control mechanism 93, and at this moment, the separation control mechanism 93 is located at an intermediate position. When the process cartridge C does not need to operate in the image forming apparatus, the separation control mechanism 93 begins to move from front to rear; the separating force applying portion 93a makes contact with the separation contact mechanism 5 and applies a separating force to the separation contact mechanism 5, and the separating force applying portion 93*a*/separation control mechanism 93 reaches a separating force applying position; and subsequently, the separation control mechanism 93 begins to move from rear to front, as a result, the restoring force applying portion 93*a* is separated from the separation contact mechanism 5, but the developing roller 11 and the photosensitive drum 21 are still kept in a state where they are separated from each other. When the process cartridge C needs to operate again in the image forming apparatus, the separation control mechanism 93 continues to move from rear to front, the restoring force applying portion 93*b* makes contact with the separation contact mechanism 5 and applies a restoring force to the separation contact mechanism 5, and the restoring force applying portion 93*b*/separation control mechanism 93 reaches a restoring force applying position; and subsequently, the separation control mechanism 93 begins to move from front to rear, the restoring force applying portion 93*b* is separated from the separation contact mechanism 5 again, but the developing roller 11 and the photosensitive drum 21 are restored to a state where they make contact with each other.

That is, the separation control mechanism 93 may make reciprocating movement among the intermediate position, the separating force applying position, and the restoring force applying position in the front-rear direction, wherein the intermediate position is different from the separating force applying position and the restoring force applying position, the separating force applying position and the restoring force applying position are located on two sides of the intermediate position respectively, and the separation control mechanism 93 always returns to the intermediate position after applying an acting force (including the separating force and the restoring force) to an acting portion 51. Specifically, when the process cartridge C operates in the image forming apparatus, the separation control mechanism 93 is located at the intermediate position, at this moment, the developing roller 11 makes contact with the photosensitive drum 21. When the process cartridge C does not need to operate in the image forming apparatus, the separation control mechanism 93 first moves from the intermediate position to the separating force applying position, and then returns from the separating force applying position to the intermediate position, and at this moment, the developing roller 11 is separated from the photosensitive drum 21. When the process cartridge C needs to operate again in the image forming apparatus, the separation control mechanism 93 first moves from the intermediate position to the restoring force applying position, and then returns from the restoring force applying position to the intermediate position, and the developing roller 11 and the photosensitive drum 21 restore to the state where they make contact with each other.

[First Separation Contact Mechanism]

The separation contact mechanism 5 is movably arranged on a left and/or right side of the process cartridge C. As shown in FIGS. 48 and 49, the separation contact mechanism 5, which is a rotating rod that is rotationally mounted in the process cartridge C, includes an acting portion 51, a main body 52, and a locking portion 53; the acting portion 51 is used to interact with the separation control mechanism 93, and is provided with a separating force receiving portion 511 and a restoring force receiving portion 512 that are arranged oppositely, the separating force receiving portion 511 is used to receive the separating force from the separation control mechanism 93 to separate the developing roller 11 from the photosensitive drum 21, while the restoring force receiving portion 512 is used to receive the restoring force from the separation control mechanism 93 to bring the developing roller 11 make contact with the photosensitive drum 21; when the acting portion 51 receives the separating force or the restoring force, the main body 52 drives the acting portion 51 and the locking portion 53 to rotate, and furthermore, the locking portion 53 engages with a locked portion arranged in the process cartridge C; and meanwhile, the rotating rod 5 propels the developing roller 11 to be separated from photosensitive drum 21.

In this embodiment, the rotating rod 5 is rotationally mounted at a tail end of a first unit casing 1, which is located between the first unit casing 1 and an end cover 300/400. As shown in the figure, the first unit casing 1 is provided with an arc-shaped guide rail 12 at its tail end, and the main body 52 of the rotating rod 5 is provided with a guide groove 54 that fits with the guide rail 12, and the guide groove 54 surrounds the guide rail 12; under the action of the separation control mechanism 93, the rotating rod 5 rotates along the guide rail 12, and a lower surface 541 of the guide groove 54 extrudes a lower surface 121 of the guide rail 12, which in turn drives a first unit 100 to rotate around an axis of rotation L of a first driving force receiving member 3, and at this moment, the developing roller 11 is separated from the photosensitive drum 21. As shown in FIG. 49, preferably, the guide groove 54 and the guide rail 12 are concentric with the development driving force receiving member 3; a straight line D is drawn in the front-and-rear direction of the process cartridge C, intersecting with the axis of rotation L, and the straight line D passes through the guide rail 12 to ensure the stable rotation of the rotating rod 5. More preferably, the straight line D passes through a center of a circular arc of the guide rail 12, and when the rotating rod 5 rotates, a force applied to the guide rail 12 is more uniform in the up-and-down direction, which not only facilitates stable rotation of the first unit 100 and the rotating rod 5, but also ensures the smoother rotation of the rotating rod 5.

Conversely, positions of the guide rail 12 and the guide groove 54 are reversible, such that the guide rail 12 is arranged on the main body 52, while the guide groove 54 is arranged on the casing 1. As the rotating rod 5 rotates, an upper surface of the guide rail 12 pushes against an upper surface of the guide groove 54, which in turn allows the first unit 100 to rotate, thereby achieving the separation of the developing roller 11 from the photosensitive drum 21.

It is achievable that the rotating rod 5 may also be provided with a thrusting portion, and accordingly, the first unit 100 is provided with a thrusted portion corresponding to the thrusting portion. As the rotating rod 5 rotates, the thrusting portion pushes the thrusted portion, making the first unit 100 rotate around the axis of rotation L, thereby separating the developing roller 11 from the photosensitive drum 21; and the thrusting portion and the thrusted portion may be solid bodies that make contact with each other, for example, the guide groove 54 may be considered as the thrusting portion, and the guide rail 12 may be considered as the thrusted portion. Of course, the thrusting portion and the thrusted portion may also be magnetic bodies with the same polar ends opposite to each other. As the rotating rod 5 rotates, a repulsive force between the thrusting portion and the thrusted portion gradually increases until the first unit 100 rotates around the axis of rotation L.

According to the inventive concept of this embodiment, the guide rail 12 may also be arranged on the end cover 300, and the developing roller 11 is separated from the photosensitive drum 21 under an interaction between the thrusting portion arranged on the rotating rod 5 and the thrusted portion arranged on the first unit 100. Conversely, a second unit 200 rotates around an axis of rotation L21 of a second driving force receiving member 4 through the rotation of the rotating rod 5 to separate the developing roller 11 from the photosensitive drum 21. The specific implementation may refer to the structure as described above that propels the first unit 100 to rotate, which will not be repeated here.

As shown in FIG. 49, the locking portion 53 includes a first projecting portion 531 arranged on the main body 52, and the locked portion includes a base body 22 arranged on the first unit 100 or the second unit 200 or the end cover 300, and a second projecting portion 23 projecting from the base body 22. When the separation control mechanism 93 moves from the intermediate position to the separating force applying position, the rotating rod 5 rotates in the direction r2, and the thrusting portion pushes the thrusted portion, thereby separating the developing roller 11 from the photosensitive drum 21. Meanwhile, the first projecting portion 531 passes over the second projecting portion 23 and reaches the front of the second projecting portion 23, thereby achieving the engagement/locking of the locking portion 53 with the locked portion. At this moment, even if the separation control mechanism 93 returns from the separating force applying position to the intermediate position, the developing roller 11 and the photosensitive drum 21 are still kept the state where they are separated from each other. When the separation control mechanism 93 moves from the intermediate position to the restoring force applying position, the rotating rod 5 rotates in the direction against the direction r2, the first projecting portion 531 passes over the second projecting portion 23 again and reaches the rear of the second projecting portion 23, achieving the unlocking of the locking portion 53 from the locked portion. Under the action of a compression spring C3 (as shown in FIG. 3A) between the first unit 100 and the second unit 200, the developing roller 11 and the photosensitive drum 21 restore to the state where they make contact with each other.

Preferably, one end of the base body 22 is fixed to one of the first unit 100, the second unit 200, and the end cover 300, while the other end thereof is in a suspended state. Therefore, the base body 22 has a certain amount of elastic deformation, locking and unlocking are easily accessible, and a friction force between the locking portion 53 and the locked portion is smaller.

As mentioned above, both the locking portion 53 and the locked portion are arranged away from the acting portion 51. Specifically, both the locking portion 53 and the locked portion are arranged above the process cartridge in the up-and-down direction, that is, a locking assembly including the locking portion 53 and the locked portion, and the acting portion 51 are respectively located on both sides of the process cartridge in the up-and-down direction, and the locking assembly constitutes a part of the separation contact mechanism 5. On one hand, when the separation control mechanism 93 applies the acting force to the acting portion 51, there is no need to worry about unnecessary interference between the separation control mechanism 93 and the locking assembly, on the other hand, the locking portion 53 is arranged on the rotating rod 5, and the locking or unlocking of the locking portion 53 and the locked portion may be achieved by the rotation of the rotating rod 5. Such operation not only improves the efficiency of locking and unlocking, but also simplifies the structure of the process cartridge, which is conducive to improving the assembly efficiency of the process cartridge.

[Second Separation Contact Mechanism]

Figure 50:
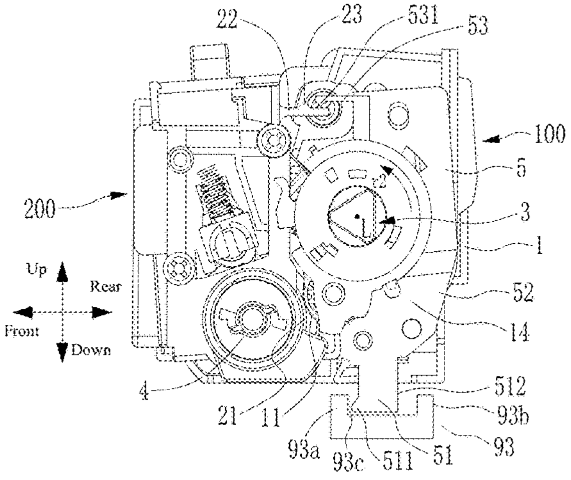
FIG. 50 is a side view showing that a second separation contact mechanism is mounted in a process cartridge casing as viewed from left to right in a left-right direction of a process cartridge involved in the present invention.

As shown in FIG. 50, the process cartridge C further includes a protecting cover 14 mounted at one tail end of the first unit 100; a part of the development driving force receiving member 3 is located between the first unit casing 1 and the protecting cover 14 to be protected; the protecting cover 14 is fixedly mounted on the casing 1, and the separation contact mechanism 5 extends downward from the protecting cover 14; and the acting portion 51 is formed on a lower part of the separation contact mechanism 5, and the separating force receiving portion 511 and the restoring force receiving portion 512, which are distributed oppositely in the front-rear direction, are located on the acting portion 51. Therefore, when the separating force or the restoring force is applied to the separation contact mechanism 5, the separation contact mechanism 5 may drive the protecting cover 14 to move, the protecting cover 14 then drives the first unit casing 1 to move, and finally, the developing roller 11 is separated from or makes contact with the photosensitive drum 21.

Wherein, the separation contact mechanism 5 and the protecting cover 14 may be formed either as an integral member or separated members, and furthermore, the protecting cover 14 may also be considered as a part of the separation contact mechanism 5, for example, the protecting cover 14 derives from a variant of the main body 52 of the separation contact mechanism 5. In the event that the separation contact mechanism 5 and the protecting cover 14 are formed as separated members, the two members may be either fixedly or movably connected, provided that the separation contact mechanism 5 is capable of transmitting the received separating force or restoring force to the protecting cover 14, and allowing the developing roller 11 to be separated from or make contact with the photosensitive drum 21.

Like the first separation contact mechanism, the locking portion 53 is arranged above the protecting cover 14, the locked portion is arranged on the first unit 100 or the second unit 200 or the end cover 300, the locking portion 53 includes a first projecting portion 531, the locked portion includes a base body 22 and a second projecting portion 23 projecting from the base body 22, the locking portion 53 engages with the locked portion to keep the developing roller 11 and the photosensitive drum 21 in the state where they are separated from each other as the separating force receiving portion 511 receives the separating force, and the locking portion 53 and the locked portion are unlocked to restore the developing roller 11 and the photosensitive drum 21 to the state where they make contact with each other as the restoring force receiving portion 512 receives the restoring force.

Similar to the first separation contact mechanism, in this embodiment, the locking portion 53 and the locked portion are arranged away from the acting portion 51. This arrangement still fulfills the objectives of preventing unnecessary interference between the separation control mechanism 93 and the locking assembly, and simplifying the structure of the process cartridge to enhance the assembly efficiency of the process cartridge.

Furthermore, the locking portion 53 is fixed relative to the first unit casing 1. Both the structure of the contact separation mechanism 5 and the structure of the process cartridge C are simplified. When the acting portion 51 receives the acting force applied by the separation control mechanism 93, the locking portion 53 may be directly controlled without transmitting the acting force through a movable component, thereby rendering the contact separation mechanism 5 with this structure highly reliable.

[Third Separation Contact Mechanism]

As shown in FIG. 51, the separation contact mechanism 5, including the main body 52 and the acting portion 51 arranged on the main body, in this embodiment is mounted in a movable manner. When the acting portion 51 receives the separating force from the separation control mechanism 93, the acting portion 51 itself or a component linked with the acting portion allows the first unit 100 to rotate around the axis of rotation L in the direction r2, thereby separating the developing roller 11 from the photosensitive drum 21; and a part of the acting portion 51 abuts against the separation control mechanism 93 for locking, and the developing roller 11 and the photosensitive drum 21 are kept in the state where they are separated from each other. When the acting portion 51 receives the restoring force from the control separation mechanism 93, the locking state of the acting portion 51 is released, the first unit 100 rotates around the axis of rotation L in the direction against the direction r2, thereby bringing the developing roller 11 to make contact with the photosensitive drum 21. Specifically, the separation contact mechanism 5 further includes the locking assembly 6 arranged in the acting portion 51, and the movement process of the locking assembly 6 will be described with reference to FIGS. 52A-52G.

The locking assembly 6 includes a first movable member 61, a second movable member 62, and a rotating member 63, wherein both the first movable member 61 and the second movable member 62 extend in the front-rear direction and may make movement in the front-rear direction after receiving the acting force from the separation control mechanism 93; the rotating member 63 is used to connect the first movable member 61 and the second movable member 62; and after one of the first movable member 61 and the second movable member 62 is subjected to the acting force, the rotating member 63 transmits the acting force to the other movable member. The locking assembly 6, as a whole, forms a linkage, and moreover, when the developing roller 11 makes contact with or is separated from the photosensitive drum 21, the rotating member 63 remains locked with at least one of the first movable member 61 and the second movable member 62. In the following text, an example is provided where the rotating member 63 may remain locked with the first movable member 61.

Figure 52A:
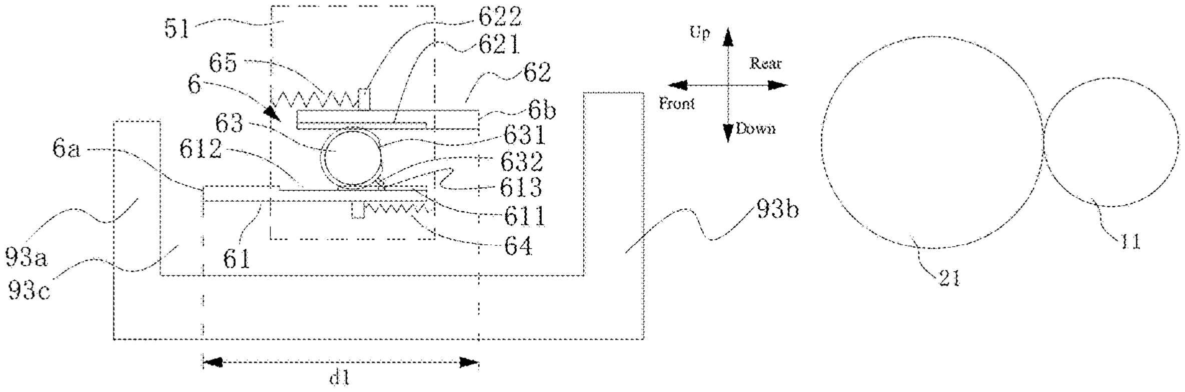
FIG. 52A to FIG. 52G are schematic diagrams showing movement processes of controlling, by a third separation contact mechanism in a process cartridge involved in the present invention, separation and contact of a developing roller and a photosensitive drum under an action of a separation control mechanism.

As shown in FIG. 52A, the locking assembly 6 further includes a first elastic member 64 that abuts against the first movable member 61 and a second elastic member 65 that abuts against the second movable member 62; when the process cartridge C reaches the preset position of the image forming apparatus, the acting portion 51 enters the movable cavity 93*c*; neither the first movable member 61 nor the second movable member 62 makes contact with the separation control mechanism 93 within the image forming apparatus; at least one of the first movable member 61 and the second movable member 62 serves as a rack; the rotating member 63 includes a gear that engages with the rack and a stop portion 632 connected to the gear directly or indirectly; and an empty portion 631 is arranged adjacent to the stop portion 632, and the stop portion 632 may rotate with the rotation of the gear.

The first movable member 61 is provided with a toothed portion 611 and a toothless portion 612 which are distributed adjacent to each other, and the second movable member 62 is provided with a toothed portion 621. As shown in FIG. 52A, at the initial stage, the developing roller 11 makes contact with the photosensitive drum 21, a front tail end (first force-receiving end) 6*a* of the first movable member 61 and a rear tail end (second force-receiving end) 6*b* of the second movable member 62 are located outside the acting portion 51, a distance between the first force-receiving end 6*a* and the second force-receiving end 6*b* is d1 in the front-rear direction, and alternatively, the dimension of the locking assembly 6 in the front-rear direction is d1; the gear of the rotating member engages with both the toothed portion 611 of the first movable member and the toothed portion 621 of the second movable member; at least the first elastic member 64 in the first elastic member 64 and the second elastic member 65 is in an elastic deformation state; and the stop portion 632 engages with the toothed portion 611 of the first movable member behind the gear of the rotating member. Although the first elastic member 64 has a tendency to push the first movable member 61 forward or the second elastic member 65 has a tendency to push the second movable member 62 backward, the locking assembly 6 generally remains stationary in the self-locking state under the interaction between the stop portion 632 and the tooth portion 611 of the first movable member.

Figure 52B:
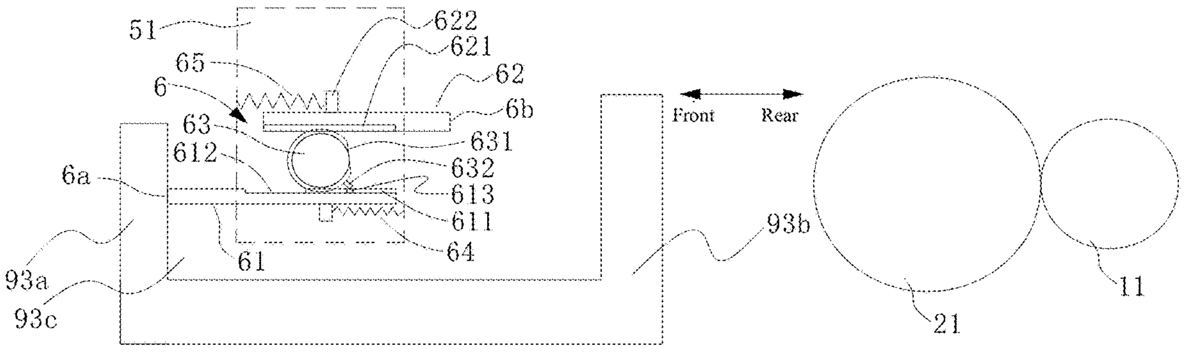
Figure 52C:
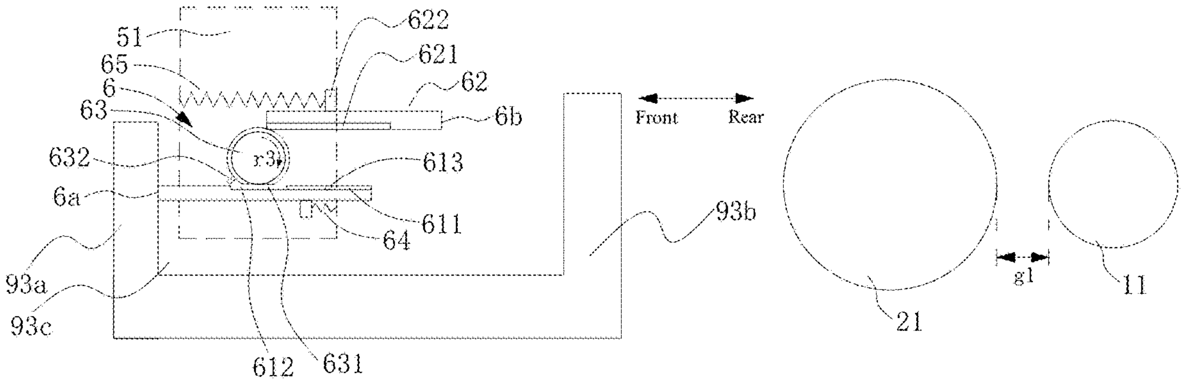

When the process cartridge C does not need to operate in the image forming apparatus, the separation control mechanism 93 moves from the intermediate position towards the separating force applying position. As shown in FIG. 52B, the separating force applying portion 93*a* begins to make contact with the front tail end (first force-receiving end) 6*a* of the first movable member 61, and at this moment, the developing roller 11 and the photosensitive drum 21 are still kept in the state where they make contact with each other. As the separation control mechanism 93 pushes and compresses the first force-receiving end 6*a* backward, the first movable member 61 moves backward, and the first elastic member 64 is elastically deformed. When the stop portion 632 is opposite to the toothless portion 612, the rotating member 63 rotates in the direction r3 in FIG. 52C. As shown in FIG. 52C, the first movable member 61 has a tendency to move forward under the elastic force of the first elastic member 64, and meanwhile, the gear of the rotating member and the elastic force of the second elastic member 65 both drive the second movable member 62 to move backward; the second force-receiving end 6*b* abuts against an abutted portion 15 arranged on the first unit 100, thereby allowing the first unit 100 to rotate around the axis of rotation L in the direction r2; and the developing roller 11 is separated from the photosensitive drum 21, and a first gap g1 is formed therebetween. Apparently, the elastic force of the second elastic member 65 is greater than that of a compression spring C3.

Figure 52D:
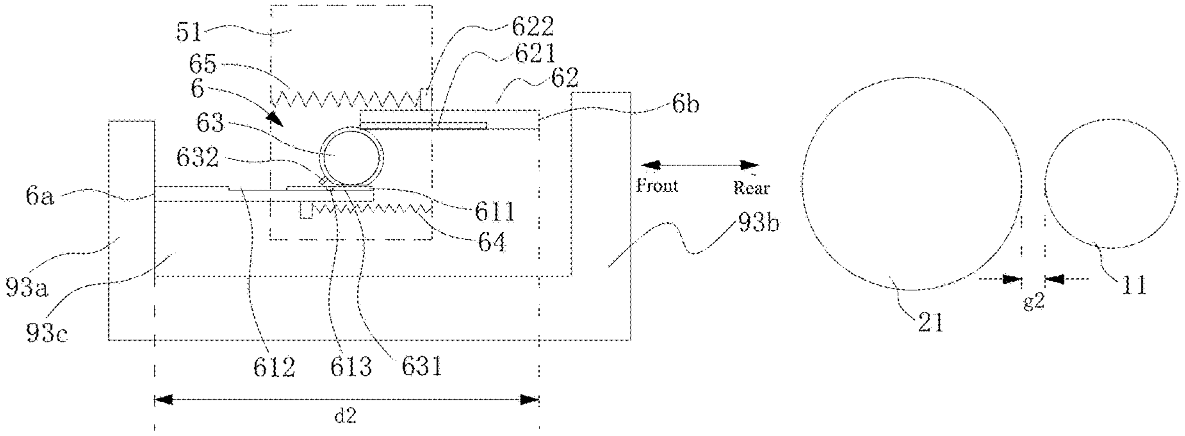

As shown in FIG. 52D, after applying the separating force to the locking assembly 6, the separation control mechanism 93 begins to move from the separating force applying position towards the intermediate position, the first elastic member 64 releases the elastic force, and the first movable member 61 moves forward following the separation control mechanism 93. During the process in which the stop portion 632 passes through the toothless portion 612, the second movable member 62 slightly moves forward by a certain distance under a reaction force of the first unit 100, while the developing roller 11 remains separated from the photosensitive drum 21. However, the distance between them is reduced to g2 as shown in FIG. 52D, the stop portion 632 engages with the toothed portion 611 of the first movable member in front of the gear of the rotating member, the first force-receiving end 6*a* remains abutted against the separating force applying portion 93*a*, the first movable member 61 is locked, and correspondingly, the second movable member 62 also no longer moves. At this moment, the dimension of the locking assembly 6 in the front-rear direction is d2, which satisfies d2>d1.

Figure 52E:
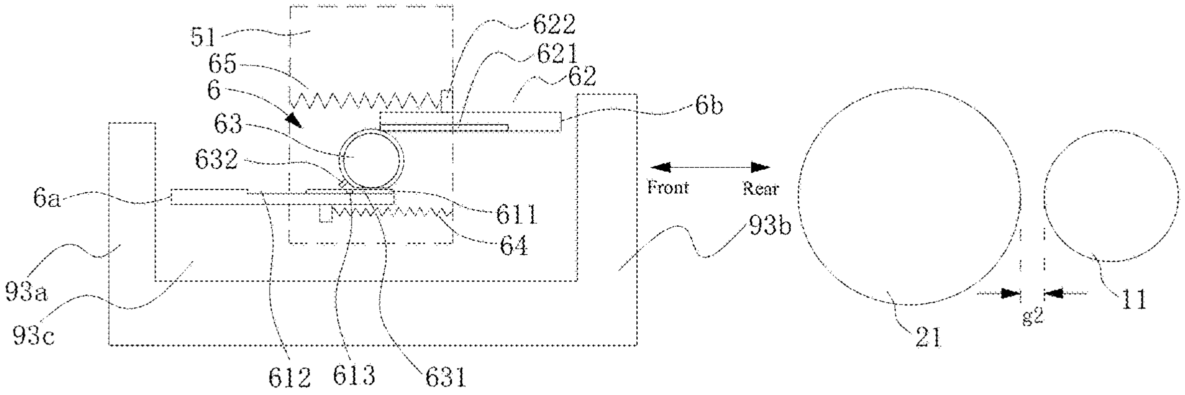
Figure 52F:
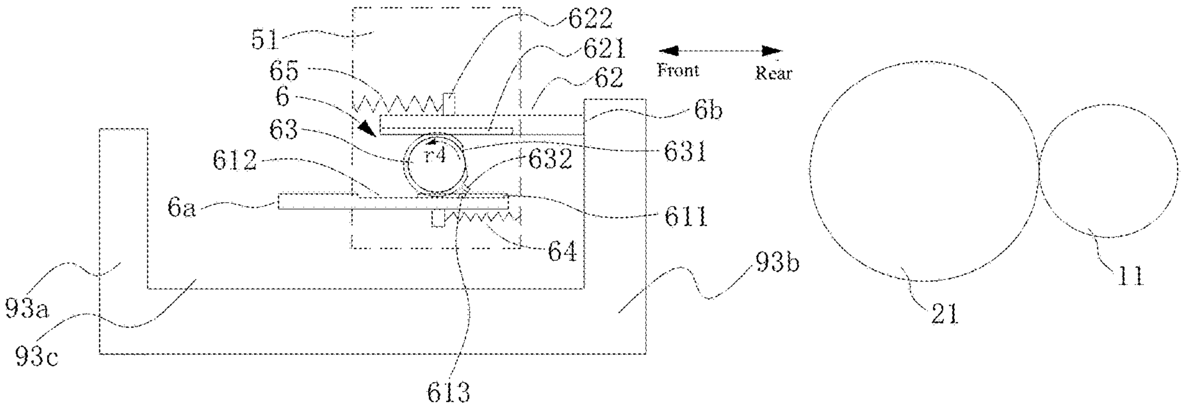

When the process cartridge C needs to begin to operate again in the image forming apparatus. As shown in FIG. 52E, the separation control mechanism 93 begins to move from the intermediate position towards the restoring force applying position, at this moment, the developing roller 11 still remains separated from the photosensitive drum 21, and the stop portion 632 is opposite to a fitting groove 613 formed in the first movable member. As shown in FIG. 52F, the restoring force applying portion 93*b* begins to abut against the second movable member 62. Under the action of the restoring force applying portion 93*b*, the second movable member 62 drives the rotating member 63 to rotate in the direction r4 in the figure. Meanwhile, the rotating member 63, through the fitting between the stop portion 632 and the fitting groove 613, drives the first movable member 61 to move backward, the second elastic member 65 is elastically deformed again, the first unit 100 is no longer abutted, and thus, the developing roller 11 and the photosensitive drum 21 return to the position where they make contact with each other.

Figure 52G:
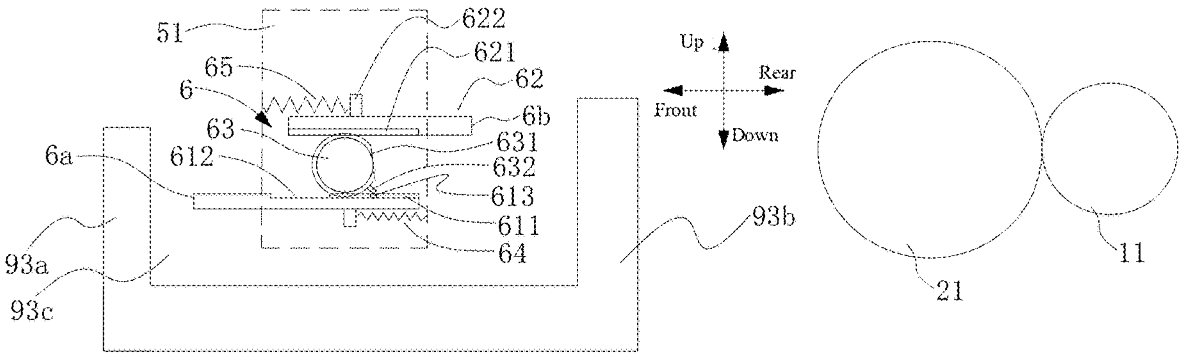

As the separation control mechanism 93 moves forward by a preset distance and begins to move from the restoring force applying position towards the intermediate position; as shown in FIG. 52G, the second movable member 62 stops moving forward, the rotating member 63 and the first movable member 61 also stop moving synchronously; and furthermore, the locking portion 632 engages with the toothed portion 611 of the first movable member behind the gear of the rotating member again, and the locking assembly generally remains stationary in the self-locking state again.

As mentioned above, the stop portion 632 may also engage with the toothed portion 621 of the second movable member 62 to lock the second movable member 62, and at this moment, the toothless portion is further arranged on the second movable member 62. When the developing roller 11 makes contact with the photosensitive drum 21, the locking portion 632 engages with the toothed portion 621 of the second movable member in front of the gear of the rotating member. When the developing roller 11 is separated from the photosensitive drum 21, the locking portion 632 engages with the toothed portion of 621 of the second movable member behind the gear of the rotating member.

Optionally, the locking portion 632 and the empty portion 631 may be arranged on a rotary body that is coaxial with the gear of the rotating member, where a diameter of the rotary body is greater than that of the gear of the rotating member; and alternatively, the empty portion 631 is not required, and the diameter of the rotary body is set to be smaller than that of the gear of the rotating member, with the stop portion 632 projecting from the rotary body, provided that the stop portion 632 may engage with the first movable member 61 or the second movable member 62 when the developing roller 11 makes contact with or is separated from the photosensitive drum 21, making the locking assembly 6 remain in the self-locking state.

Similarly, the separation contact mechanism 5 may also be arranged on the second unit 200 or the end cover 300. When the separation contact mechanism 5 is arranged on the second unit 200, the locking component 6 allows the second unit 200 to rotate around the axis of rotation L21, thereby separating the developing roller 11 from the photosensitive drum 21. When the separation contact mechanism 5 is arranged on the end cover 300, the locking assembly 6 may not only enable the first unit 100 to rotate around the axis of rotation L, but also allows the second unit 200 to rotate around the axis of rotation L21, which may ultimately separate the developing roller 11 from the photosensitive drum 21.

Preferably, the first movable member 61 and the second movable member 62 are configured to be the racks. Alternatively, the first movable member 61 and the second movable member 62 may further be configured to have surfaces such as frosted surfaces and rubber surfaces. Outer surfaces of teeth of the gear in the rotating member 63 may also be replaced with the frosted surfaces and the rubber surfaces, provided that the acting force may be transmitted between the first movable member 61 and the second movable member 62, and moreover, when the developing roller 11 makes contact with or is separated from the photosensitive drum 21, the stop portion 632 abuts against the first movable member 61 or the second movable member 62, thereby making the locking assembly 6 remain in the self-locking state as a whole.

Furthermore, in order to prevent interference between the separation contact mechanism 5 and an inner wall of the image forming apparatus during the movement of the process cartridge C towards the preset position of the image forming apparatus, before the process cartridge C in this embodiment reaches the preset position, the separation contact mechanism 5 is in the "retracted" state. In this way, regardless of whether the process cartridge C moves directly down to the preset position or is pre-mounted downward and then moves forward to the preset position, the separation contact mechanism 5 will not touch the inner wall of the image forming apparatus.

As shown in FIG. 51, an upper tail end of the main body 52 is provided with a pressed portion 57, and the main body 52 is also provided with a movable groove 55 and an elastic member (not shown) mounted in the movable groove 55; a support body 13 is arranged at a longitudinal tail end of the first unit casing 1, one end of the elastic member abuts against the support body 13, and the other end abuts against a tail end of the movable groove 55; under an elastic force of the elastic member, the separation contact mechanism 5, as a whole, is pushed upward to a position not exceeding the first unit 100, the second unit 200, and the bottom of the end cover 300; the acting portion 51 is not allowed to interfere with the separation control mechanism 93; after the process cartridge C reaches the preset position, the pressed portion 57 is pressed by means of a top plate of the image forming apparatus, for example, a pressing mechanism may be the top plate 94 linked with a door cover of the image forming apparatus; when the door cover is closed, the top cover 94 presses the pressed portion 57, and the separation contact mechanism 5 overcomes the elastic force of the elastic member to allow at least the acting portion 51 to "extend", i.e., to extend beyond the first unit 100, the second unit 200, and the bottom of the end cover 300; and the acting portion 51 enters the movable cavity 93*c* of the separation control mechanism 93 and is capable of receiving the acting force applied by the separation control mechanism 93. It could be understood that at least the acting portion 51 of the separation contact mechanism 5 is configured to extend and retract in the up-and-down direction, and such a configuration may also be applied to the first separation contact mechanism and the second separation contact mechanism.

In this embodiment, the locking assembly 6 is arranged in the acting portion 51. Similarly, when the separation control mechanism 93 applies the acting force to the acting portion 51, there is no need to worry about unnecessary interference between the separation control mechanism 93 and the locking assembly 6. Although the separation control mechanism 93 fulfills the objective of controlling the developing roller 11 and the photosensitive drum 21 to be close to or away from each other by applying the acting force to the locking assembly 6, when the locking assembly 6 does not need to receive the acting force, the separation control mechanism 93 will not interfere with the locking assembly 6, wherein the unnecessary interference refers to interference, that occurs, between the separation control mechanism 93 and the locking assembly 6 when the locking assembly 6 does not need to receive the acting force. Furthermore, the locking assembly 6 is arranged in the acting portion 51, which also achieves the effects of simplifying the structure of the process cartridge C and improving the assembly efficiency of the process cartridge.

[Fourth Separation Contact Mechanism]

In this embodiment, the fourth separation contact mechanism 5 is of a substantially identical structure to the third separation contact mechanism, with the difference in that in this embodiment, the separation contact mechanism 5 is connected to the protecting cover 14. When the developing roller 11 needs to be separated from the photosensitive drum 21, the position of abutment for the second movable member 62 of the locking assembly 6 is altered.

Figure 53:
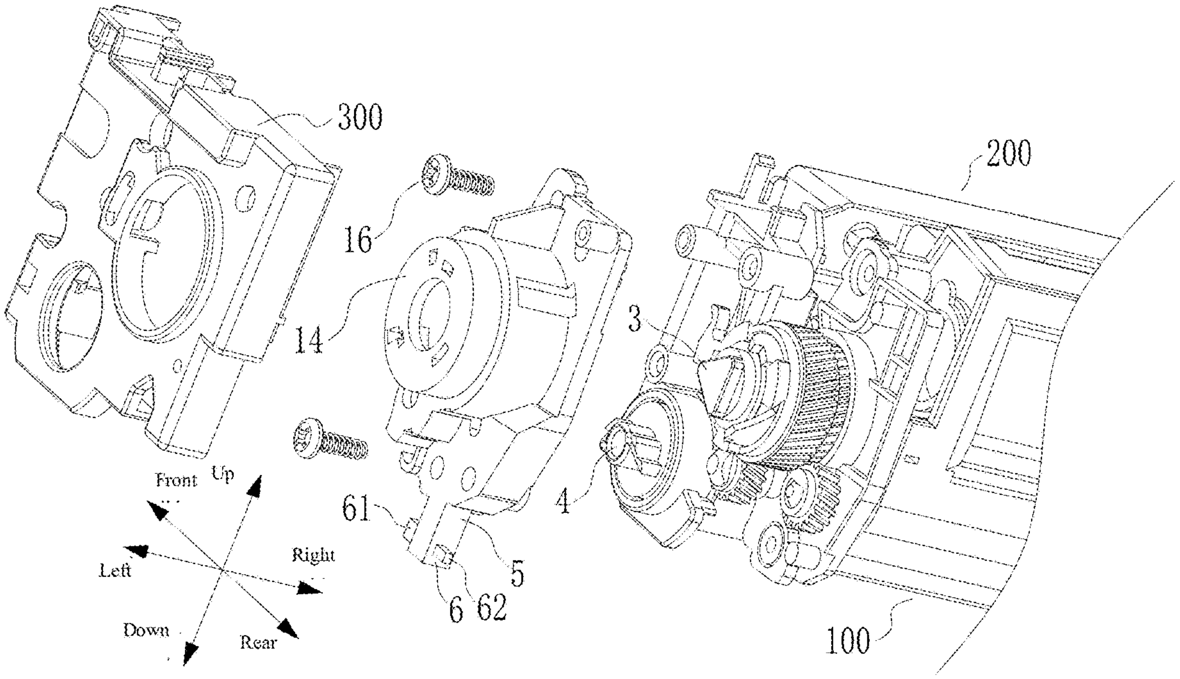
FIG. 53 is a schematic decomposition diagram of a fourth separation contact mechanism in a process cartridge and a process cartridge casing involved in the present invention.
Figure 54:
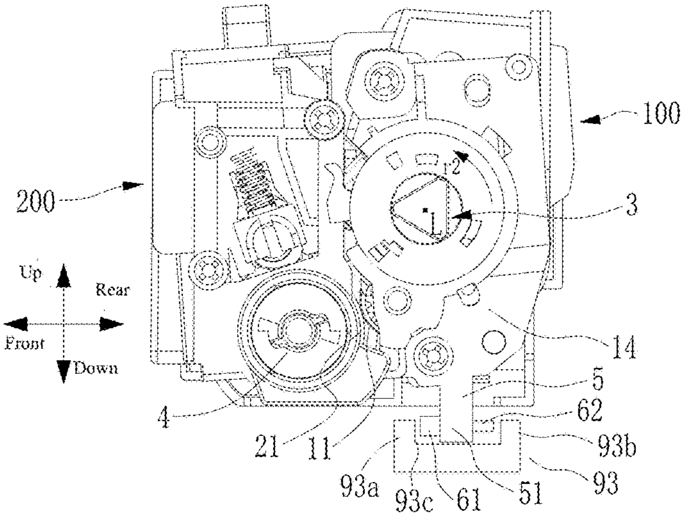
FIG. 54 is a side view showing that a fourth separation contact mechanism is mounted in a process cartridge casing as viewed from left to right in a left-right direction of a process cartridge involved in the present invention.

As shown in FIGS. 53 and 54, both the first movable member 61 and the second movable member 62 extend from the acting portion 51, which are respectively used for engaging with the separating force applying portion 93*a* and the restoring force applying portion 93*b* of the separation control mechanism 93. In this embodiment, the second movable member 62 is further provided with a drive projection 622 (as shown in FIGS. 52A-52G), and the movement process of the locking assembly 6 in this embodiment is the same as that of the third separation contact mechanism. Therefore, the movement process of the locking assembly 6 is not described repeatedly. It needs to be mentioned that unlike the above embodiment, the separating force applied by the separating force applying portion 93*a* is transmitted from the drive projection 622 to the acting portion 51, and is then transmitted from the acting portion 51 to the protecting cover 14, and finally, the protecting cover 14 drives the first unit 100 to rotate around the axis of rotation L in the direction r2, thereby separating the developing roller 11 from the photosensitive drum 21.

[Fifth Separation Contact Mechanism]

In this embodiment, the separating force applied by the separating force applying portion 93*a* is still transmitted from the acting portion 51 to the protecting cover 14 firstly, and the protecting cover 14 then drives the first unit 100 to rotate around the axis of rotation L in the direction r2, thereby separating the developing roller 11 from the photosensitive drum 21.

As mentioned above, during the mounting of the process cartridge C towards the preset position in the image forming apparatus, at least the acting portion 51 of the separation contact mechanism 5 is configured to move in the up-and-down direction of the process cartridge C in order to prevent interference between the separation contact mechanism 5 and the inner wall of the image forming apparatus. Before the process cartridge C is mounted to the preset position of the image forming apparatus, the separation contact mechanism 5 remains in the retracted state. When the process cartridge C reaches the preset position of the image forming apparatus and is extruded by the inner wall of the image forming apparatus, the separation contact mechanism 5 extends, and at least the acting portion 51 enters the movable cavity 93*c* for receiving the acting force applied by the separation control mechanism 93.

Figure 55:
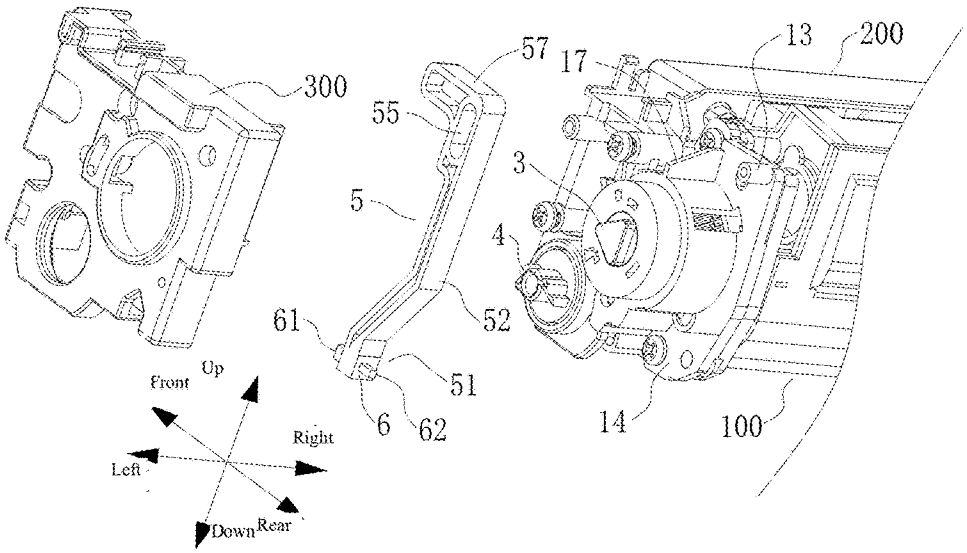
FIG. 55 is a schematic decomposition diagram of a fifth separation contact mechanism in a process cartridge and a process cartridge casing involved in the present invention.
Figure 56A:
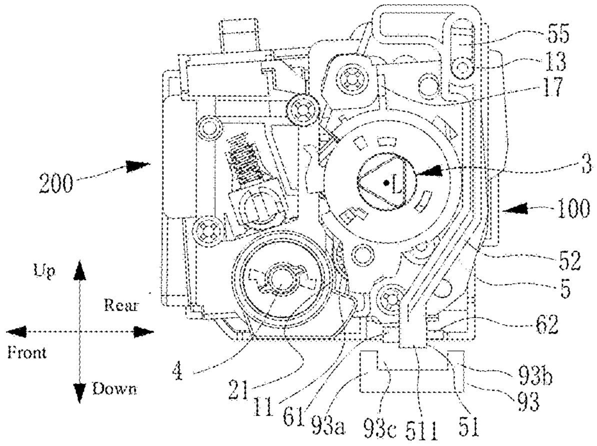
FIG. 56A and FIG. 56B are side views showing that a fifth separation contact mechanism is mounted in a process cartridge casing as viewed from left to right in a left-right direction of a process cartridge involved in the present invention.
Figure 56B:
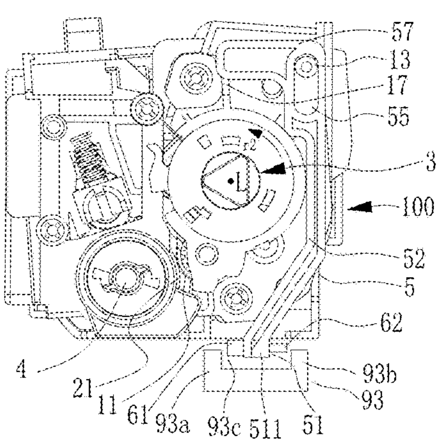

As shown in FIG. 55, the main body 52 is further provided with the movable groove 55 and the pressed portion 57 as shown in FIG. 51, one end of the elastic member (not shown) abuts against the movable groove 55, and the other end abuts against the support body 13. The pressed portion 57 has a larger length in the front-rear direction than that it has in the above embodiment. As shown in FIGS. 56A and 56B, when the pressed portion 57 is pressed by the inner wall of the image forming apparatus, the pressed portion 57 may engage with a rib 17 on the protecting cover 14. When the separating force applying portion 93*c* applies the separating force to the locking assembly 6, the first movable member 61 is locked, and the separating force is transmitted from the drive projection 622 to the main body 52, making the main body 52 rotate in the counter-clockwise direction around the support body 13. Meanwhile, the pressed portion 57 pushes the rib 17, allowing the first unit 100 to rotate around the axis of rotation L in the direction r2, thereby separating the developing roller 11 from the photosensitive drum 21. In contrast, when the restoring force applying portion 93*b* applies the restoring force to the locking assembly 6, the first movable member 61 is unlocked, the first unit 100 rotates, under the action of the compression spring C3, around the axis of rotation L in the direction against the direction r2, and the developing roller 11 and the photosensitive drum 21 restore to the state where they make contact with each other.

As mentioned above, after the separation control mechanism 93 in the image forming apparatus applies the separating force and the restoring force to the separation contact mechanism 5, the separation control mechanism may return to the intermediate position where it no longer contacts the separation contact mechanism 5; when the separation control mechanism 93 applies the acting force (including the separating force and the restoring force) to the separation contact mechanism 5, the corresponding components (the separating force applying portion 93*a* and the restoring force applying portion 93*b*) of the separation control mechanism 93 have reduced movement distance, which is advantageous for reducing the size of the image forming apparatus. Furthermore, the separation contact mechanism 5 of the present invention has the locking function, after the developing roller 11 is separated from the photosensitive drum 21, the separation contact mechanism 5 is locked, and even if the image forming apparatus sways by an external force, the developing roller 11 and the photosensitive drum 21 may also remain in the stable state where they are separated from each other.

Similar to the third separation contact mechanism, the locking assemblies 6 in this embodiment and the fourth separation contact mechanism are also arranged in the acting portion 51. Therefore, there is no unnecessary interference between the separation control mechanism 93 and the locking assembly, and the structure of the process cartridge C is also simplified. Correspondingly, the assembly efficiency of the process cartridge may also be improved.

[Sixth Separation Contact Mechanism]

Figure 57A:
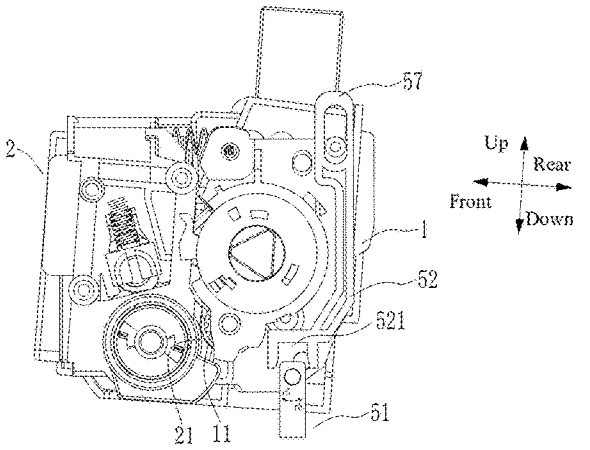
FIG. 57A is a side view as viewed from left to right in a left-right direction before a separation contact mechanism is pressed after a process cartridge with the sixth separation contact mechanism reaches a mounting position.
Figure 57B:
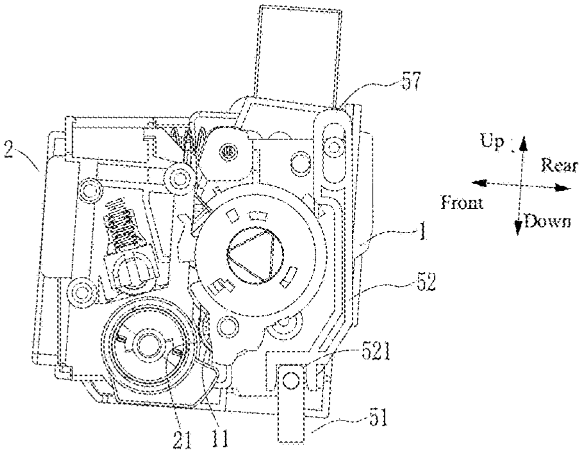
FIG. 57B is a side view as viewed from left to right in a left-right direction after a separation contact mechanism is pressed after a process cartridge with the sixth separation contact mechanism reaches a mounting position.

As shown in FIGS. 57A and 57B, the separation contact mechanism 5 in this embodiment includes the main body 52 and the acting portion 51 which are formed as separated members, the pressed portion 57 is located at an upper tail end of the main body 52, and an intermediate portion 521 that may engage with the acting portion 51 is arranged at a lower tail end of the main body 52; and the acting portion 51 is rotationally arranged at longitudinal tail ends of the process cartridge, for example, the acting portion 51 is arranged at the longitudinal tail end of the first unit casing 1 through fits for shafts and holes.

Before the pressed portion 57 is pressed by the top plate of the image forming apparatus, the intermediate portion 521 is located at a first position where it does not engage with the acting portion 51, and the acting portion 51 remains in a drooping state under the action of gravity. Regardless of whether the process cartridge C is mounted towards the image forming apparatus or removed from the image forming apparatus, and even if the components in the image forming apparatus interfere with the acting portion 51, the acting portion 51 may still rotate in the direction r5 or r6 in FIG. 57A.

When the pressed portion 57 is pressed by the top plate of the image forming apparatus, the intermediate portion 521 is located at a second position where it engages with the acting portion 51, an angle of rotation of the acting portion 51 is limited, or the acting portion 51 is unable of rotating due to the limitation by the intermediate portion 521. However, the acting portion 51 may still receive the acting force applied by the separation control mechanism 93 in two different directions, one of which is the separating force that separates the developing roller 11 from the photosensitive drum 21, while the other one is the restoring force that makes the developing roller 11 get close to the photosensitive drum 21. Preferably, the separation receiving mechanism 5 is further provided with a holding member, after the separation control mechanism 93 applies the separating force to the separation receiving mechanism 5, the separation control mechanism 93 disengages from the separation receiving mechanism 5, and at this moment, the state where the developing roller 11 is separated from the photosensitive drum 21 is kept by the holding member. When the pressed portion 57 is no longer pressed by the top plate, the intermediate portion 521 returns from the second position to the first position.

However, in some embodiments, the holding member may also be removed, and after the separation control mechanism 93 applies the separating force to the separation receiving mechanism 5, the separation control mechanism 93 does not disengage from the separation receiving mechanism 5, and the state where the developing roller 11 is separated from the photosensitive drum 21 is kept under the interaction between the separation control mechanism 93 and the separation receiving mechanism 5.

[Seventh Separation Contact Mechanism]

Figure 58A:
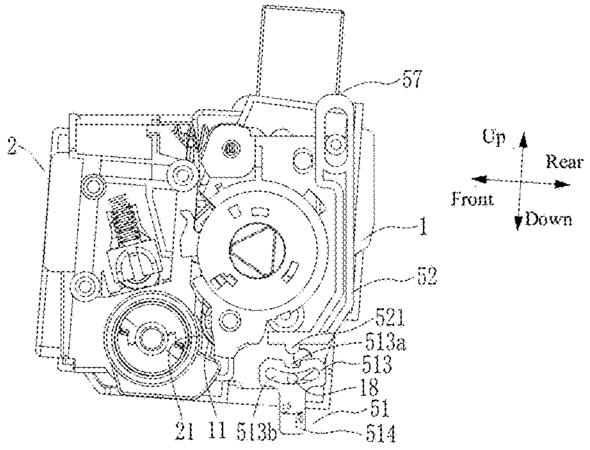
FIG. 58A is a side view as viewed from left to right in a left-right direction before a separation contact mechanism is pressed after a process cartridge with the seventh separation contact mechanism reaches a mounting position.
Figure 58B:
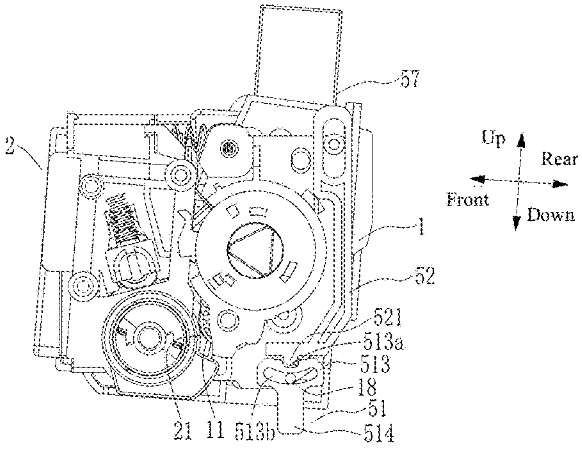
FIG. 58B is a side view as viewed from left to right in a left-right direction after a separation contact mechanism is pressed after a process cartridge with the seventh separation contact mechanism reaches a mounting position.

As shown in FIGS. 58A and 58B, unlike the sixth separation contact mechanism, in this embodiment, before the pressed portion 57 is pressed by the top plate of the image forming apparatus, the angle of rotation of the acting portion 51 is limited, which may prevent the situation that the acting portion 51 rotates excessively, resulting in inability to restore to the drooping state. As shown in the figure, the acting portion 51 includes a rotating portion 513 and an acting force receiving portion 514 which engage with each other, and the acting portion 51 is rotationally arranged at the longitudinal tail end of the first unit casing 1 via the rotating portion 513. Specifically, a limiting groove 513*b* is formed in the rotating portion 513, the first unit 100 is provided with a positioning projection 18 which fits with the limiting groove 513*b*, and the angle of rotation of the acting portion 51 is limited by a length of the limiting groove 513*b*. Conversely, the position of the limiting groove 513*b* and the position of the positioning projection 18 are reversible. Furthermore, the rotating portion 513 is further provided with a fitting portion 513*a* which is used to fit with the intermediate portion 521.

Before the pressed portion 57 is pressed by the top plate of the image forming apparatus, the intermediate portion 521 does not engage with the fitting portion 513*a*, and the acting portion 51 remains in the drooping state under the action of gravity. Regardless of whether the process cartridge C is mounted towards the image forming apparatus or removed from the image forming apparatus, and even if the components in the image forming apparatus interfere with the acting portion 51, the acting portion 51 may still rotate in the direction r5 or r6 in FIG. 58A. However, the angle of rotation of the acting portion 51 is limited by contact between the positioning projection 18 and the limiting groove 513*b*.

When the pressed portion 57 is pressed by the top plate of the image forming apparatus, the intermediate portion 521 engages with the acting portion 51, the angle of rotation of the acting portion 51 is limited, or the acting portion 51 is limited by the intermediate portion 521, resulting in failure to rotate. However, the acting portion 51/acting force receiving portion 514 may still receive the acting force applied by the separation control mechanism 93.

What is claimed is:

1. A driving force receiving member, used for receiving a driving force from an image forming apparatus, the image forming apparatus comprising:
- a driving portion, and
- a braking portion,
- wherein the driving portion and the braking portion rotate in a same direction,
- wherein the braking portion is configured to rotate with the driving portion,
- wherein the braking portion is configured to move relative to the driving portion,
- wherein the braking portion is located on a downstream side of the driving portion in a direction of rotation; and
- wherein, when the driving portion rotates, the driving force receiving member is driven by the driving portion or the braking portion, and the driving force receiving member is not braked by the braking portion,
- wherein the braking portion is maintained in a retracted or disabled state when the driving portion rotates.

2. The driving force receiving member according to claim 1, wherein the driving force receiving member comprising:
- a connecting portion, and
- an engaging portion,
- wherein the connecting portion is used for being connected with an external component of the driving force receiving member;
- wherein the engaging portion comprises a guide surface, a first surface and a second surface,
- wherein the first surface and the second surface are adjacent to the guide surface, the guide surface guides the braking portion to move relative to the driving portion, the first surface is used for abutting against the driving portion or the braking portion to receive the driving force, and the second surface is spaced from the braking portion.

3. The driving force receiving member according to claim 1, wherein when the driving force receiving member is driven, the braking portion is pressed by the driving force receiving member to retract.

4. The driving force receiving member according to claim 3, wherein the driving force receiving member has a tail end surface along an axis of rotation of the driving force receiving member, and the braking portion is pressed by the tail end surface.

5. The driving force receiving member according to claim 3,
- wherein the driving force receiving member comprises an engaging portion and an engaged portion, wherein the engaging portion is used for receiving the driving force, and the engaged portion is used for transmitting the driving force received by the engaging portion; and the engaging portion comprises a base and a convex block, wherein the convex block is located on a radial outer side of the base in a radial direction of the driving force receiving member, the convex block has a driving surface for receiving the driving force, the base has an abutting surface along an axis of rotation of the driving force receiving member, and the braking portion is kept in a retracted state by abutting against the abutting surface.

6. The driving force receiving member according to claim 3, wherein the driving force receiving member comprises an engaging portion and an engaged portion, wherein the engaging portion is used for receiving the driving force, and the engaged portion is used for transmitting the driving force received by the engaging portion; and the engaging portion comprises a base and a convex block, wherein the convex block is located on a radial outer side of the base in a radial direction of the driving force receiving member, the convex block has a driving surface for receiving the driving force, and a tail end surface of the base is formed as a pressing surface for keeping the braking portion in a retracted state.

7. The driving force receiving member according to claim 1, wherein the driving force receiving member is configured to be mounted to the image forming apparatus with a process cartridge, the driving force receiving member has driving force receiving portions, the driving force receiving portions have surfaces for receiving the driving force, and when the process cartridge is mounted at a preset position of the image forming apparatus, the surfaces reach a downstream side of the braking portion in the direction of rotation.

8. The driving force receiving member according to claim 7, wherein the two driving force receiving portions are oppositely arranged radially, two driving spaces are formed between the two driving force receiving portions in a circumferential direction of the driving force receiving member, and each of the two driving spaces is used for accommodating the driving portion and the braking portion.

9. The driving force receiving member according to claim 7, wherein the image forming apparatus is provided with a force output member comprising the driving portion and the braking portion, the braking portion comprises a first braking engagement member and a second braking engagement member, wherein the first braking engagement member and the second braking engagement member are configured to jointly rotate around an axis of rotation of the force output member, and the first braking engagement member is located on an outer side of the second braking engagement member in a radial direction of the force output member; and the driving force receiving portions have driving surfaces for receiving the driving force, and the driving surfaces are opposite to the first braking engagement member or the second braking engagement member in the direction of rotation of the driving force receiving member.

10. The driving force receiving member according to claim 9, wherein in a direction of rotation of the force output member, the first braking engagement member has an outer output surface located on a downstream side of a first braking engagement member body, the second braking engagement member has an inner output surface located on a downstream side of a braking engagement member body, the outer output surface and the inner output surface are helically arranged in a direction against the direction of rotation of the force output member, and the driving surfaces fit with the outer output surface or the inner output surface.

11. The driving force receiving member according to claim 1, wherein when the driving force receiving member is driven, the braking portion is disabled, and the image forming apparatus transmits the driving force to the driving force receiving member through the driving portion or the braking portion.

12. The driving force receiving member according to claim 1, wherein the image forming apparatus is provided with a force output member comprising the driving portion and the braking portion, and the driving force receiving member further comprises an anti-disengaging portion for preventing the driving force receiving member from disengaging from the force output member.

13. The driving force receiving member according to claim 12, wherein two driving portions are oppositely arranged in a radial direction of the force output member, and the force output member further comprises an intermediate plate arranged between the two driving portions and a positioning pillar projecting from the intermediate plate; and the driving force receiving member further comprises a central pillar allowing the positioning pillar to enter, and the anti-disengaging portion is arranged on the central pillar.

14. The driving force receiving member according to claim 1, wherein the driving force receiving member comprises an engaging portion, an engaged portion, and a holding member located between the engaging portion and the engaged portion; wherein the engaging portion is used for receiving the driving force, the engaged portion is used for transmitting the driving force received by the engaging portion, and the holding member is used for pushing the engaging portion away from the engaged portion along an axis of rotation of the driving force receiving member.

15. The driving force receiving member according to claim 1, wherein the driving force receiving member comprises a connecting portion and an engaging portion directly or indirectly connected with the connecting portion, wherein the engaging portion has a driving surface and a guide surface, the driving surface is used for receiving the driving force, the guide surface is used for guiding the driving portion or the braking portion to engage with the driving force receiving member, and the connecting portion is used for transmitting the driving force received by the driving surface; and a longest distance between the driving surface and the connecting portion is equal to a longest distance between the guide surface and the connecting portion along an axis of rotation of the driving force receiving member.

16. A process cartridge, comprising a casing, a rotating member rotationally supported by the casing, and the driving force receiving member according to claim 1, wherein the driving force receiving member directly or indirectly drives the rotating member.

17. The process cartridge according to claim 16, wherein the image forming apparatus comprises a separation control mechanism, wherein the separation control mechanism is configured to reciprocate among an intermediate position, a separating force applying position and a restoring force applying position, the intermediate position is different from the separating force applying position and the restoring force applying position, and the separating force applying position and the restoring force applying position are located on two sides of the intermediate position respectively; the process cartridge further comprises a first unit, a second unit, a developing roller, a photosensitive drum, a separation contact mechanism, and end covers, wherein the developing roller and the photosensitive drum are mounted in the first unit and the second unit respectively, and the separation contact mechanism is used for interacting with the separation control mechanism; when the process cartridge does not need to operate in the image forming apparatus, the separation control mechanism firstly moves from the intermediate position to the separating force applying position, and then returns to the intermediate position from the separating force applying position, and at the separating force applying position, the separation control mechanism applies a separating force for separating the developing roller from the photosensitive drum to the separation contact mechanism; when the process cartridge needs to operate in the image forming apparatus again, the separation control mechanism firstly moves from the intermediate position to the restoring force applying position, and then returns to the intermediate position from the restoring force applying position, and at the restoring force applying position, the separation control mechanism applies a restoring force for bringing the developing roller into contact with the photosensitive drum to the separation contact mechanism; and the separation contact mechanism has a locking portion, and a locked portion directly engaging with the locking portion is arranged on the first unit or the second unit or the end covers; and the end covers are located at longitudinal tail ends of the process cartridge.

18. The process cartridge according to claim 17, wherein the locking portion comprises a first projecting portion, the locked portion comprises a base body and a second projecting portion projecting from the base body, the locking portion and the locked portion engage with each other to keep the developing roller and the photosensitive drum in a separated state when the separation contact mechanism receives the separating force, and the locking portion and the locked portion are unlocked to restore the developing roller and the photosensitive drum to a contact state when the separation contact mechanism receives the restoring force.

19. The process cartridge according to claim 16, wherein the image forming apparatus comprises a separation control mechanism, wherein the separation control mechanism is configured to reciprocate among an intermediate position, a separating force applying position and a restoring force applying position, the intermediate position is different from the separating force applying position and the restoring force applying position, and the separating force applying position and the restoring force applying position are located on two sides of the intermediate position respectively; the process cartridge further comprises a developing roller, a photosensitive drum and a separation contact mechanism, wherein the developing roller is used for supplying a developer in the process cartridge to the photosensitive drum, and the separation contact mechanism comprises an acting portion for interacting with the separation control mechanism; when the process cartridge does not need to operate in the image forming apparatus, the separation control mechanism firstly moves from the intermediate position to the separating force applying position, and then returns to the intermediate position from the separating force applying position, and at the separating force applying position, the separation control mechanism applies a separating force for separating the developing roller from the photosensitive drum to the separation contact mechanism; when the process cartridge needs to operate in the image forming apparatus again, the separation control mechanism firstly moves from the intermediate position to the restoring force applying position, and then returns to the intermediate position from the restoring force applying position, and at the restoring force applying position, the separation control mechanism applies a restoring force for bringing the developing roller into contact with the photosensitive drum to the separation contact mechanism; and the acting portion is rotationally arranged at a longitudinal tail end of the process cartridge.

* * * * *